US009468872B2

(12) United States Patent
Laverdiere et al.

(10) Patent No.: US 9,468,872 B2
(45) Date of Patent: Oct. 18, 2016

(54) PURIFICATION SYSTEM WITH MANIFOLD ASSEMBLY AND REMOVABLE FILTER CASSETTE

(71) Applicant: Entegris, Inc., Billerica, MA (US)

(72) Inventors: Marc Laverdiere, Wakefield, MA (US); Hirokazu Kuwabara, Fuchu (JP); Koichi Kurata, Yonezawa (JP); John P. Puglia, Townsend, MA (US); Ben Mai Pak Lee, Pelham, NH (US); Louis Barrows, Jr., Billerica, MA (US); Kalyan Madhavaram, Lowell, MA (US); Dmitri Menn, Marblehead, MA (US); J. Karl Niermeyer, Tyngsborough, MA (US); Craig Wallace Martland, Salem, NH (US)

(73) Assignee: Entegris, Inc., Billerica, MA (US)

(*) Notice: Subject to any disclaimer, the term of this patent is extended or adjusted under 35 U.S.C. 154(b) by 0 days.

(21) Appl. No.: 14/432,741

(22) PCT Filed: Sep. 30, 2013

(86) PCT No.: PCT/US2013/062745
§ 371 (c)(1),
(2) Date: Mar. 31, 2015

(87) PCT Pub. No.: WO2014/055453
PCT Pub. Date: Apr. 10, 2014

(65) Prior Publication Data
US 2015/0273365 A1    Oct. 1, 2015

Related U.S. Application Data

(60) Provisional application No. 61/835,884, filed on Jun. 17, 2013, provisional application No. 61/826,880, filed on May 23, 2013, provisional application No. 61/813,983, filed on Apr. 19, 2013, provisional application No. 61/775,051, filed on Mar. 8, 2013, provisional application No. 61/708,470, filed on Oct. 1, 2012.

(51) Int. Cl.
*B01D 29/52* (2006.01)
(Continued)

(52) U.S. Cl.
CPC ............ *B01D 29/52* (2013.01); *B01D 63/14* (2013.01); *B01D 65/00* (2013.01); *B25B 17/02* (2013.01);
(Continued)

(58) Field of Classification Search
CPC .... B01D 35/303; B01D 35/30; B01D 63/14; B01D 2313/105; B01D 2313/125; B01D 2313/54; B01D 2313/13; B01D 2313/21; B01D 2313/18; B01D 2313/20; B01D 2313/10; B01D 29/52; B01D 65/00; B01D 2319/04; B01D 61/14; B01D 63/067; B01D 2201/12–2201/127; B01D 27/08; B01D 2315/10; B01D 2319/022; F16L 19/025; F16L 19/005; F16L 19/0225; B25B 17/02; Y10T 29/49826
USPC .................. 29/757, 759, 813, 758; 285/912
See application file for complete search history.

(56) References Cited

U.S. PATENT DOCUMENTS 1,664,125 A    3/1928 Lowrey
(Continued)

FOREIGN PATENT DOCUMENTS

CN    1676189    10/2005
(Continued)

OTHER PUBLICATIONS

Office Action issued for Chinese Patent Application No. 201280048928.6, mailed Sep. 7, 2015, 18 pages.
(Continued)

*Primary Examiner* — David C Mellon
*Assistant Examiner* — Liam Royce
(74) *Attorney, Agent, or Firm* — Sprinkle IP Law Group

(57) ABSTRACT

The present disclosure relates to modular purification systems using removable purifier cassettes for purifying liquids including, for example, liquids used in semiconductor manufacturing. A purification system may include a removable purifier cassette having a purifier inlet port and a purifier outlet port, and a manifold assembly. The manifold assembly can include a plurality of connection systems to that provide manifold ports to provide fluid to/from the cassette. In some embodiments, the connection systems may use connection nuts that can provide 360 degrees of thread engagement with less than 360 degrees of rotation.

21 Claims, 51 Drawing Sheets

(51) Int. Cl.
 *F16L 19/02* (2006.01)
 *B25B 17/02* (2006.01)
 *F16L 19/00* (2006.01)
 *F16L 19/025* (2006.01)
 *B01D 65/00* (2006.01)
 *B01D 63/14* (2006.01)

(52) U.S. Cl.
 CPC ............ *F16L 19/005* (2013.01); *F16L 19/025* (2013.01); *F16L 19/0225* (2013.01); *B01D 2313/105* (2013.01); *B01D 2313/125* (2013.01); *B01D 2313/13* (2013.01); *B01D 2313/18* (2013.01); *B01D 2313/20* (2013.01); *B01D 2313/21* (2013.01); *B01D 2313/54* (2013.01); *B01D 2319/022* (2013.01); *B01D 2319/04* (2013.01); *Y10T 29/49826* (2015.01)

(56) References Cited

U.S. PATENT DOCUMENTS

| | | | |
|---|---|---|---|
| 2,152,977 A * | 4/1939 | Schindel | F16B 39/32 279/76 |
| 2,359,138 A * | 9/1944 | Martin | B01D 29/23 210/167.01 |
| 2,387,368 A * | 10/1945 | Vokes | B01D 29/21 210/131 |
| 2,419,004 A * | 4/1947 | Bicker | B01D 21/0012 210/197 |
| 3,596,932 A | 8/1971 | Kinsey | |
| 3,712,583 A | 1/1973 | Martindale et al. | |
| 3,948,777 A | 4/1976 | Murata et al. | |
| 3,965,012 A | 6/1976 | Eguchi et al. | |
| 4,043,239 A * | 8/1977 | DeFusco | F16B 5/0233 296/187.01 |
| 4,098,419 A | 7/1978 | Virog, Jr. et al. | |
| 4,219,422 A | 8/1980 | Knothe et al. | |
| 4,304,669 A | 12/1981 | Knothe et al. | |
| 5,219,529 A | 6/1993 | Ngo et al. | |
| 5,376,270 A | 12/1994 | Spearman | |
| 5,405,528 A * | 4/1995 | Selbie | B01D 35/303 210/232 |
| 5,468,449 A | 11/1995 | Sjogren et al. | |
| 5,470,531 A | 11/1995 | Sjogren et al. | |
| 5,543,047 A | 8/1996 | Stoyell et al. | |
| 5,628,417 A | 5/1997 | Van Halteren | |
| 5,871,239 A | 2/1999 | Boscaljon et al. | |
| 6,050,609 A | 4/2000 | Boscaljon et al. | |
| 6,073,973 A | 6/2000 | Boscaljon et al. | |
| 6,117,390 A | 9/2000 | Corey, Jr. | |
| 6,143,174 A | 11/2000 | Graus | |
| 6,207,116 B1 | 3/2001 | Heed | |
| 6,277,277 B1 | 8/2001 | Jacobi et al. | |
| 6,378,907 B1 | 4/2002 | Campbell et al. | |
| 6,409,784 B1 | 6/2002 | Wehr | |
| 6,458,278 B1 | 10/2002 | Leoncavallo et al. | |
| 6,511,098 B1 | 1/2003 | Luterstein | |
| 6,568,540 B1 | 5/2003 | Holzmann et al. | |
| 6,800,199 B1 | 10/2004 | Rhee | |
| 6,908,121 B2 | 6/2005 | Hirth et al. | |
| 7,021,667 B2 | 4/2006 | Campbell et al. | |
| 7,037,424 B2 | 5/2006 | Niermeyer et al. | |
| 7,163,237 B2 | 1/2007 | Niermeyer et al. | |
| 7,222,889 B2 | 5/2007 | Breay | |
| 7,296,582 B2 | 11/2007 | Campbell et al. | |
| 7,300,483 B2 | 11/2007 | Hauville | |
| 7,350,821 B2 | 4/2008 | Campbell et al. | |
| 7,387,210 B2 | 6/2008 | Burrows et al. | |
| 7,407,148 B2 | 8/2008 | Bassett et al. | |
| 7,547,049 B2 | 6/2009 | Gashgaee | |
| 7,963,572 B2 | 6/2011 | Bull et al. | |
| 2002/0163181 A1 | 11/2002 | Russell | |
| 2003/0094405 A1 | 5/2003 | Stamey et al. | |
| 2003/0217958 A1 | 11/2003 | Reid | |
| 2004/0070200 A1 | 4/2004 | Campbell et al. | |
| 2004/0207202 A1 | 10/2004 | Parks | |
| 2004/0232064 A1 | 11/2004 | Wilkinson et al. | |
| 2005/0167352 A1 | 8/2005 | Burrows et al. | |
| 2006/0032806 A1 | 2/2006 | Parker | |
| 2006/0043021 A1 * | 3/2006 | Pesakovich | B01D 61/20 210/650 |
| 2006/0213827 A1 | 9/2006 | Nozaki | |
| 2006/0219622 A1 | 10/2006 | Arteche et al. | |
| 2006/0254230 A1 | 11/2006 | Powell | |
| 2007/0125541 A1 | 6/2007 | Bull et al. | |
| 2008/0116688 A1 | 5/2008 | Bull et al. | |
| 2009/0321339 A1 | 12/2009 | Suzuki et al. | |
| 2010/0140156 A1 | 6/2010 | Levy et al. | |
| 2011/0011782 A1 | 1/2011 | Myers et al. | |
| 2012/0074053 A1 | 3/2012 | Collignon et al. | |
| 2013/0154253 A1 | 6/2013 | Yuhara et al. | |
| 2013/0161941 A1 | 6/2013 | Zulauf et al. | |
| 2014/0091027 A1 | 4/2014 | Laverdiere et al. | |
| 2014/0238922 A1 | 8/2014 | Puglia et al. | |
| 2014/0246383 A1 | 9/2014 | Puglia et al. | |
| 2015/0247595 A1 | 9/2015 | Laverdiere et al. | |

FOREIGN PATENT DOCUMENTS

| | | |
|---|---|---|
| CN | 102202760 | 9/2011 |
| CN | 102228754 A | 11/2011 |
| CN | 102574065 | 7/2012 |
| CN | 202561304 U | 11/2012 |
| CN | 202612910 U | 12/2012 |
| DE | 2851776 | 6/1980 |
| DE | 7835503 U1 | 7/1981 |
| DE | 10337652 | 3/2005 |
| EP | 0983784 | 3/2000 |
| EP | 1600199 | 11/2005 |
| EP | 1600199 A1 | 11/2005 |
| EP | 1637206 | 3/2006 |
| EP | 2484430 A1 | 8/2012 |
| FR | 2664672 A1 | 1/1992 |
| FR | 2935102 | 2/2010 |
| GB | 771968 | 4/1957 |
| GB | 1152093 | 5/1969 |
| GB | 1392401 | 4/1975 |
| GB | 1510394 | 5/1978 |
| GB | 2082080 | 3/1982 |
| GB | 2086762 | 5/1982 |
| GB | 2485360 | 5/2012 |
| JP | S5595743 | 7/1980 |
| WO | WO9733673 | 9/1997 |
| WO | WO0053285 | 9/2000 |
| WO | WO0147620 | 7/2001 |
| WO | WO0148413 | 7/2001 |
| WO | WO0183079 | 11/2001 |
| WO | WO2007007898 | 1/2007 |
| WO | WO2007024842 A2 | 3/2007 |
| WO | WO2007149273 | 12/2007 |
| WO | WO2009022768 | 2/2009 |
| WO | WO2009059324 | 5/2009 |
| WO | WO2009062912 | 5/2009 |

OTHER PUBLICATIONS

ZeeWeed1000 Ultrafiltration Membrane, GE Water Product Information, 3 pgs., GE Water & Process Technologies, Trevose, PA, US, accessed Oct. 3, 2011 at http://www.gewater.com/products/equipment/mf_uf_mbr/zeeweed_1000.jsp.

"Purifier Design History," Feb. 19, 2007, 13 pgs., Entegris, Inc., Billerica, MA.

International Search Report and Written Opinion issued for PCT Application No. PCT/US2012/000427, mailed Dec. 19, 2012, 12 pages.

International Search Report and Written Opinion issued for PCT Application No. PCT/US2012/000437, mailed Dec. 21, 2013, 14 pages.

Second Written Opinion issued for PCT Application No. PCT/US2012/000427, mailed Sep. 30, 2013, 11 pages.

Second Written Opinion issued for PCT Application No. PCT/US2012/000437, mailed Dec. 21, 2013, 14 pages.

(56) References Cited

OTHER PUBLICATIONS

International Search Report and Written Opinion issued for PCT Application No. PCT/US2013/062744, mailed Dec. 3, 2013, 11 pages.
Partial International Search issued for PCT Application No. PCT/US2013/062743, mailed Jan. 23, 2014, 3 pages.
Partial International Search Report issued for International Patent Application No. PCT/US2013/062745, mailed Jan. 23, 2014, 3 pages.
International Preliminary Report on Patentability (IPRP) issued for PCT Application No. PCT/US2012/000427, mailed Feb. 12, 2014, 69 pages.
International Preliminary Report on Patentability issued for PCT Application No. PCT/US2012/000437, mailed Feb. 12, 2014, 45 pages.
International Search Report and Written Opinion issued for PCT Application No. PCT/US2013/062745, mailed May 21, 2014, 19 pages.
Written Opinion issued for PCT Application No. PCT/US2013/062744, mailed Sep. 12, 2014, 4 pages.
International Search Report and Written Opinion issued for PCT Application No. PCT/US2013/062743, mailed Sep. 25, 2014, 19 pages.
Written Opinion issued for PCT Application No. PCT/US2013/062745, mailed Oct. 15, 2014, 12 pages.
Office Action issued for Chinese Patent Application No. 201280048849.5, mailed Nov. 13, 2014, 6 pages.
International Preliminary Report on Patentability issued for PCT Application No. PCT/US2013/062744, mailed Dec. 11, 2014, 32 pages.
Office Action issued for U.S. Appl. No. 14/349,623, mailed Dec. 19, 2014, 20 pages.
Examination Report issued for Singaporean Patent Application No. 11201401179P, mailed Jan. 5, 2015, 11 pages.
Office Action issued for Chinese Patent Application No. CN201280048928.6, mailed Dec. 2, 2014, 7 pages.
2nd Written Opinion issued for PCT Application No. PCT/US2013/062743, mailed Feb. 16, 2015, 12 pages.
International Preliminary Report on Patentability (IPRP) issued for PCT Application No. PCT/US2013/062745, mailed Mar. 30, 2015, 100 pages.
Search Report issued for Singaporean Patent Application No. 11201401180X, mailed Feb. 27, 2015, 8 pages.
Written Report issued for Singaporean Patent Application No. 11201401180X, mailed Feb. 27, 2015, 11 pages.
International Preliminary Report on Patentability (IPRP) issued for PCT Application No. PCT/US2013/062743, mailed Jun. 6, 2015, 90 pages.
Office Action issued for Chinese Patent Application No. 201280048849.5, mailed Jun. 15, 2015, 12 pages.
Final Office Action issued for U.S. Appl. No. 14/349,623, mailed Jul. 15, 2015, 21 pages.
Office Action issued for Chinese Patent Application No. 201280048928.6, mailed Feb. 1, 2016, 15 pages.
Office Action issued for Chinese Patent Application No. 201380062389.6, mailed Feb. 1, 2016, 14 pages.
Final Examination Report (Notice of Allowance) issued for Singaporean Patent Application No. 11201401180X, mailed Nov. 24, 2015, 14 pgs.
Chinese Patent Application No. 201280048849.5, mailed Dec. 10, 2015, 11 pages.
Corrected International Preliminary Report on Patentability issued for PCT Application No. PCT/US2012/000427, mailed Dec. 14, 2015, 37 pages.
Office Action issued for U.S. Appl. No. 14/349,623, mailed Dec. 14, 2015, 26 pages.
Office Action issued for Chinese Patent Application No. 201380062532.1, mailed Dec. 16, 2015, 21 pages.
Final Office Action issued for U.S. Appl. No. 14/349,623, mailed Jun. 14, 2016, 25 pages.
Notice of Allowance issued for Chinese Patent Application No. 201280048849.5, mailed Jul. 5, 2016, 2 pages.
Written Opinion issued for Singaporean Patent Application No. 11201502550Y, mailed May 19, 2016, 9 pages.
Written Opinion issued for Singaporean Patent Application No. 11201502555Q, mailed Jun. 3, 2016, 9 pages.

* cited by examiner

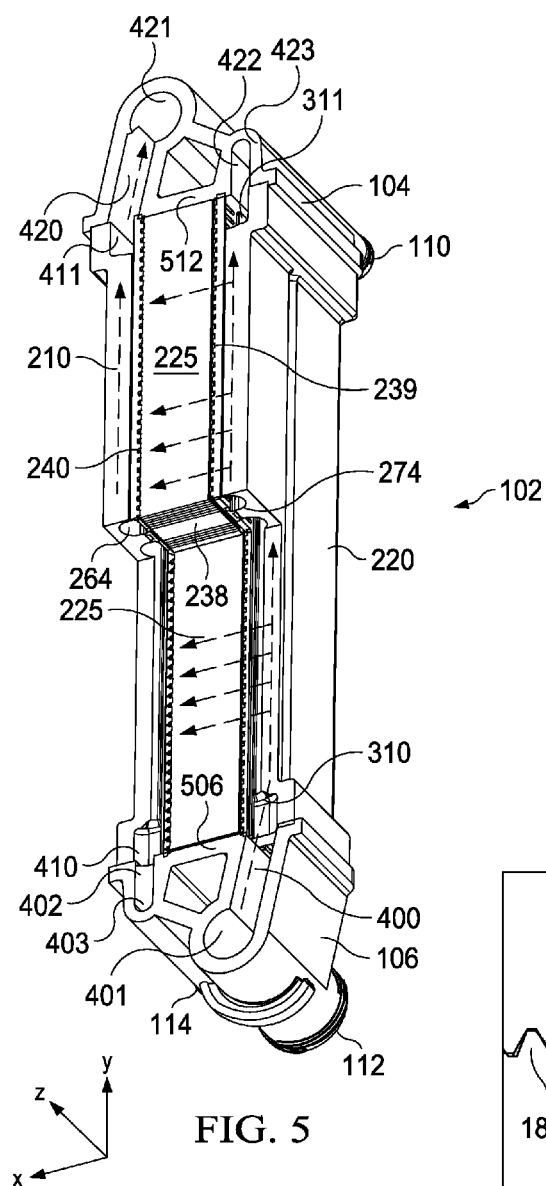
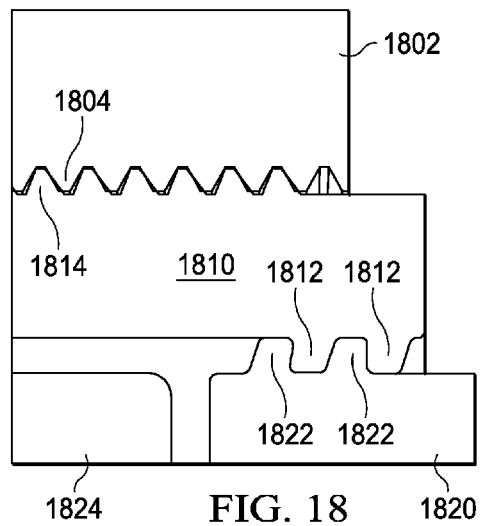
FIG. 5
FIG. 18

PURIFICATION SYSTEM WITH MANIFOLD ASSEMBLY AND REMOVABLE FILTER CASSETTE

CROSS-REFERENCE TO RELATED APPLICATIONS

This is a national stage application of, and claims priority to, International Application No. PCT/US2013/062745, filed Sep. 30, 2013, entitled "PURIFICATION SYSTEM," which claims priority to U.S. Provisional Patent Application No. 61/708,470, entitled "Modular Filter With Tension Members," filed Oct. 1, 2012, U.S. Provisional Patent Application No. 61/775,051, entitled "Modular Filter With Tension Members and Manifold for Modular Filters," filed Mar. 8, 2013, U.S. Provisional Patent Application No. 61/813,983, entitled "Manifold for Modular Filters, Modular Filter Cassettes and Connection Systems," filed Apr. 19, 2013, U.S. Provisional Patent Application No. 61/826,880, entitled "Modular Filter with Tension Members," filed May 23, 2013 and U.S. Provisional Patent Application No. 61/835,884, entitled "Manifold for Modular Filters, Modular Filter Cassettes and Connection Systems," filed Jun. 17, 2013, each of which is fully incorporated herein by reference for all purposes.

TECHNICAL FIELD

This disclosure relates to purification and filtration systems. More particularly, embodiments described herein relate to modular purification and filtration systems. Even more particularly, embodiments described herein relate to modular purification and filtration systems for purifying semiconductor manufacturing fluids.

BACKGROUND

Semiconductor manufacturing processes are highly sensitive to contamination because depositing even a tiny particle or other contaminants (metals, not volatile residue) on a semiconductor wafer can lead to defects. Therefore, it is common to employ ultraclean purifiers having membranes that remove submicron particles, residues like metal ions and other contaminants. Although different filtration modules have been developed to filter semiconductor manufacturing liquids, rectangular shaped filters have been avoided because rectangular designs are typically unable to meet the filtering and flow rate requirements in a compact design that can withstand the pressures used in semiconductor manufacturing. Therefore, many existing filter modules are cylindrical, having a housing with a one-piece cylindrical bowl or sleeve in which the filter membrane resides. Typically, these filters contain a circular pleated filter membrane that is encased between an external cage and an internal core. Fluid enters the filter module from the top or bottom, flowing between the sleeve before passing through the cage, passing through the filter membrane to the hollow core and exiting the module.

Existing cylindrical filter modules suffer several shortcomings. One deficiency is that the circular pleated membrane unduly restricts fluid flow because the membrane must be more tightly packed towards the center in order to achieve the circular configuration. Another deficiency is that the cylindrical housings are molded or extruded as single pieces, making it difficult or impossible to add geometries that run perpendicular to the cylinder's axis. Furthermore, many existing filter modules are difficult to install and replace. Since many liquids used in semiconductor manufacturing are corrosive or toxic, filter module replacement presents a danger to workers.

Current filtration systems that employ cylindrical filters have limited configurability. In many cases, filters are connected through multiple units in a fixed configuration, making it difficult to change the flow through the filters from serial to parallel as needed. Additionally, many filtration systems use only a single type of filter, limiting the ability to apply different filters for different purposes or particle sizes in a single filtration system.

SUMMARY

Embodiments of modular purification systems and methods are described. According to one embodiment, a purification system can comprise a generally rectangular removable purifier cassette and a manifold assembly. The manifold assembly may comprise a plurality of connection systems to connect to the purifier cassette.

In one embodiment, the purifier cassette comprises a main body having a first sidewall, a second sidewall, a third sidewall and a fourth sidewall and may define a media cavity. The first sidewall is opposite the second sidewall and the third sidewall opposite the fourth sidewall. The purifier cassette may include a number of ports including a first purifier port fluidly connected to a first portion of the media cavity and a second purifier port connected to a second portion of the media cavity. The first and second portion of the media cavity may be separated from each other by one or more purification elements. One or more tension members may be coupled to the first sidewall and the second sidewall of the media cavity, the tension members dividing the media cavity into a plurality of sections.

The purifier body can be configured with reinforcing structures. According to one embodiment, the reinforcing structures comprise reinforcing ribs extending the length of the device (or other length) that can provide, in one embodiment, the dual functions of providing flow paths and reinforcing the main body. The reinforcing ribs may define arced, elliptical or otherwise rounded flow paths, thereby providing reinforcing arches. Thus, according to one embodiment, a series of reinforcing arches can define the flow paths along the sidewall.

The main body, according to one embodiment, can include a plurality of hoop-like structures to distribute load through the pressure vessel structure, allowing the pressure vessel to withstand high pressure and temperature applications. The hoop-like structures can promote hoop stress to place the first sidewall, second sidewall third sidewall and fourth sidewall in tension.

A purifier element can be disposed in each of the plurality of sections. A purifier element may include a compressed generally rectangular pleat pack of polymeric membrane arranged with a first set of pleat tips facing the first portion of the purifier cavity and a second set of pleat tips facing the second portion of the purifier cavity or may include other forms of purifier elements.

The purifier cassette may include set of flow channels to direct fluid through purifier elements disposed in the lanes, serially or in parallel. The flow channels may be disposed in end caps, the sidewalls or elsewhere. According to one embodiment, a first set of flow channels is disposed along the first sidewall and a second set of flow channels is disposed along the second sidewall. The first set of flow channels and second set of flow channels may be aligned with the plurality of lanes on opposite sides of the plurality of lanes. The first set of primary flow channels can be fluidly coupled to the first purifier port and the second set of flow channels may be fluidly coupled to the second purifier port.

A first set of sub-channels may be defined in the first set of flow channels and a second set of sub-channels may be defined in the second set of flow channels. The first set of flow channels may comprise a first set of plenums connected to the first set of sub-channels and the second set of primary flow channels may comprise a second set of plenums connected to the second set of sub-channels. The flow channels (and sub-channels), in some embodiments, are defined by a series of arches disposed along the sidewalls.

The purifier cassette can comprise any number of port fittings. In some cases, the port fittings may include external threads and other features. Thus, according to one embodiment, a purifier cassette can include a first purifier fitting having first purifier port fitting external threads and a second purifier port fitting having second port fitting external threads.

A manifold assembly may be provided that includes the plurality of connection systems. The manifold may connect to a single cassette or multiple cassettes and can be configured to provide serial purification, parallel purification or a combination thereof. The plurality of connection systems may be configured to simultaneously seal multiple purifier ports. In some cases, the connection systems are configured to allow a user to seal rear ports of a purifier cassette from a front side of the purifier cassette. The plurality of connection systems may be coupled to a main manifold plate. One or more of the connection system may be movable or fixed. Thus for example, a first connection system may be movable relative the main manifold plate and a second connection system may be fixed.

A connection system may comprise a connection housing defining a connection housing opening, a manifold fitting and a connection nut disposed in the connection housing opening. The connection nut can include a set of connection nut internal threads. The connection nut internal threads may engage the first purifier port fitting external threads. The connection nut internal threads can be configured to create a seal between the first purifier port fitting and manifold fitting with less than 360 degrees of rotation of the connection nut. In some embodiments, less than 360 degrees of rotation may result in at least 360 degrees or more of thread engagement and in other embodiments may result in less than the 360 degrees of thread engagement. The thread engagement may provide a circumferential axial sealing force sufficient to seal the first purifier port fitting to the first manifold fitting. In one embodiment, the connection nut internal threads and first purifier port fitting external threads are multi-start threads.

The connection nut may further comprise external threads that engage with connection housing inner threads and may be configured to inhibit backing out of the connection nut under the axial loading. According to another embodiment, the connection nut does not include external nut threads, but is retained in the connection housing from moving axially while still being able to rotate.

The manifold assembly may also include a second connection nut disposed in the same housing or a different housing than the first connection nut. Thus, for example, the second connection nut may be disposed in a second opening in the first connection housing or in an opening in a second connection housing. The second connection nut can include external threads to engage a set of second connection housing inner threads (or may not include external threads). According to one embodiment, the second connection nut may be operatively coupled to the first connection nut so that the first and second connection nuts rotate simultaneously. For example, the purification system can comprise a gear assembly operatively coupling a first connection nut to a second connection nut such that the first connection nut and second connection nut rotate simultaneously. The second connection nut may seal a second purifier port fitting to a second manifold fitting with less than 360 degrees of rotation of the second connection nut.

A connection system can include a rotation member that extends to the opposite side of the purifier cassette from the first connection nut and second connection nut. The rotation member can be operatively coupled to the gear assembly such that rotation of the rotation member rotates the first connection nut and the second connection nut. The rotation member, in one embodiment, comprises a gear arm having gear teeth. The gear arm may be operatively coupled to the first connection nut and second connection nut by one or more gears. In one embodiment, the gear arm is directly coupled to the first connection nut and operatively coupled to the second connection nut. The gear arm may further comprise a main arm portion extending past the cassette.

A drive shaft may be received in a drive shaft passage of the arm portion, the drive shaft translatable in the drive shaft passage from a fully retracted position to a fully inserted position. An alignment post extending from a drive handle may be received in an alignment opening of the cassette and may provide a pivot point for the drive shaft. The alignment opening can be keyed such that the drive shaft may be inserted a first distance, then rotated about the pivot point a selected angular distance, and then pushed forwarded to a fully inserted position. In one embodiment, the alignment opening may be keyed such that a portion of the alignment post aligns with an entrance passage in the alignment opening when with the set of first connection nut internal threads align with the first port fitting external threads and the set of second connection nut internal threads aligning with the second port fitting external threads. In this case, the alignment post and alignment opening may help ensure that the connection nuts are in the proper orientation and position before the gear arm is rotated.

The drive shaft may be rotatable through a range of angular positions about the pivot point. According to one embodiment, in a first set of selected angular positions the drive shaft cannot be translated to a fully inserted position, but in certain angular positions, the drive shaft can be translated to the fully inserted position. This can be done for example to lock rotation of the gear arm. For example, in the first set of angular positions, a first end of the drive shaft may overlap a front surface of a connection housing, but in the selected angular position, which may correspond to a position in which the connection nuts create a 360 seal, the first end of the drive shaft may align with a feature into which the first end of the drive shaft can be inserted, such as a notch in the side of the connection housing or other feature, to lock rotation of the gear arm.

The connection system and fitting may include alignment features to help ensure that the fitting external threads and connection nut internal threads are properly aligned. In one embodiment, the alignment features of the fitting may include an alignment rib. The gear arm, or other rotation member, may include a slot to receive the rib. The alignment rib and slot may configured so that the rotation member is rotated to a certain angle (e.g., corresponding to a position in which the threads are aligned) before the alignment rib can enter the slot. The alignment rib and slot may be helical.

A connection nut and port fitting can include features to ensure proper engagement between the connection nut and port fitting. A connection nut can comprise a first alignment features and the port fitting can comprise a complementary alignment feature. The first alignment feature can be spaced from a start of the set of connection nut internal threads a distance such that the set of connection nut internal threads cannot engage the fitting external threads unless the first alignment feature mates with the corresponding alignment feature of the fitting. In some cases, the alignment feature of the connection system passes through the alignment feature of the fitting before the connection nut can rotate (or vice versa).

According to one embodiment, for example, a connection nut may include a set of inner projections spaced from a start of the connection nut internal threads, while a port fitting can comprises a port rib spaced from the port fitting external threads that includes a set of notches. The inner projections and port rib can be spaced so that the nut internal threads cannot engage the port fitting external threads unless the inner protrusion passes through the alignment notch. In some cases, the alignment features can be configured so that only certain cassettes fit in certain manifolds (or in particular positions within a manifold) (e.g., to ensure proper cassettes are used for certain applications). For example, the notch sets and inner projections can be altered in geometry, spacing, or other aspect for different fittings/connection nuts.

Embodiments described herein provide an advantage by providing a compact purifier cassette that can provide the comparable purification, flow rate and pressure drop to a cylindrical purifier having the same membrane area, but in a compact package. The purifier cassette with smaller size may even be achieved with deformable materials such as perfluoroalkoxy polymer (PFA) and other such materials used in semiconductor manufacturing systems.

Embodiments described herein provide another advantage by maximizing the effectiveness of pleated purifiers, such as pleated microporous polymeric membranes. For rectangular pleat packs, the pleat pack density can remain uniform through the device, maximizing the effectiveness of the purification area. For devices with the same purification area, a rectangular pleat pack will perform as if it has more purification area than a round pleated membrane.

As another advantage to embodiments that use rectangular pleat packs, a rectangular shaped pleat pack generally allows for taller pleats than that of a round purifier cartridge. Therefore, a rectangular pleat pack can better fill a volume and provide a more uniform shape than a round pleat pack, thereby reducing the envelope dimensions for a rectangular pleat pack device.

As another advantage, embodiments can reduce purifier plugging. In many current purification systems, a single purifier is responsible for purifying an entire fluid stream. Consequently, the purifier used is selected based on the finest particle size to be purified. This means that a fine granularity, typically expensive, purifier is used to purifier both large and small particles, causing undue plugging. Embodiments of purification systems described herein, however, allow for purifying in series, providing an advantage over traditional purifying systems in which a single purifier is used. Prior to the last purifier, other, potentially cheaper, purifiers can be used to pre-purify out larger particles and other contaminants. This may result in reduced deterioration or extending the capacity of the final purifier.

As another advantage, many manufacturers (for example, semiconductor manufacturers) use purifying systems distributed throughout a manufacturing system (e.g., at point of entry, in the subfloor, at the manufacturing tool). A purification system that allows for purifying in series in a single purification unit can do away with the need for multiple separate purification systems and allow all the purifying to take place at a single point in the manufacturing system.

As yet another advantage, embodiments can provide a quick connect mechanism for fluid fittings and, in some embodiments, a quick connect system that allows multiple fittings to be sealed simultaneously. In some cases, the quick connect system can allow a user to seal ports even when the ports are located to the rear of a filter cassette away from the user. Furthermore, the quick connection can be o-ringless, improving contamination control and providing more reliable higher temperature operation.

BRIEF DESCRIPTION OF THE DRAWINGS

The drawings accompanying and forming part of this specification are included to depict certain aspects of embodiments of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 5 is a diagrammatic representation of one embodiment of flow through a system.

FIG. 18 is a diagrammatic representation of another embodiment of a connection system.

DESCRIPTION

Figure 1B:
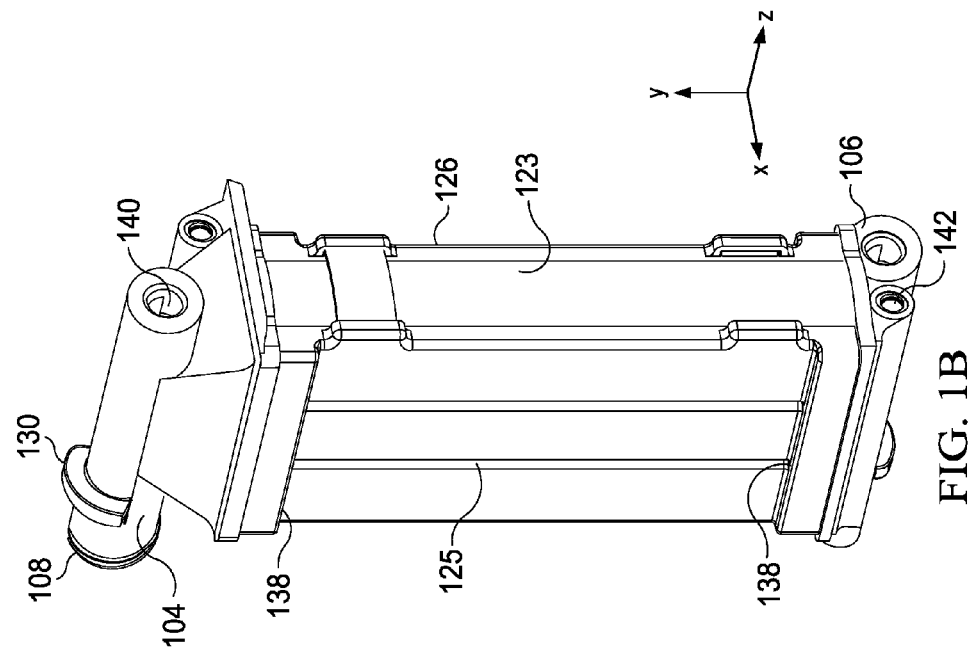
FIGS. 1A-1B are diagrammatic representations of one embodiment of a cassette.

Purification systems and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

For the sake of explanation, embodiments may be described relative to a first axis (the x-axis), a second axis (the y-axis), and a third axis (the z-axis). Furthermore, embodiments may be referred to as having a top, bottom, front, rear, left and right sides and a height, depth and width. These axes and terms are provided by way of explanation. Embodiments may be otherwise oriented and configured. Furthermore, while certain items may be referred to as "first," "second," "third," "fourth," etc. (e.g., a first sidewall, second sidewall) it would be understood that such terms are used for explanation and any one of multiple such items may be considered the "first," "second," etc.

Embodiments described herein relate to a compact, generally rectangular pressure vessels and manifolds for providing fluid to/from pressure vessels, including purifier cassettes capable of removing contaminants like particles, ions, gases and the like from liquids. More particularly, some embodiments relate to purifier cassettes for purifying a variety of fluids including, but not limited to, semiconductor process fluids such as chemicals used in wet etch and cleaning applications. In other examples, embodiments can be applied to purifying chemicals in photolithographic processing (photochemicals). Photochemicals include materials such as primers, adhesion promoters, photoresists, edge bead removers, anti-reflective coatings, developers, dielectrics, and the like. The chemicals can be filtered at the point of use (POU), the subfloor or elsewhere. Purifier cassettes may also be used to filter other liquids, including slurries.

A purifier cassette may include a purification element to add or remove material from a process liquid or other fluid. A purifier cassette may include a purification element to add or remove material from a process liquid or other fluid. A purification element or purifier element refers to any purification media that can add or remove material from a liquid or other fluid. For example, contaminants which can be removed by the media include but are not limited to particles, gels, molecular contaminants, ions, dissolved gases, bubbles, or combination of these. Material which can be added can include gases like ozone and carbon dioxide. Filtration as used herein refers to the acts or steps of removing all or a portion of contaminants from a liquid or other fluid. Purification can include but is not limited to mechanical sieving, electrostatic, chemical bonding, ion exchange, chelation, adsorption, degassing, and combinations of these.

Media refers to a material or combination of materials that removes contaminants from a liquid or other fluid or transfers material into the liquid or other fluid. The media can include but is not limited to porous membranes for particle removal; non-porous membranes for degassing liquids; porous membranes with ion exchange groups or ligands or porous membranes that contain ion exchange media within the membrane or porous membranes that encapsulate ion exchange, adsorption, or other reactive particulate media such as but not limited to silicon beads, ion exchange beads, or activated carbon, for removing ions, or residues in liquids. A media may be porous (e.g., for filtration) or non-porous (e.g., for gas exchange). In some embodiments the media can be used to transfer material into a process fluid such as a liquid. An example would include a porous or non-porous membrane used for adding ozone gas or carbon dioxide gas to the liquid. In various embodiments, purifier cassettes contain one or more media.

A purification media can include a membrane. Example membranes include, but are not limited to those made from polymeric materials. Examples can include but are not limited to polyolefins like ultra-high molecular weight polyethylene, polypropylene, and high density polyethylene; halogenated polyolefins such as polytetrafluoroethylene and polyvinylidene fluoride; perfluorinated polymers like perfluoroalkoxy polymer (PFA) and fluorinated ethylene propylene (FEP); polysulfones, polyamides including nylon 6,6, and polyesters. The membranes can be porous, non-porous, or have skinned surfaces (porous or non-porous). Porous membranes can be single or multilayer and include those with symmetric or asymmetric (and combinations) of pore size across the thickness of the membrane. The membranes can be cast, extruded, or formed by melt blowing or electro spinning or multilayer membranes made by a combination of these. Polymeric netting materials and other materials may be pleated with a membrane. In some embodiments a non-porous membrane can be used for heat exchange.

Before discussing specific embodiments, some context may be helpful. In filtering semiconductor manufacturing fluids, there is often a need to balance retention or contaminant removal, flow rate, size and pressure drop across the filter. As the retention or contaminant removal or flow rate increases, the size of the filter may also increase to reduce the increased pressure drop. For example, for a given filtration medium, reducing the pore size 50% may increase the flow resistance by 400%. This means that to maintain a desired flow rate, the pressure drop in the filter will increase dramatically. To compensate for pressure drop increases, the size of the filter housing and corresponding membrane area may have to be increased accordingly. The use of large filters, however, may be undesirable or infeasible due to space constraints or other considerations.

Conventionally, cylindrical filters represented a good balance of size, particle retention or containment removal, flow rate and pressure loss. Hence, the semiconductor manufacturing industry has by and large adopted cylindrical filters. Rectangular filters have been avoided because the stress in a rectangular filter requires that the rectangular filter be made larger than a comparable cylindrical filter to achieve the same filtration and flow rate. Furthermore, it is believed that the pressures typically experienced in semi-conductor manufacturing filters would cause high localized stress in typical rectangular designs. Such stresses would cause the non-reactive materials often used in semiconductor manufacturing devices, such as perfluoroalkoxy polymer (PFA) and polytetrafluoroethylene (PTFE), to yield, resulting in filter failure.

Embodiments described herein can provide a purifier cassette with a generally rectangular profile in a compact design that may provide comparable or superior retention (or other purification), flow rate and pressure drop compared to a cylindrical filter having a comparable filter media area. The cassette can further provide lower housing surface area and dead volume for improved filtration performance. In some embodiments, the cassette can be formed of materials such as PFA and other non-reactive materials and can, thus, be suitable for use with semiconductor manufacturing fluids. RFID tags and other features can be integrated into a purifier cassette to promote programmed operations and facilitate filter changes by robots.

According to one embodiment, a purifier cassette can be configured as a filter cassette. A variety of purifier elements can be used, including pleated filters formed from membranes to filter a liquid or other fluid. The membranes can be selected to achieve desired particle size retention or other purification result. For some semiconductor manufacturing applications, porous membranes can be selected that have particle size retentions of 20 nanometer, 15 nanometer, 10 nanometer or lower. A relatively high flow rate can be maintained at these retention ratings (including but not limited to greater than 15 liters per minute) for sub-15 nanometer retentions. For example, contaminants which can be removed by the media include but are not limited to particles, gels, molecular contaminants, ions, dissolved gases, bubbles, or combination of these.

Another issue experienced in semiconductor manufacturing is the lack of a suitable quick connect fitting. Many fittings that can withstand higher pressures must be rotated several times in order to complete a seal. Such connections are difficult to use, especially in cramped spaces, and do not facilitate filter changes by robots. To this end, embodiments described herein further provide a quick connect fitting that can be utilized in a variety of applications, including in semiconductor manufacturing systems. The quick connect fitting can provide o-ringless sealing. The o-ringless design can reduce contamination and provide more reliable high temperature operation. The quick connect fitting can further provide features to prevent insertion errors or incorrect seating.

It may be noted that, while embodiments described herein are described in terms of a filter cassette, the filter cassettes may include any suitable purification media to perform purification as discussed above. In some cases, a cassette may be configured for other applications such as heat exchange or other application.

Figure 1A:
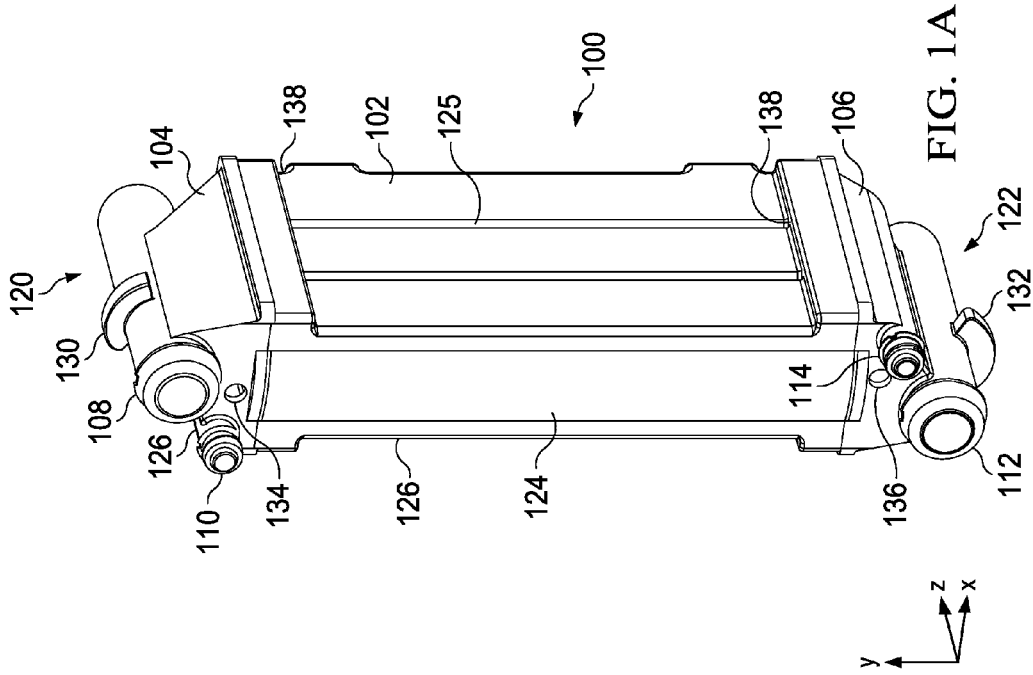

FIGS. 1A and 1B are diagrammatic representations of one embodiment of a filter cassette 100. For purposes of discussion, filter cassette will be described in terms of a first end 120 (a top end), a second end 122 (a bottom end), a first side 123 (a front side), a second side 124 (a rear side), a third side 125 and a fourth side 126. Filter cassette 100 has a main body 102 having a generally rectangular profile, a first end cap 104 and a second end cap 106. Main body 102 can provide an interior cavity in which a purifier element is disposed. End cap 104 and end cap 106 provide ports (e.g., one or more of first port 108, second port 110, a third port 112 and fourth port 114) that are fluidly coupled to the interior cavity. Depending on the configuration of filter cassette 100, any of the one or more ports may act as an inlet port, an outlet port, a vent port, drain port or other type of port. In some cases, the ports may be placed so that the filter cassette can be reversed (e.g., the filter cassette can be mated to a manifold with end 120 as the top and end 122 as the bottom or vice versa or in another orientation). The various housing components may be coupled together using any suitable mechanism including, but not limited to, joining through sonic bonding, thermal bonding, adhesives or other joining scheme or through mechanical fasteners or a combination thereof.

In other embodiments, the port fittings may be internally threaded or not have threads. As depicted, the ports are open in the x-y plane to the rear of cassette 100 and the primary flow path through the ports is parallel to the z axis. The ports on an end cap are offset from each other in both the x and y axes. By offsetting the ports along the y-axis, the end caps may be narrower, allowing the overall width of the filter cassette 100 (e.g., size in the x direction) to remain smaller. While two end caps are illustrated, a filter cassette may have one end cap, with the other end sealed. In other embodiments, the ports may be disposed in a sidewall of the cassette or elsewhere and end caps not used.

As depicted in FIG. 1A, the port fittings may include port fitting external threads to engage with threads of a manifold or other component. Additionally, a port fitting may include a radially projecting port rib (e.g., radial rib 130 and radial rib 132) extending from a surface of the end cap and set back from the respective port openings (e.g., port 108 and port 112). Radial rib 130 and radial rib 132 may be used as an alignment feature and help ensure a sealed connection as discussed below. In some embodiments there is no radial rib. One example of a radial rib is a helical rib discussed in conjunction with FIG. 24 below. However, radial rib 130 and radial rib 132 may also have other configurations.

The end caps may include features such as alignment holes, rails, guide channels or the like to engage with complementary features on a manifold assembly to help ensure proper placement of the filter cassette. In the embodiment of FIG. 1A, end cap 104 includes alignment hole 134 and end cap 106 includes alignment hole 136 open to the front of cassette 100 to receive guide pins of a manifold (e.g., such as alignment knobs discussed below or other guides). Alignment holes 134/136 can receive corresponding guides of a manifold to vertically position and hold cassette 100. End cap 104 may further include an alignment opening 140 and end cap 106 may include alignment opening 142. According to one embodiment, alignment opening 140 is axially aligned with port 108 and alignment opening 142 is axially aligned with port 112. Alignment opening 140 and alignment opening 142 may receive an alignment post of a drive handle as discussed below. The outer sidewalls of cassette 100 may further include shoulders 138 that can be used to support and align the cassette. For example, shoulders 138 may contact guide arms or other alignment features of a manifold to help align and support cassette 100.

Cassette 100 may include additional features for convenience and safe handling, such as labeling, handles, etc. as discussed below. As one example, feet or flat surfaces can be disposed on the opposite side of cassette 100 from the port openings to allow cassette 100 to rest on a surface with the port openings facing up and without tipping over.

Figure 2:
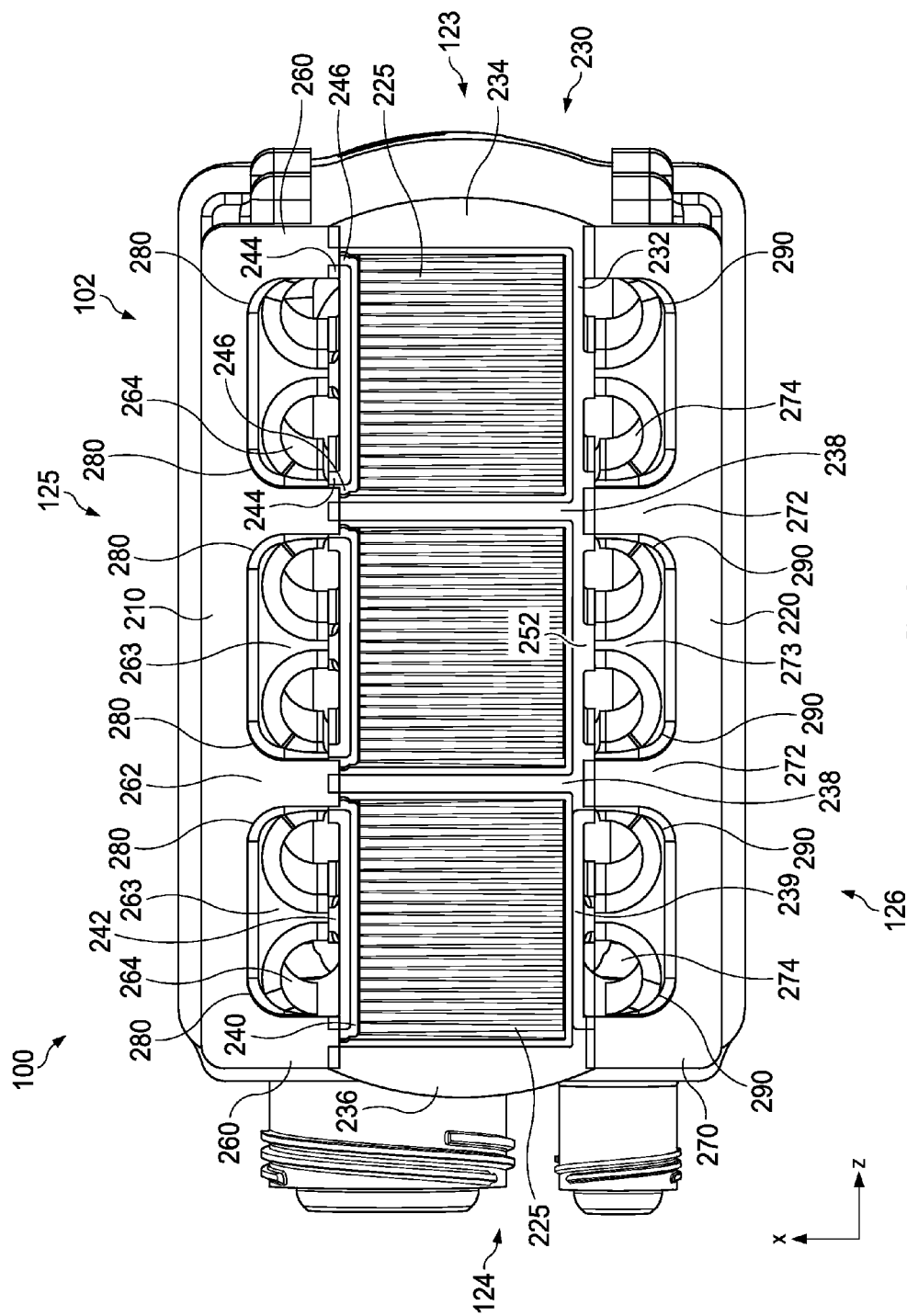
FIG. 2 is a diagrammatic representation of a view of one embodiment of a cassette body.

FIG. 2 is a diagrammatic representation of one embodiment of main body 102 viewed from an end (e.g., with end cap 106 removed). Main body 102 may define a media cavity. The media cavity may be segregated into lanes with a purifier element 225 disposed in each lane. According to one embodiment, the parallel lanes have a generally rectangular (including square) profile in the x-z plane and x-y plane. While three lanes are shown, the filter cassette may have more or fewer lanes. The lanes may be sealed from each other such that fluid does not flow between lanes. In other embodiments, openings may be provided so that fluid may flow between the segregated lanes.

According to one embodiment, main body 102 comprises first side cover 210, a second side cover 220, main shell 230 and lane covers 240 (one of which is indicated). Main shell 230, first side cover 210, second side cover 220 and the end caps may be coupled together using fasteners, sonic bonding, interference fits or other coupling mechanism and may cooperate to form the media cavity and parallel lanes. Main shell 230 provides a base 232 extending between outer sidewall 234 and outer sidewall 236 and a set of spaced tension members 238 extending from base 232. Sidewall 234, sidewall 236, side cover 210 and side cover 220 may form the sidewalls of the internal cavity. The main shell sidewalls and tension members 238 may extend a length along the long axis within the cavity to form lane sidewalls. The portions of base 232 between the lane sidewalls (for example, between the outer sidewalls 234/236 and a tension member 238 and between two tension members 238) form integrated lane covers 239 that comprise a grate to allow fluid flow into or out of the corresponding lane. In some embodiments, a support member 252 may run the length of the grate to provide additional support. In some cases support member 252 may be broken into noncontiguous sections to allow different portions of the grate to expand or contract independently under heat for assembly processes. For example, a number of grate slots may extend all the way across an integrated lane cover 239, dividing support member 252 into sections.

One side of base 232 may include features to facilitate coupling of side cover 220 to base 232. According to one embodiment, the base provides a set of side cover mounting surfaces to which a portion of side cover 220 may be thermally bonded or otherwise coupled. On the opposite side, the ends of outer sidewall 234, outer sidewall 236 and tension members 238 distal from base 232 can provide features to facilitate coupling of side cover 210 to main shell 230. The distal end surfaces may, for example, provide side cover mounting surfaces to which a portion of side cover 210 may be bonded or otherwise coupled.

Lane covers 240 span between each main shell sidewall 234/236 and a tension member 238 or between adjacent tension members 238 and may extend the length of the lanes to cover the opposite side of lanes from base 232. Lane covers 240 may comprise an outer frame including frame members 244 that run the length of lane covers 240 and a grate portion spanning between frame members 244. A support member 242 running the length of the grate can provide additional rigidity to a lane cover 240. In some cases, support member 242 may be broken into noncontiguous sections to allow different portions of the grate to expand or contract independently under heat. The openings in lane covers 240 may be the same as or different than the openings in integrated lane covers 239 of base 232.

The surfaces of frame members 244 facing side cover 210 may provide a side cover mounting surface to facilitate coupling of side cover 210. For example, the side cover mounting surfaces may provide a surface to which a portion of side cover 210 may be bonded or otherwise coupled. The lane covers 240 may also include coupling features to facilitate coupling of lane covers 240 to main shell 230 using a snap-fit, interference fit, sonic bonding or according to any suitable coupling mechanism. According to one embodiment, lane covers 240 may include tongues 246 projecting from frame members 244. Tongues 246 are received in corresponding grooves of the respective outer sidewall 234/236 or tension member 238 to capture the lane cover 240 in the proper location.

As depicted in FIG. 2, a lane cover is provided on both an upstream and a downstream side of a purifier element 225 (e.g., in the form of lane cover 240 and integrated lane cover 239). In other embodiments, a lane cover is only provided on one side of purifier element 225. In yet another embodiment, lane covers are not used at all. One advantage to having lane covers to cover both the upstream and downstream side of purifier element 225 is that the purifier element 225 can be supported in both forward and reverse flow, allowing the cassette to function similarly in either flow direction.

Side cover 210 can include side support members 260, a set of spaced ribs 262 that align with tension members 238 and may include a set of spaced ribs 263 that align with media cover support members 242. In the orientation of FIGS. 1A and 1B, the side support members run along the front side (side 123) and rear side (side 124) edges of side cover 210. Side cover 220 can similarly include side support members 270, a set of spaced ribs 272 that align with tension members 238 and a set of spaced ribs 273 that generally align with the support members 252 of the second lane covers.

Flow channels may be disposed along the sidewalls. To this end, side support members 260, spaced ribs 262 and spaced ribs 263 may extend a length and cooperate to form a set of parallel flow channels 264 that are open to lane covers 240 along their length. Similarly, side support members 270, spaced ribs 272 and spaced ribs 273 may extend a length and cooperate to form a set of parallel flow channels 274 that are open to lane covers 239 along their length. The ends of the flow channels may be fluidly coupled to one or more of the inlet, outlet, vent or drain ports.

While two flow channels are depicted per lane, the cassette may have a single flow channel per lane. For example, ribs 263 and 273 may be omitted or there may be a gap between ribs 263/273 and the respective lane cover. Other embodiments may have additional flow channels per lane. The flow channels 264 and 274 may have any desired shape and size and different flow channels on the same side or opposite sides may have different configurations. According to one embodiment, the flow channels may be arced, elliptical or otherwise rounded to create a series of arches along the inside of the side covers that define the channels. Rounded or elliptical shapes can create hoop stress to keep the main body in tensions, maximizing its strength capabilities.

Some of the spaced ribs on each side cover are spaced to align with tension members 238. The inner surface of these ribs may be coupled to the ends of the tension members. For example, the inner surfaces of ribs 272 may be coupled to main shell 230 at the base of tension members 238 and the inner surfaces of ribs 262 may be coupled to the distal end of the tension members 238. Consequently, when the pressure vessel cavity is under pressure, tension members 238 will assert a force on side covers 210 and 220 to reduce or prevent bowing of side covers 210 and 220. The size and configuration of tension members 238 may be selected so that the volumetric deformation of the pressure vessel cavity is less than a desired percentage under expected operating pressures.

Others of the spaced ribs may align with the support members 242 of the lane covers (e.g., spaced ribs 263 align with the support members 242 of lane covers 240 and spaced ribs 273 align with the support members 252 of lane covers 239). The ends of ribs 263 and 273 may be coupled to the respective support member 252 or a gap may remain between the ends of ribs 263 and 273 and the respective support member.

Main body 102 can comprise a series of hoop-like structures to better distribute forces. According to one embodiment, transitions in internal surfaces running parallel to the lanes are curved. Thus, for example, corners 280 of side cover 210, corners 290 of side cover 220 and the flow passages are curved about axes parallel to the lanes. Furthermore, the main shell sidewalls 234 and 236 have curved exteriors and side covers 210 and 220 have curved corners at the transitions from side 125 to side 124 and side 123 and the transitions from side 126 to side 124 and side 123.

The hoop-like structures about the lanes cause pressure in the chamber to result at least in part in hoop stress (stress normal to the pressure in a direction tangential to the curvature) and to distribute the stress. The effect can be to create tension in side cover 210 and side cover 220 over the center lane and to tension in sidewalls 234 and 236 along the center axes of the side walls. The configuration of the hoop like structures can be selected so that the von Mises stress are less than the yield stress of side cover 210, side cover 220, sidewall 234 and sidewall 236, as well as the tension members, filter covers and other features and the mating locations that experience such stress when the main body is pressurized.

As discussed above, the lanes can provide purifier element holding areas to hold purifier elements 225. The purifier elements 225 can be pleat packs of porous polymeric membrane pleated with the length of the membrane pleat parallel to the long axis of the cassette. The pleat tips may be oriented so that the pleat tips on one side point at side cover 210 while the opposite pleat tips are oriented to point at side cover 220 with the pleat tips abutting the respective lane cover. In this arrangement, one set of pleat tips faces the upstream portion of the cavity and the other set of pleat tips faces the downstream portion of the cavity. The purifier elements 225 may be separate purifier elements or each of the purifier elements may be portions of the same continuous pleat pack such that, for example, the last pleat of one purifier element 225 transitions into the first pleat of the next purifier element 225 and the last pleat of that purifier element transitions into the first pleat of the next purifier element 225 and so on. The pleats of each purifier element can be formed from a single membrane or multiple membranes formed from the same or different materials. Preferably the pleats are compressed together and form a generally planer rectangular entrance interface on the upstream side and a generally planer rectangular exit interface on the downstream side. The amount of pleat compression of the membrane in a lane for a given area of membrane can be selected to optimize a desired pressure drop versus flow rate. In some embodiments, the lane cover (e.g., lane cover 240) can be contoured to increase the surface area of the pleat pack exposed, which may take on the contoured shape.

Figure 3:
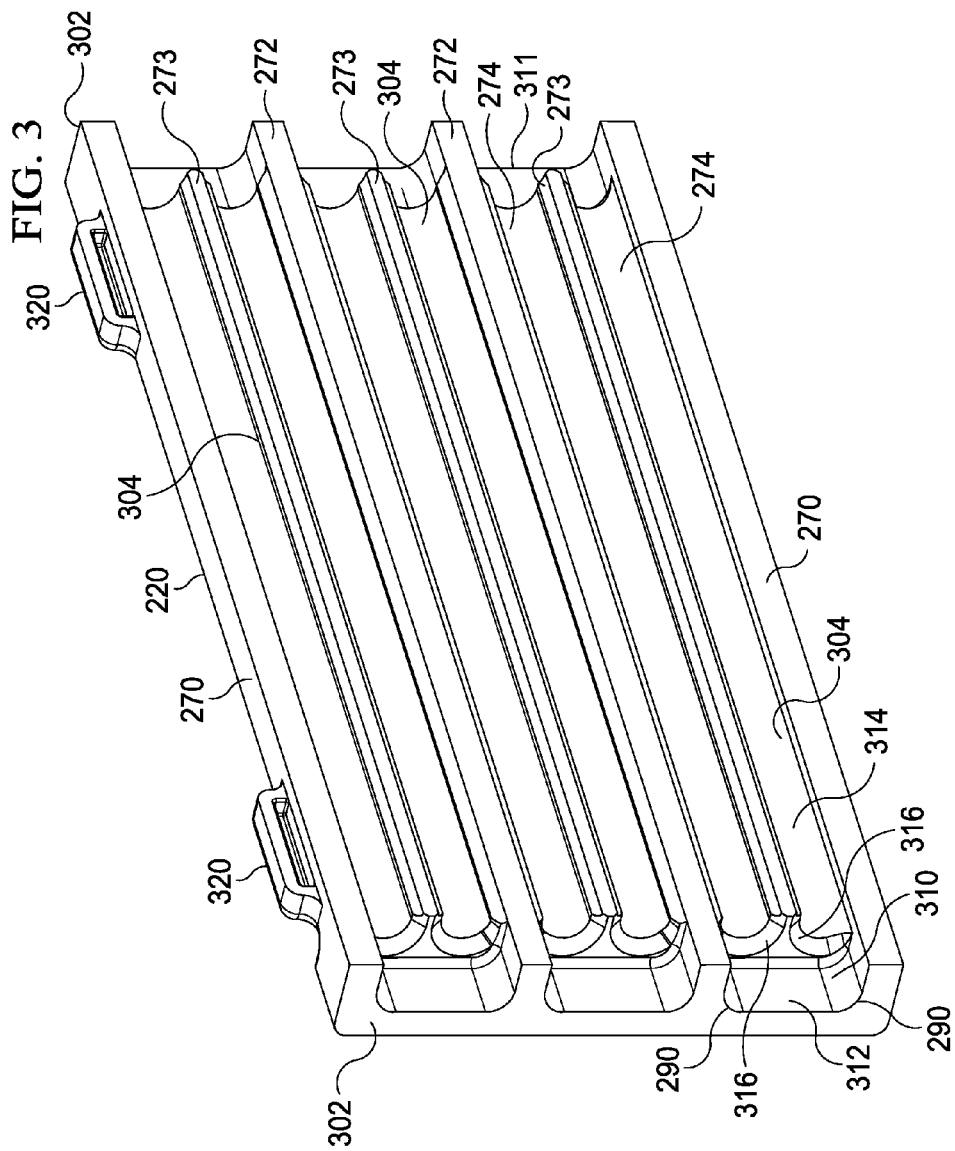
FIG. 3 is a diagrammatic representation of one embodiment of a side cover.

FIG. 3 is a diagrammatic representation of one embodiment of side cover 220, which may be identical to side cover 210 or may be different. Side cover 220 comprises side support members 270, intermediate ribs 272 and intermediate ribs 273. The inner surfaces of side support members 270, intermediate ribs 272 and intermediate ribs 273 may provide mounting surfaces that can be bonded or otherwise coupled to other components. Side cover 220 may also include end surfaces 302 that can provide end cap mounting surfaces to which an end cap may be bonded or otherwise coupled.

Side support members 270 and spaced intermediate ribs 272 may form a set of primary flow channels 304 aligned with the lanes and spaced intermediate ribs 273 may form as set of sub-channels 274 within the primary flow channels. A primary flow channel 304 may comprise a plenum area at one or both ends (e.g., plenum area 310 and plenum area 311). The plenum area 310 can be an area having a greater cross-sectional area than sub-channels 274 (e.g., when viewed from the end) and can act to distribute fluid to sub-channels 274 with reduced loss and also services to reduce pressure loss effects due to bonding flash or misalignment from coupling the end caps to the main body. In the embodiment depicted, plenum area 310 has a generally rectangular cross-section (viewed from the end) with rounded corners 290, while the sub-channels 274 have a semi-circular profile.

Increasing the entrance cross-section of plenum area 310 can decrease pressure drop caused by side cover 220. For example, using a lane cover as a reference, a configuration in which inner surface 312 of plenum area 310 is 3 millimeters further away than the apex of inner surface 314 of sub-channel 274 from the lane cover provides decreased pressure loss compared to a configuration in which inner surface 312 and the apex of inner surface 314 are the same distance from the lane cover. Additionally, shaping the transitions 316 into sub-channels 274 may reduce pressure drop. Accordingly, a transition that comprises a fillet, chamfer or other shaped transition 316 between plenum area 310 and secondary flow passages 274 may exhibit less pressure drop than a sharp corner, though corners may be used in some embodiments.

Also, as illustrated in FIG. 3, side cover 220 may also include tabs 320 projecting from the front side outer surface of a side support member 270. Tabs 320 may include a groove, opening or other feature to accommodate labels, handles or other components as discussed below. Furthermore, tabs 320 of cover 220, acting with corresponding tabs on media cover 210 (not shown), can provide feet so that a filter cassette can be placed on a flat surface with the ports facing up without tipping over.

Figure 4:
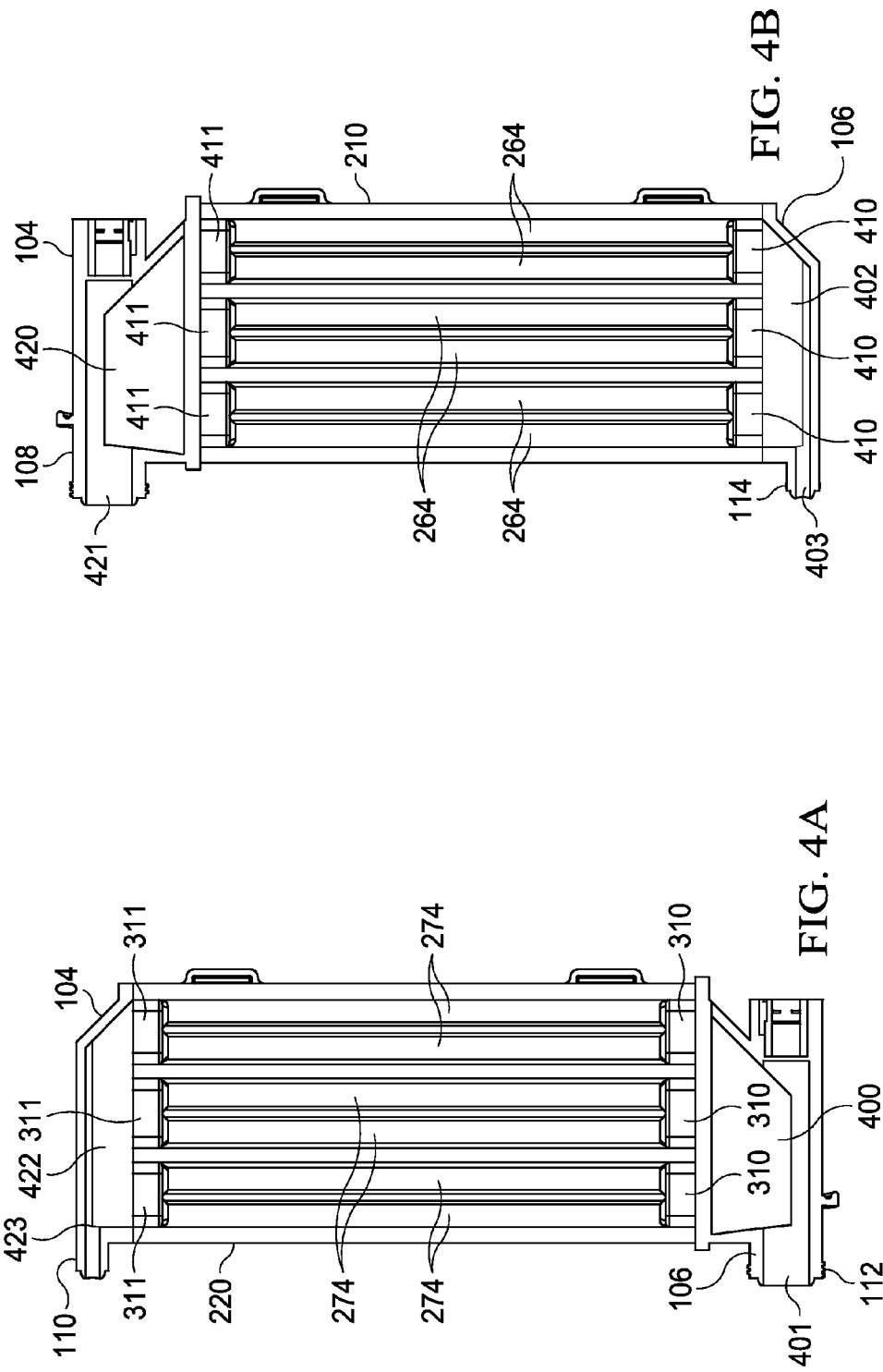
FIGS. 4A-4B are diagrammatic representations of one embodiment of a side cover and end cap.

FIGS. 4A and 4B are diagrammatic representations of a cross-section of one embodiment of side cover 220 (FIG. 4A) and side cover 210 (FIG. 4B) coupled to end cap 104 and end cap 106. End cap 106 may include end cap flow channel 400 that fluidly couples a port chamber 401 to plenums 310 at one end of sub-channels 274 and a second end cap flow channel 402 that fluidly couples plenums 410 to port chamber 403 at one end of sub-channels 264. End cap 104 can include a flow channel 420 that fluidly couples a port chamber 421 to plenums 411 at the other end of sub-channels 264 and a second flow channel 422 that fluidly couples plenums 311 to port chamber 423. It can be noted from FIGS. 4A and 4B that the end caps and side covers may be identical parts as depicted. In other embodiments, the two side covers may have different features or be asymmetrical such that they are not interchangeable.

Referring to FIG. 5, a cutaway view of one embodiment of filter cassette 100 having end cap 104 and end cap 106 bonded or otherwise coupled to the ends of side cover 210, side cover 220 and main shell 230 (FIG. 2) to form a sealed housing. End cap 104 has an inner wall 512 that can act as an end wall at one end of the lanes and end cap 106 can include an inner wall 512 that can act as an end wall at another end of the lanes. The ends of the tension members 238 and the main shell sidewalls may be sealed to the end walls 506 and 512. Furthermore, the ends of the filter membranes may also be sealed, for example, by potting with a polymeric resin then bonding to the end walls 506 and 512, so that that there is no space between the ends of the filter membranes and the end walls through which fluid can flow.

End cap 104 includes a shaped cavity forming channel 420 and port chamber 421 and a shaped cavity comprising flow channel 422 and port chamber 423. Port chamber 421 in the embodiment depicted is generally cylindrical and can be tapered to be wider at the port opening. The interface of port chamber 421 to flow channel 420 may be offset relative the interface between flow channel 420 and plenums 411. Accordingly, flow channel 420 may be angled outward travelling from port chamber 421 to plenums 411. Flow channel 420 may have a constant cross-sectional area that is the same as the cross-sectional entrance area of plenum 411. In other embodiments, flow channel 420 may have a varying cross-sectional area and may have a cross-sectional area that is different than the cross-sectional area of plenum 411. In yet another embodiment, flow channel 420 may be divided into multiple internal channels.

End cap 106 includes a shaped cavity forming channel 400 and port chamber 401 and a shaped cavity comprising flow channel 402 and drain port chamber 403. Port chamber 401 in the embodiment depicted is generally cylindrical and can be tapered to be wider at the port opening. The interface of port chamber 401 to flow channel 400 may be offset relative the interface between flow channel 400 and plenums 310. Accordingly, flow channel 400 may be angled outward travelling from port chamber 401 to plenums 310. Flow channel 400 may have a constant cross-sectional area that is the same as the cross-sectional entrance area of plenum 310. In other embodiments, flow channel 400 may have a varying cross-sectional area and may have a cross-sectional area that is different than the cross-sectional area of plenum 310. In yet another embodiment, flow channel 400 may be divided into multiple internal channels. End cap 106 may further include a shaped cavity forming flow channel 402 and drain port chamber 403.

In the example of FIG. 5, a liquid supply system is configured such that port 112 is the inlet port, port 108 (FIG. 1A) is the outlet port, port 114 (FIG. 1A) is an outlet drain port and port 110 is an inlet vent port. In operation, fluid can enter the filter cassette through port 112, be directed from port chamber 401 to plenums 310 by flow channel 400 and be distributed to primary flow channels 304 and/or sub-channels 274. The fluid flows through lane covers 239, through the purifier element 225 in a pleat tip-to-tip direction and through lane covers 240 to primary flow channels and/or sub-channels 264 in side cover 210. Thus, the filter cassette may provide efficient normal flow filtration. The fluid from flow in side cover 210 can be combined in channel 420 and outlet chamber 421. The fluid exits chamber 421 through the outlet port. Gas in the fluid may rise to the vent port (port 110) and, when pressure is removed from the filter cassette, can be drained out the drain port and the outlet port (e.g., at startup) or inlet port. The various flow paths are configured to avoid dead space—that is, space where a process fluid can stagnate. Thus, the filter cassette can provide increased cleanliness.

With respect to venting, main body 102 can be formed of a material such that the interior surfaces are more philic to gas than the purifier element—or, put another way, the purifier element can be selected to be more phobic to gas than the housing material—to promote affinity of gas to the housing sidewalls. By way of example, but not limitation, the difference in surface energy between the side cover 220 material and purifier element 225 can be greater than 10 dynes/cm2. Thus, there may be a surface energy gradient between the purifier element and the sidewalls. Consequently, as fluid washes over the interior of a side cover 220, gas in the fluid will be attracted to the sidewall. The gas is therefore more likely to rise to the filter vent than pass through the purifier element. Accordingly, the inlet vent may be located at the highest point on the upstream side of the filter to help ensure that gas does not get trapped.

In the embodiment of FIG. 5, the flow channels are configured so that flow passes through each pleat pack in parallel. In other embodiments, however, flow channels can be configured so that fluid flows through the purifier elements 225 in series (e.g., for example through geometry in the side covers and/or end caps). Accordingly, different purifier elements can be placed in each lane such that each lane serves a purification purpose (e.g., pre-filtration, degassing, ion exchange, polishing filtration, etc.).

Using an example of a media cavity with three lanes (e.g., a first lane, second lane, third lane), an inlet flow channel can be connected to a distribution channel on a first side of the first lane. Fluid can flow through the distribution channel and through the purifier element in the first lane. The flow channels on the second side of the first lane can direct flow to the second lane and the fluid can flow through the purifier element in the second lane back to the first side. A distribution channel on the first side of the filter can direct fluid received from the second lane to the third lane. Fluid can flow through the purifier element in the third lane to a distribution channel connected to the outlet port. In another embodiment, the end caps may include flow channels to direct fluid from one lane to the next in a serial manner. In yet another embodiment, multiple types of purifier elements may be stacked in a lane (for example, two or more different types of pleat packs) so that multiple types of can be performed serially in a single lane (e.g., in the embodiment of FIG. 5, a coarse filtration pleat pack can be located proximate to cover 239 and a fine filtration pleat pack can be located proximate to cover 240 in a lane), even if fluid is directed to the lanes in parallel.

Figure 6:
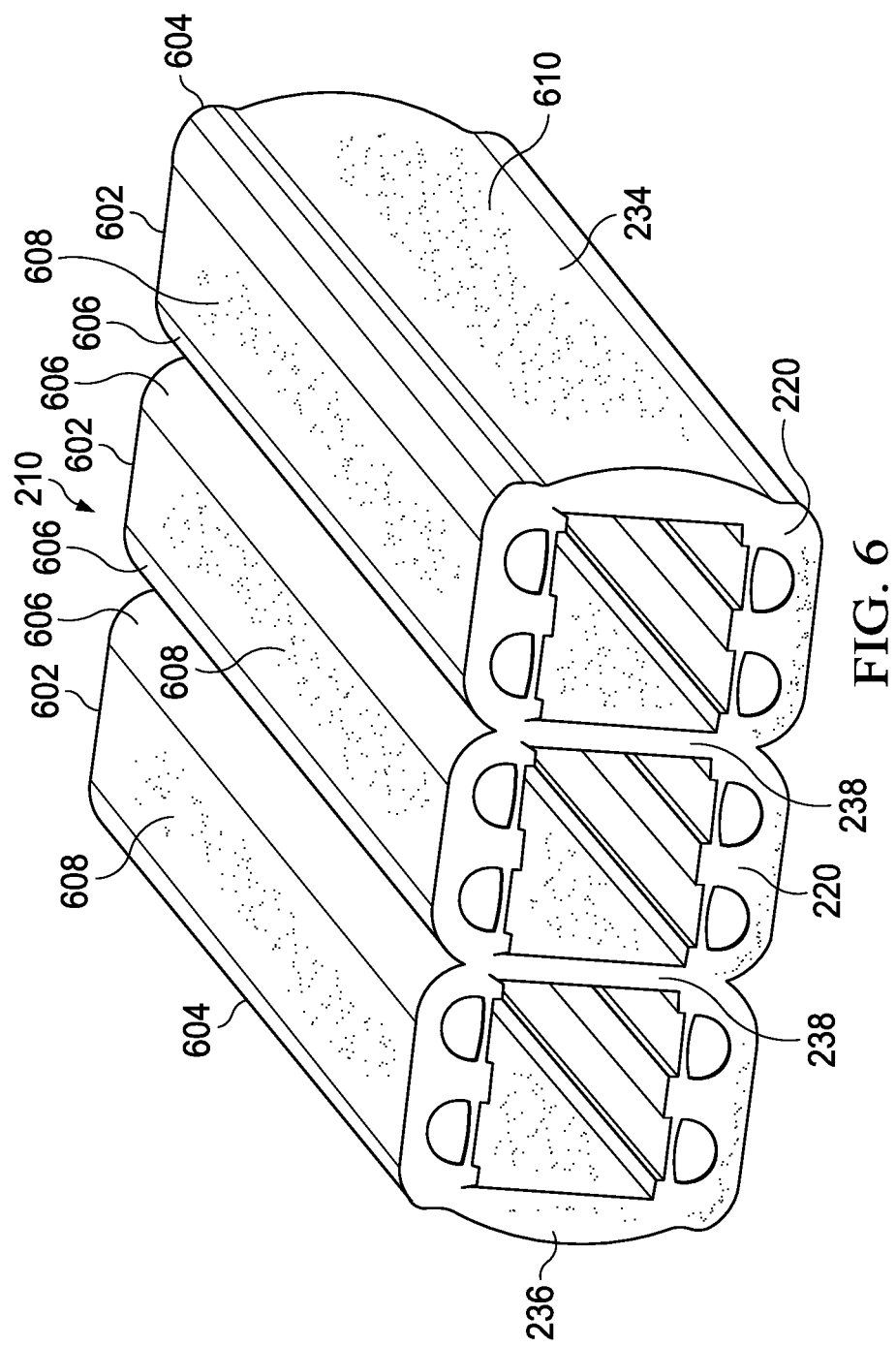
FIG. 6 is a diagrammatic representation of one embodiment of stress in a cassette.

During filtration, the filter cassette will be under pressure. Embodiments of filter cassettes may incorporate features to prevent or minimize deformation under expected operating pressures (with a safety factor). Turning to FIG. 6, FIG. 6 is a diagrammatic representation of one embodiment of a main body 102 showing an example distribution of stress along with additional stress distribution features.

As discussed above, embodiments may provide a hoop-like structure about each lane. To this end, one embodiment of a side cover 210 may have a lane portion 602 corresponding to each lane. Each lane portion 602 may comprise curved exterior corners. The outermost lane portions 602, for example, include curved end corners 604 such that the outer surface transitions from one side to an adjacent side are curved. Furthermore, the outer surface may be curved inward at corners 606 between adjacent lane portions 602 (e.g., to create parallel creases generally aligned with tension members 238). Thus, at each exterior corner of side cover 210 the inner surface may be curved (e.g., due to the curvature of the flow channels or corners 280 (as shown in FIG. 2)) and the outer surface may be curved.

Providing hoop-like structures can provide a desired stress profile. As depicted in FIG. 6, while there may be some localized areas of increased stress, the calculated von Mises stresses in side cover 210 are generally highest proximate to the center axis of each lane portion 602, as indicated by areas of increased stress 608, and the von Mises stresses in each main shell sidewall are generally highest along the center axis of each main shell sidewall, as indicated by area of increased stress 610 in sidewall 234 (and similarly in sidewall 236). The von Mises stresses remain below the yield strength of main body 102, with a safety factor.

Figure 7:
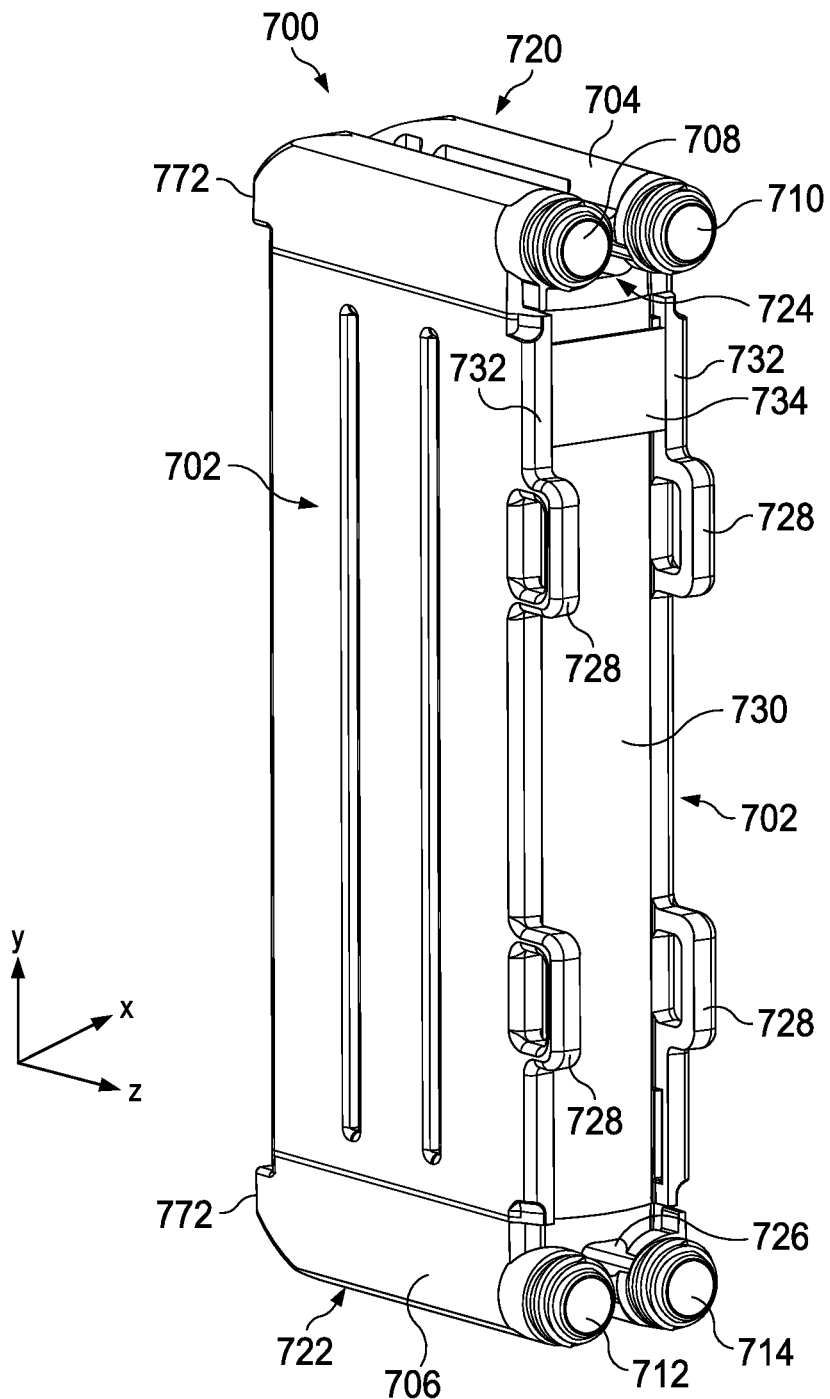
FIG. 7 is a diagrammatic representation of another embodiment of a cassette.

FIG. 7 is a diagrammatic representation of another embodiment of a filter cassette 700. Filter cassette 700 has a cassette housing 702 having a generally rectangular profile, a first end cap 704 and a second end cap 706. Cassette housing 702 can provide an interior cavity in which one or more purifier elements are disposed. As discussed above, the interior cavity may be segregated into a set of lanes with a generally rectangular pleat pack or other purifier element disposed in each lane.

End cap 704 and end cap 706 can provide ports (e.g., one or more of first port 708, second port 710, a third port 712 and fourth port 714) that are fluidly coupled to the interior cavity. Depending on the configuration of filter cassette 700, any of the one or more ports may act as an inlet port, an outlet port, a vent port, drain port or another type of port (and more or less ports may be present). As depicted in FIG. 7, the port fittings have port fitting exterior threads to connect to a manifold or other supply. According to one embodiment, the threaded port may be multi-start threads as discussed below.

As depicted, the ports are open in the x-y plane toward the front of cassette 700 and the primary flow path through the ports is parallel to the z axis. In some cases, the ports may be placed so that the filter cassette can be reversed (e.g., the filter cassette can be mated to a manifold with end 720 as the top and end 722 as the bottom or vice versa).

The end caps may include features such as alignment holes, rails, guide channels or the like to engage with complementary features on a manifold assembly to help ensure proper placement of the filter cassette. In the embodiment of FIG. 7, end cap 704 includes guide slot 724 and end cap 706 includes guide slot 726 open to the front of cassette 700. Guide slots 724/726 can receive corresponding guide arms of a manifold to vertically position and hold cassette 700.

A cassette may include a carrying handle that connects to the same side of the cassette as to which the ports are open. Cassette 700, for example, includes handle connection members 728 to allow connection of a removable handle from the rear of the cassette. This arrangement allows a user (such as a human user or robot) to carry the cassette with all the ports facing up. According to one embodiment, handle connection members may comprise tabs extending rearward from the cassette at the side edges and defining openings to receive protrusions from a removable handle. In another embodiment, handle connection features may be integrated in surface 730. In yet another embodiment, a handle may be integrated. In another embodiment, the handle connection features may be incorporated in end caps 704 and 706, side covers or elsewhere.

A cassette may also include features to allow the cassette to be conveniently carried and stored. According to one embodiment, the cassette may include flat surfaces on the opposite side of the cassette from the port openings or elsewhere to allow the cassette to be placed on a flat surface. Cassette 700, for example, comprises feet 772 extending from the front side of end cap 704 and end cap 706. Thus, cassette 700 can be placed on a storage shelf with the ports facing up and without cassette 700 falling over or rolling away.

Cassette 700 may also include a label system. While adhesive-based label may be used, such labels often peel when attached to PFA devices, especially for high temperature applications. According to one embodiment, cassette 700 can include one or more label holders 732. Label holder 732, according to one embodiment, can comprise a tab or other extension extending rearward proximate to the side edges of the cassette or elsewhere and defining a set of grooves facing each other. Label 734 may be a snap-fit label that fits in the grooves, and can also be made so that the label is inserted during the cassette assembly operation, if desired. The label may be made of a plastic material, metal or other material. For example, the label may comprise colored PTFE or PFA material laser cut, molded, direct injected, etc. so that it contrasts with the filter cassette and makes the text highly visible. Color-coding the labeling makes it easy for users to distinguish between devices. For example, one color of label can be used to label the 15 nanometer filter while another color label can be used to label the 10 nanometer filter. For filter cassettes that are used in applications that require an "all Teflon" designation, the PTFE material maintains this designation for the filter cassette. Alternate materials can be used if desired. A label system may be used in the embodiment of FIGS. 1A and 1B, and can, for example, be implemented on side 123 or 124. Labels can also be implemented in other embodiments of purifier cassettes.

Figure 8B:
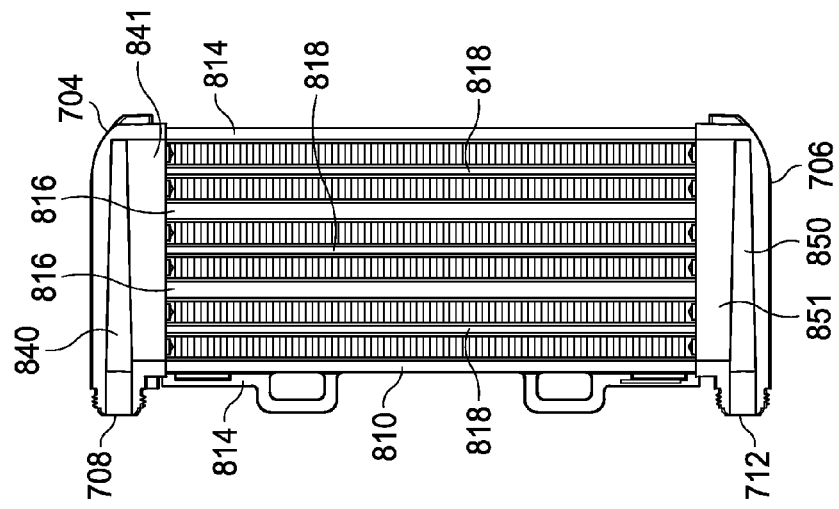
FIGS. 8A-8B are diagrammatic representations of another embodiment of a side cover and end cap.
Figure 8A:
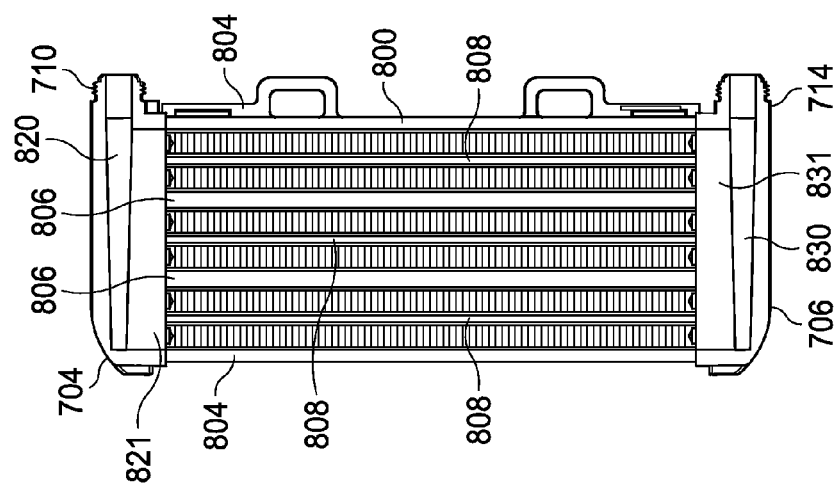

FIGS. 8A-8B are diagrammatic representations of a cross-sections of one embodiment of cassette 700 depicting side cover 800 and side cover 810 coupled to end caps 704 and 706. It may be noted that the two sides are symmetric. In the embodiment of FIGS. 8A and 8B, side cover 800 may include side support members 804 that may be bonded to or otherwise coupled to a set of sidewalls, spaced intermediate ribs 806 that may be coupled to tension members and spaced intermediate ribs 808 that may be coupled to a lane cover (in some cases not all the ribs are coupled to the lane cover). The side support members 804 and spaced ribs 806 may form flow channels corresponding to each lane in the filter housing and spaced ribs 808 further divide the primary flow channels into smaller flow channels. Side cover 810 may include side support members 814 that may be bonded to or otherwise coupled to a set of sidewalls, spaced intermediate ribs 816 that may be coupled to tension members and spaced intermediate ribs 818 that may be coupled to a lane cover. The side support members 814 and spaced ribs 816 form flow channels corresponding to each lane in the filter housing and spaced ribs 818 that may further divide the lanes into smaller flow channels. In the embodiments of FIGS. 8A-8B, however, plenums are not provided in the side covers.

With reference to FIG. 8A, end cap 704 may include a shaped cavity that provides a port chamber 820 and a flow channel 821 connecting the port chamber 820 to a first end of the distribution flow channels. End cap 706 may include a shaped cavity that provides a port chamber 830 and a flow channel 831 that connects port chamber 830 to the second end of the distribution flow channels defined by side cover 800. With reference to FIG. 8B, end cap 704 provides a second shaped cavity that provides a port chamber 840 and a flow channel 841 that connects port chamber 840 to the first end of the distribution flow channels defined by side cover 810. End cap 706 provides a second shaped cavity that provides a port chamber 850 and a flow channel 851 that connects port chamber 850 to the first end of the distribution flow channels defined by side cover 810. The port chambers may be sloped such that the top surface of port chamber 820 slopes upward toward the opening of port 710, the bottom surface of port chamber 830 slopes downward toward the opening of port 714, the upper surface of port chamber 840 slopes upward toward the opening of port 708 and the bottom surface of port chamber 850 slopes downward toward the opening of port 712. For port chambers 820 and 840, this means that gas reaching the port chamber can exit the respective ports.

Figure 9:
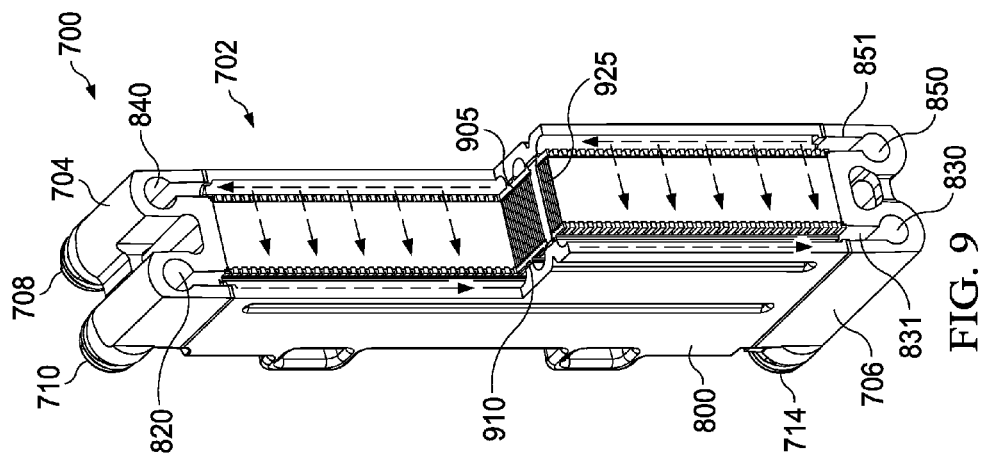
FIG. 9 is a diagrammatic representation of flow through another embodiment of a cassette.

FIG. 9 is a diagrammatic representation of one embodiment of flow through filter cassette 700 having main body 702, end cap 704 and end cap 706. In this example, a supply system is configured such that port 712 (FIG. 7) is an inlet port, port 714 is an outlet port, port 708 is an upstream (inlet) side vent port and port 710 is a downstream (outlet) side vent port. In operation, fluid flows into port chamber 850 through the port opening and is directed to upstream flow distribution channels disposed on the side cover 810 via flow channel 851, through a lane cover 905, through a purifier element 925 and through a lane cover 910. Flow channel 831 connects downstream flow channels disposed on side cover 800 with port chamber 830 so that fluid may flow into port chamber 830 and exit filter cassette 700 via port 714.

As discussed above, the side covers may be more philic to gas than purifier element 925. Consequently gas bubbles may be attracted to the side covers. The upstream fluid distribution channels may direct gas to port chamber 840 and downstream fluid distribution channels may direct gas to port chamber 820. The port chambers 840 and 820 may be drafted so that the gas flows to the respective port opening and out of cassette 700.

Figure 10:
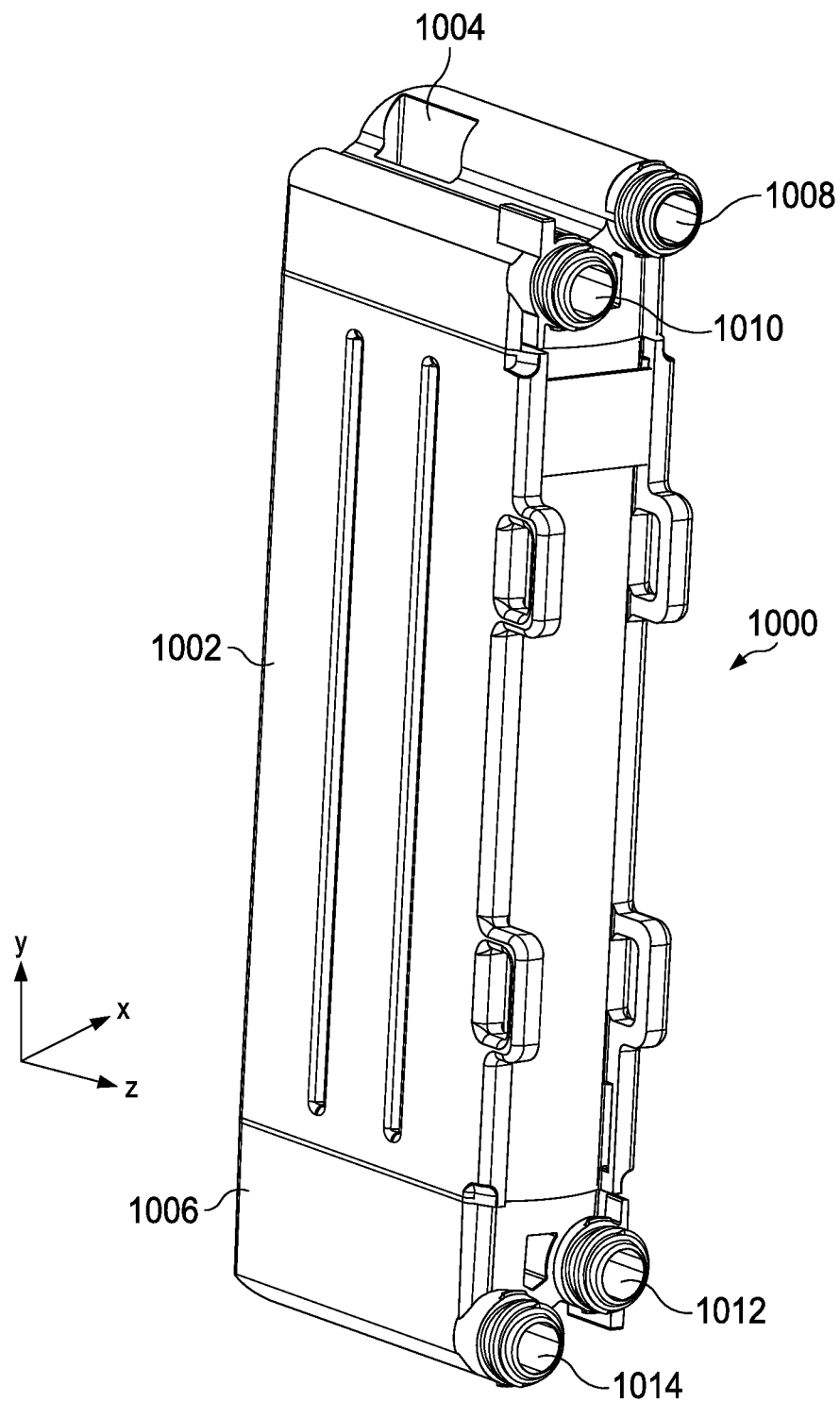
FIG. 10 is a diagrammatic representation of another embodiment of a cassette.

FIG. 10 is a diagrammatic representation of another embodiment of a filter cassette 1000 having a filter cassette body 1002, end cap 1004 and end cap 1006. Filter cassette 1000 may be similar to filter cassette 700 (FIG. 7). As depicted in FIG. 10, however, end cap 1004 has ports 1008 and 1010 that are offset along both the x and y axes from each other and end cap 1006 has ports 1012 and 1014 that are offset along both the x and y axes from each other. Offsetting the ports along the y axis may allow the ports to be placed closer together in the x direction, thus allowing the overall width of the filter cassette 1000 (size in the x direction) to remain smaller.

Figure 11:
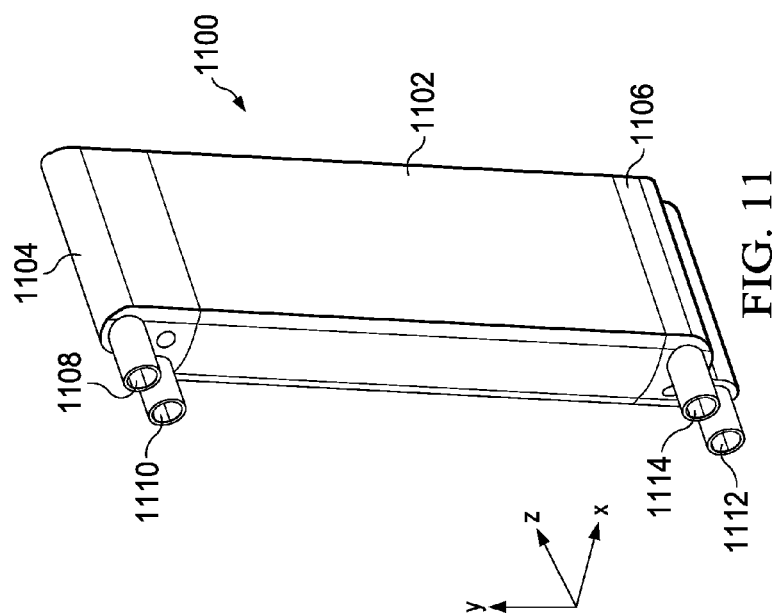
FIG. 11 is a diagrammatic representation of another embodiment of a cassette.

FIG. 11 is a diagrammatic representation of another embodiment of a filter cassette 1100. Filter cassette 1100 has a main body 1102 having a generally rectangular profile, a first end cap 1104 and a second end cap 1106. Main body 1102 can provide an interior cavity in which a purifier element is disposed. End cap 1104 and end cap 1106 can provide ports (e.g., one or more of first port 1108, second port 1110, third port 1112 and fourth port 1114) that are fluidly coupled to the interior cavity. Depending on the configuration of filter cassette 1100, any of the one or more ports may act as an inlet port, an outlet port, a vent port, drain port or another type of port. In the embodiment of FIG. 11, the ports are not threaded.

Figure 12:
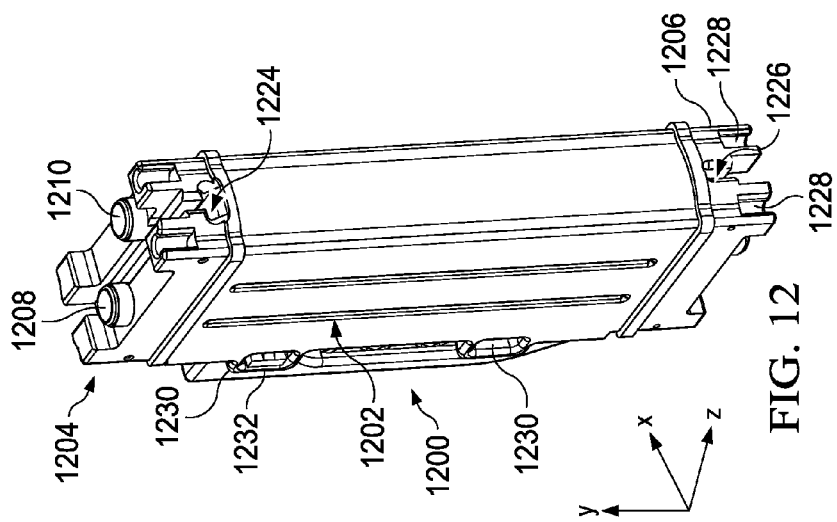
FIG. 12 is a diagrammatic representation of another embodiment of a cassette.

FIG. 12 is a diagrammatic representation of another embodiment of a filter cassette 1200. Filter cassette 1200 has a main cassette housing 1202 having a generally rectangular profile, a first end cap 1204 and a second end cap 1206. Cassette housing 1202 can provide an interior cavity in which a purifier element is disposed. End cap 1204 and end cap 1206 can provide ports (e.g., one or more of first port 1208, second port 1210, a third port and a fourth port) that are fluidly coupled to the interior cavity. Depending on the configuration of filter cassette 1200, any of the one or more ports may act as an inlet port, an outlet port, a vent port, drain port or another type of port.

The end caps may include features such as alignment holes, rails, guide channels or the like to engage with complementary features on a manifold assembly to help ensure proper placement of the filter cassette. In the embodiment of FIG. 12, end cap 1204 includes guide slot 1224 and end cap 1206 includes guide slot 1226 open to the front of cassette 1200. Guide slots 1224/1226 can receive corresponding guide arms of a manifold to vertically position and hold cassette 1200. Furthermore, end cap 1204 or end cap 1206 may include vertical snap fit slots 1228 to receive pins on the manifold to horizontally position and secure cassette 1200.

Cassette 1200 may further include handle connection members 1230. According to one embodiment, handle connection members may comprise tabs extending rearward from the cassette at the side edges. The tabs define openings that can receive protrusions from a removable handle 1232.

Figure 13A:
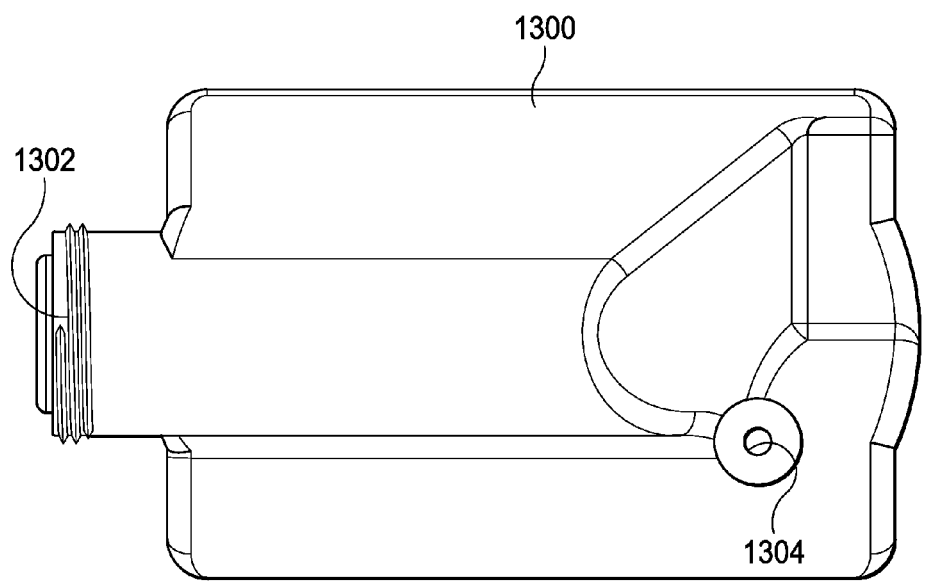
FIGS. 13A-13B are diagrammatic representations of an embodiment of an end cap.
Figure 13B:
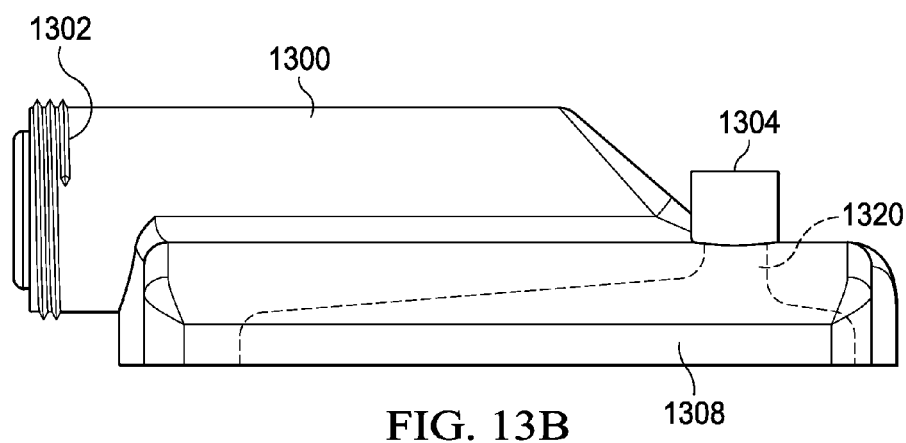

FIGS. 13A-13B are diagrammatic representations of another embodiment of an end cap 1300. End cap 1300 may include a primary port 1302 that is open in a first plane (e.g., an x-y plane) and a secondary port 1304 open in a second plane (e.g., an x-z plane). According to one embodiment, primary port 1302 may act as an inlet or outlet configured as discussed above or otherwise configured and secondary port 1304 may act as a vent or drain. End cap 1300 may further define a shaped cavity 1308 that is in fluid communication with the interior fluid distribution channels and is shaped so that all interior surfaces defining cavity 1308 will direct gas bubbles to channel 1320 and out port 1304 such that port 1304 acts as a vent port or direct fluid to port 1304 such that port 1304 acts as a drain.

Figure 14:
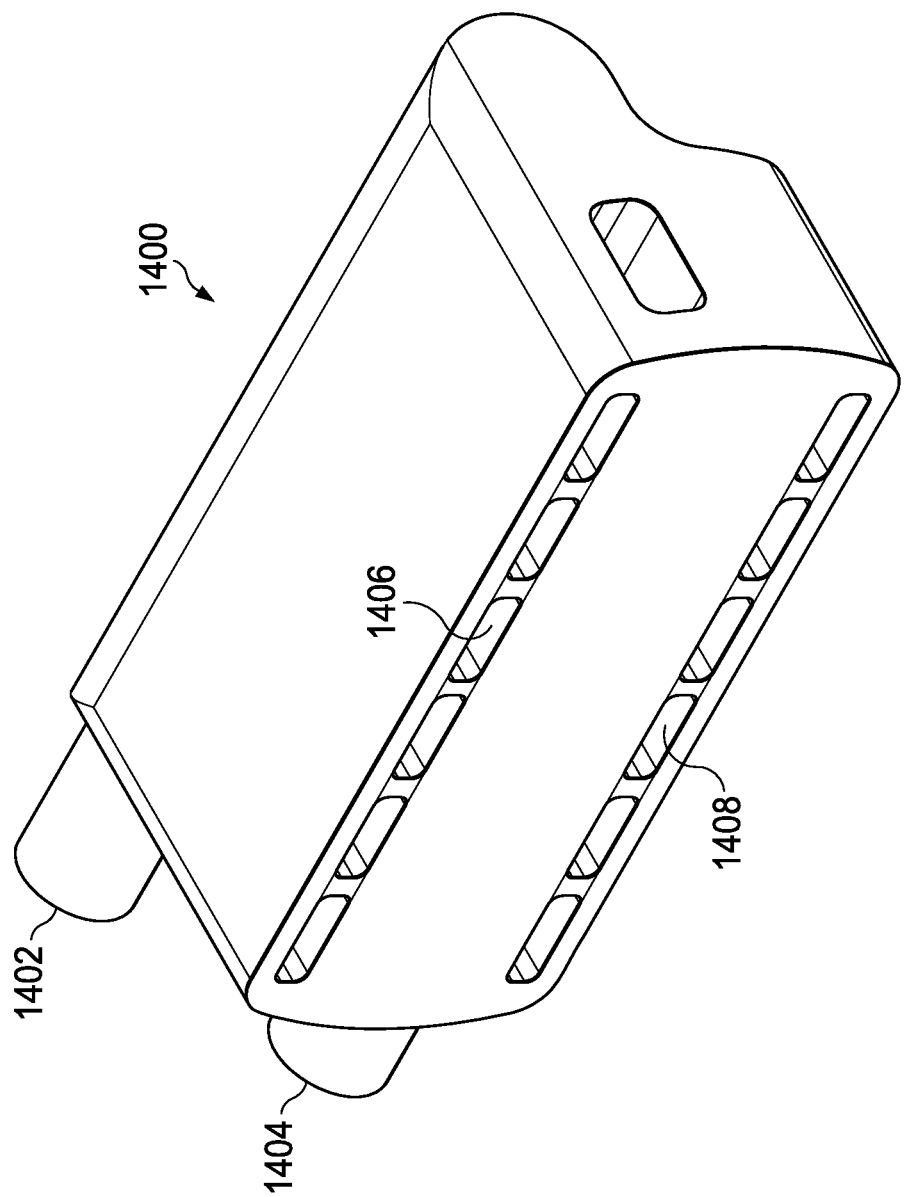
FIG. 14 is a diagrammatic representation of an embodiment of an end cap.

FIG. 14 is a diagrammatic representation of another embodiment of a cassette end cap 1400. End cap 1400 comprises ports 1402 and 1404. Fluid entering port 1402 is distributed to a series of end cap flow channels 1406 internal to end cap 1400. Fluid may be received through end cap flow channels 1408 internal to end cap 1400 and combined in end cap 1400 prior to exiting port 1404. The end clap flow channels 1406 and 1408 may align with corresponding flow distribution channels defined in the filter body and may be arranged to distribute fluid in series or in parallel. The end cap flow channels may align, for example, plenums, primary flow channels or sub-channels and may be used with a variety of port designs.

FIGS. 15A-15D are diagrammatic representations of another embodiment of an end cap 1500. End cap 1500 comprises a base 1502 that can be coupled to a cassette main body, a first port fitting 1510 and a second port fitting 1520. Although two port fittings are shown, devices with one port fitting opposing ports or more than two port fittings may be used. The port fittings may be externally threaded as shown by threads 1512 and 1522. The port fittings may be threaded in the same or opposite directions.

The port fittings may include alignment features that, in cooperation with corresponding alignment features of a connection system, may facilitate alignment of the port fitting with the connection system. The alignment features may be configured so that the start of threads 1512 and 1522 cannot engage corresponding threads of the connection system unless the corresponding features of the fitting and connection system align or mate.

Figure 21A:
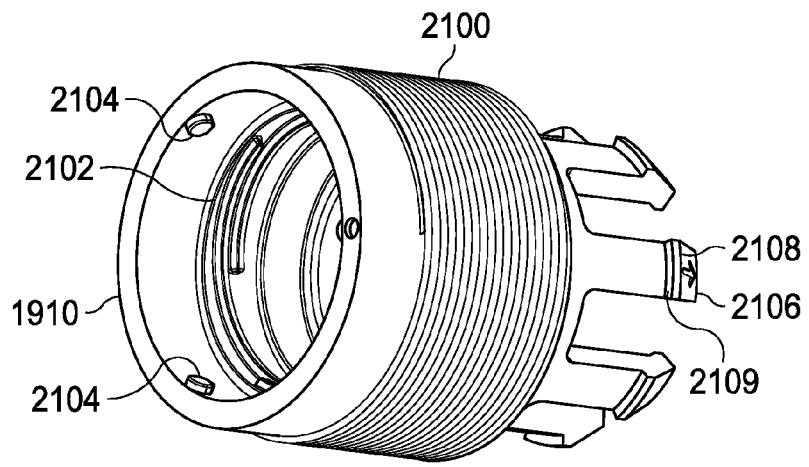
FIG. 21A is a diagrammatic representation of one embodiment of a connection nut.

According to one embodiment, for example, a set of alignment features may include notches that align with inner projections of a connection nut (e.g., inner projections 2104 of connection nut 1910 of FIG. 21A). To this end, in the embodiment illustrated, an annular alignment rib extends radially outward from each port fitting as shown by port ribs 1514 and 1524. Each alignment rib may include spaced alignment notches at the periphery of the rib. For example, rib 1514 includes spaced notches 1516 and rib 1524 includes spaced notches 1526. The spaced alignment notches may be arranged so that an alignment features in a connection system may pass through the notches only when threads 1512 and 1522 are properly aligned with threads of the connection system.

The port rib 1514 may be set back from the start of port fitting external threads 1512 a selected distance such that the start of threads 1512 cannot engage corresponding threads of the connection system unless the alignment features pass through alignment notches 1516. Similarly, port rib 1524 may be set back from the start of port fitting external threads 1522 a selected distance such that the start of threads 1522 cannot engage corresponding threads of the connection system unless the alignment features pass through notches 1526. While the example of corresponding projections and notches is used, any suitable alignment features may be employed.

End cap 1500 may have an alignment opening 1530 to accept a drive handle alignment insert. Alignment opening 1530 may be axially aligned with port 1510 or may be otherwise located. Alignment opening 1530 may form a keyhole so that the handle may only fit in alignment opening 1530 in a desired orientation.

Figure 15A:
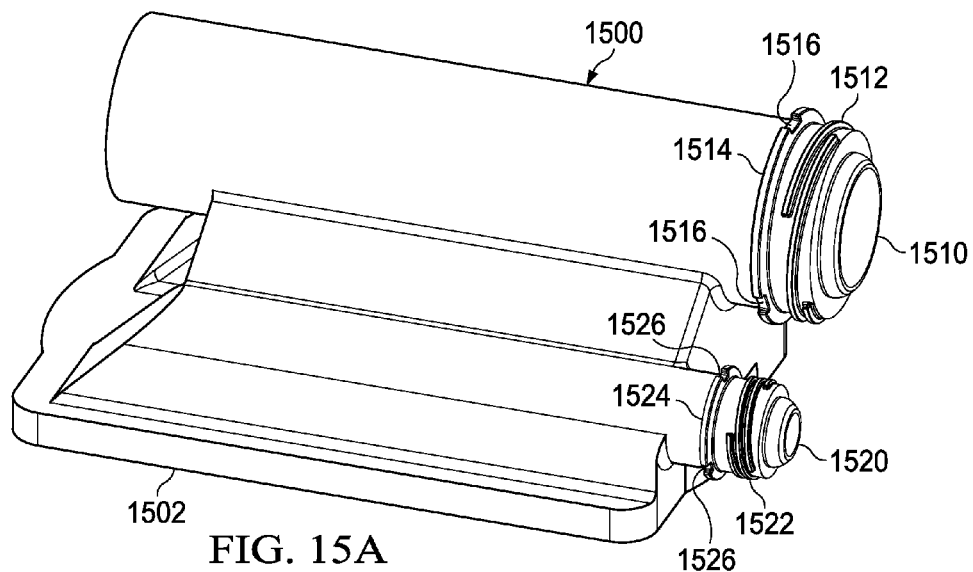
FIGS. 15A-15D are diagrammatic representations of an embodiment of an end cap.
Figure 15B:
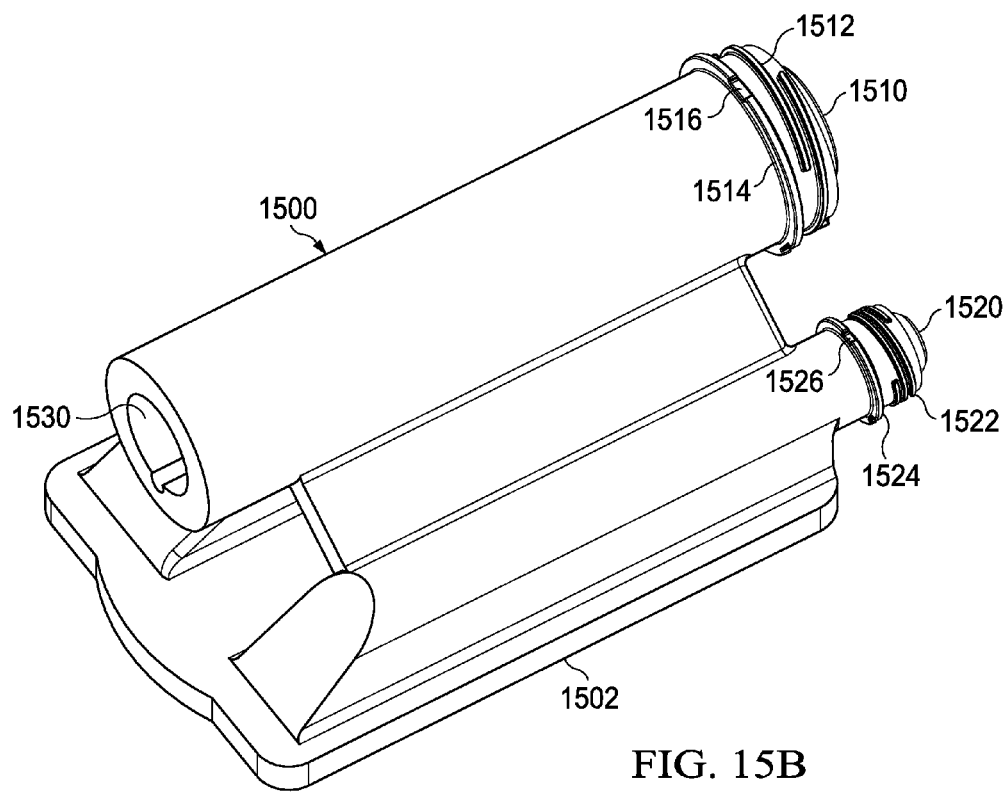
Figure 15C:
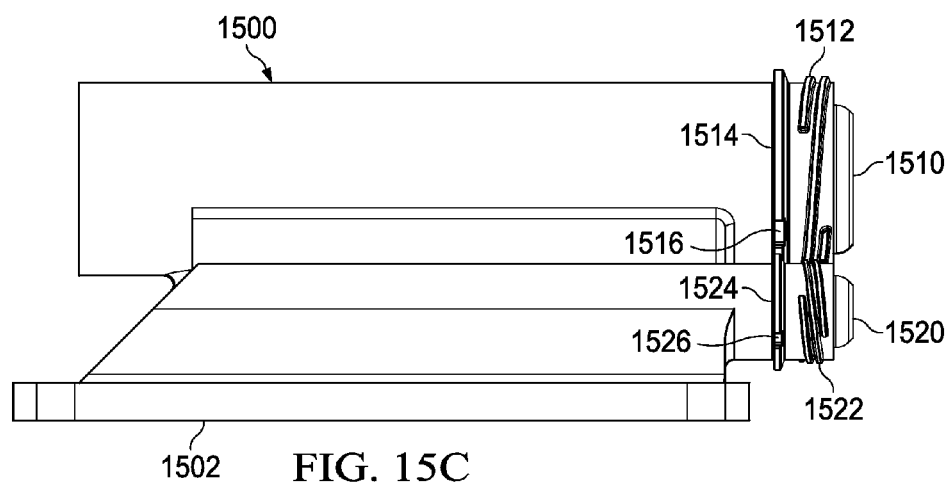
Figure 15D:
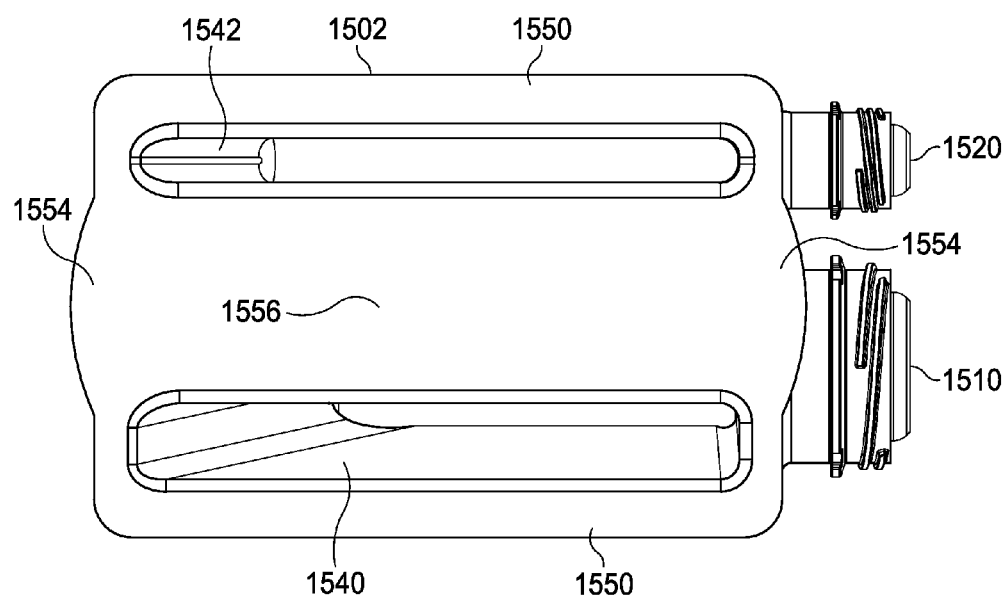

FIG. 15D is a view from a bottom of base 1502. Base 1502 may include openings for flow passages that fluidly connect port 1510 and port 1520 to flow passages in the filter body. To this end, the opening to flow passage 1540 in base 1502 may be located such that it interfaces with a first set of plenums and the opening to flow passage 1542 may be located such that interfaces with a second set of plenums. While shown as a single flow passage, each of flow passages 1540 and 1542 may be divided into several flow passages.

Base 1502 may also provide a surface that can be bonded or otherwise coupled to the end of the cassette main body. Regions 1550, for example, may be bonded to the ends of side covers and regions 1554 may be bonded to the ends of main shell sidewalls. Area 1556 can provide an end wall to a set of lanes internal to the filter cassette body and may provide a surface to which the ends of tensions members and lane covers may be bonded or otherwise coupled.

Figure 16:
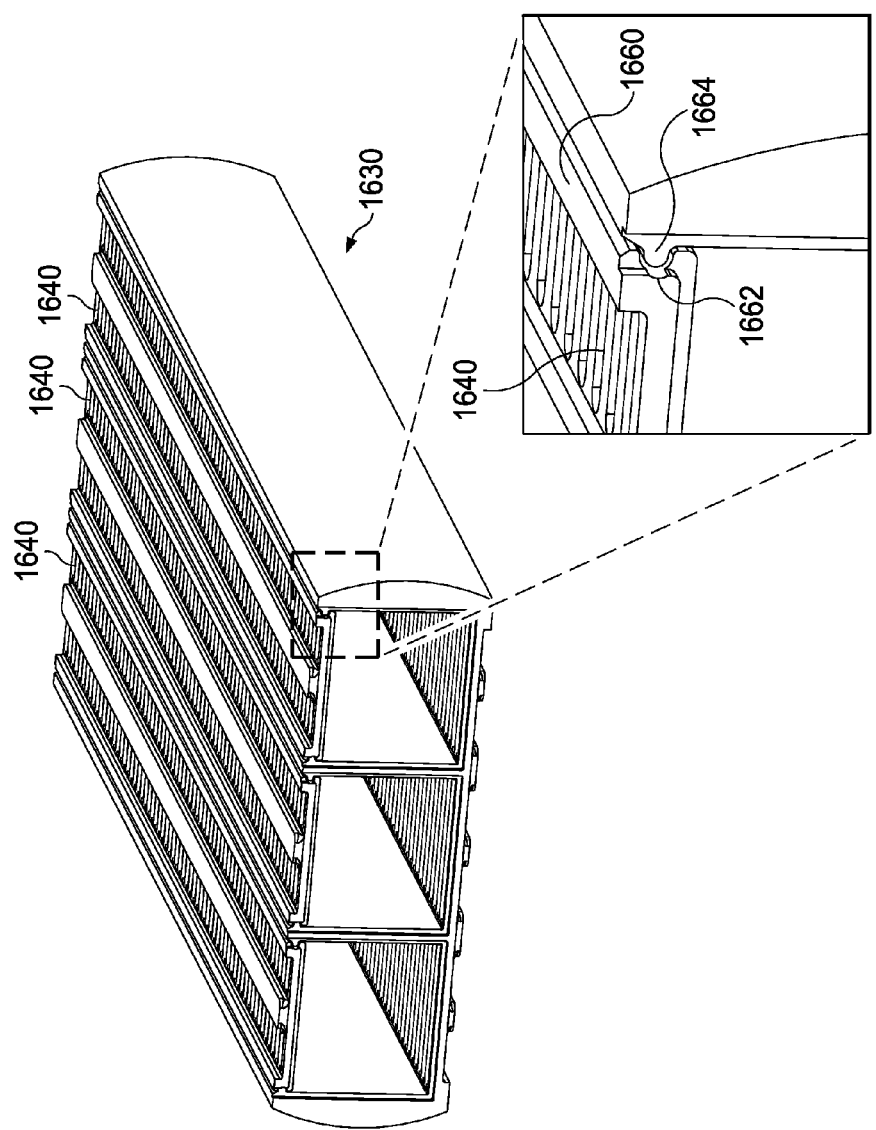
FIG. 16 is a diagrammatic representation of another embodiment of a main shell and media cover.

FIG. 16 is a diagrammatic representation of another embodiment of a main shell 1630 and lane covers 1640. In the embodiment of FIG. 16, lane covers 1640 include a frame having frame members 1660. The lane covers 1640 and main shell 1630 may include features to facilitate coupling lane covers 1640 to main shell 1630 using a snap-fit, interference fit, sonic bonding or according to any suitable coupling mechanism. According to one embodiment, lane covers 1640 may include grooves 1662 running along the length of frame members 1660. Tongues 1664 projecting from the main shell sidewalls and tension members may be received in corresponding grooves 1662 to create a snap fit. In other embodiments, the tongue can be on the lane covers 1640 and the grooves on the sidewalls and tension members. Other mechanisms may also be used to secure the lane covers.

Filter cassettes may be assembled in any suitable manner. According to one embodiment, a side cover (e.g., side cover 220 of FIG. 2), may be bonded to the main shell and then pleat packs are inserted in the lanes. The first and last pleats of a pleat pack may stick out along the length of the pleat pack. The separate lane covers can be attached, with the first and last flap of each pleat pack captured between a lane cover and respective sidewall or tension member. The second side cover (e.g., side cover 210 of FIG. 2) can be bonded to the main shell. The ends of the main body may be potted or otherwise sealed to seal the ends of the lanes and pleat packs. The end caps may then be bonded to the main body. In another embodiment, for example, the first step can be to install the purification elements and lane covers and then bond side cover 210, 220, end cap 104 and end cap 106 either in series or two or more of these components simultaneously. Other purification media or media to facilitate other processes (such as heat exchange) as described herein may be placed in the lanes.

As discussed above, embodiments of filter cassettes may be used for a variety of applications including, but not limited to, semiconductor manufacturing applications. In some semiconductor manufacturing processes, filters typically operate at less than 100 psi. Embodiments described herein can provide an all polymeric cassette (a filter in which the fluid flow path and structural components of the filter are made of polymeric materials, without requiring, for example, metal support plates, metal mounting brackets and the like) (including a filter cassette in which the main body and end caps are formed primarily or entirely of PFA, PTFE or other non-reactive material) that can have burst pressures of 100 psi (0.68 MPa) or greater, including greater than 400 psi (2 MPa) and in some cases greater than 900 psi (6.2 MPa) in a smaller volume than required by a cylindrical filter that provides comparable retention and pressure drop.

Additionally, flow rates are typically about 5-20 liters per minute (lpm) and filters are often used that can handle up to 50 lpm. Embodiments of filter cassettes may be used for applications with a wide range of flow rates including flow rates of less than 50 lpm and flow rates of greater than 50 lpm. Filter cassettes as discussed above can provide high flow rates (e.g., greater than 15 lpm) during filtration of sub 15 nanometer particles. Filter cassettes can also be configured with other purification media to perform other filtration or purification processes.

In addition, filter cassettes may exhibit a desired pressure drop. According to one embodiment, a filter cassette can be configured to have a baseline pressure drop (pressure drop with a fluid having a viscosity of 1 MPa and no purifier element installed) including, but not limited to, a baseline pressure drop of less than 30 kPa (including, in some cases, less than 10 kPa) at 40 liters per minute, less than 20 kPa (including, in some cases, less than 10 kPa) at 30 liters per minute, less than 20 kPa (including, in some cases, less than 10 kPa) at 20 liters per minute. Generally, the configuration of the filter can balance flow rate and pressure drop.

Adding a purification media to the lanes may increase pressure drop and the configuration of the purifier element can be selected to balance retention performance with pressure drop. In general, the pressure drop across a filter for a given flow rate will increase with increased pleat height (distance from pleat tip to pleat tip) and compression ratio for the same amount of membrane area. The compression ratio is the amount a pleat pack is compressed relative to a ratio of 1.0 in which the pleats are not separated, but are not being further compressed together. Thus, for example, a filter membrane with 100 pleats and a thickness of 0.0415 centimeters would have a width of approximately 4.15 centimeters at a compression ratio of 1.0, but a width of approximately 2.905 cm for a compression ratio of 0.7.

For a given membrane filtration area the volume required to hold a rectangular pleat pack is roughly:

$$v = a*t*cr;$$

where:
v=the filter pack volume,
a=the filtration area,
t=the uncompressed thickness of the filter membrane
cr=the compression ratio.

Now take a cylindrical filter having a membrane area 3m2, a pleat pack length (parallel to the pleats) of 210 millimeters an inner diameter of 63 millimeters and an outer diameter of 76 millimeters, and a thickness of 0.0415 centimeters, the cylindrical purifier element requires approximately 714 cm3 of volume and must be at least 7.6 centimeters wide. For the same membrane area, a square pleat pack with a compression ratio of 1.0 can be approximately 124 cm3.

A pleat pack can be arranged in a desired volume by selecting length of the pleats, height of the pleats and width of the pleat pack. The height of the pleats and compression ratio may affect pressure drop across the pleat pack. Desired pleat heights and compression ratios can be determined through testing of different membranes. Depending on the application and flow needs, a pleat pack may have any desired compression ratio, including, but not limited to a compression ratios of 0.6-1.0. In some cases the pleats may not be compressed (may have a ratio of greater than 1).

Embodiments of filter cassettes can be made from a variety of materials including but not limited to oleophilic resins, perfluorinated resin, (such as, but not limited to, polytetrafluoroethylene (PTFE), fluorinated ethylene propylene (FEP), perfluoroalkoxy polymer (PFA)), polyvinylidene fluoride (PVDF), polyimide, polyetherimide, polycarbonate, polypropylene (PP), polyethylene (PE), polyether ether ketone (PEEK), metals or other materials. According to one embodiment, outer layers may be formed of a relatively inexpensive polymer while the inner layer can comprise a more expensive polymer that is less likely to react with or contaminate the process fluid. For example, components may comprise an outer shell formed of polypropylene, PET or other material that can withstand temperature and pressure requirements of an application. Inside the outer shell, an inner layer of typically more expensive, more chemically resistant, higher purity material can be thermoformed and attached to outer layers. In another embodiment, an inner layer of desired material can be over molded over the inside of the outer layers. The entire wetted surface of the filter can be the more chemically resistant, higher purity polymer, such as PTFE, FEP, PFA or other material.

Internal components, such as lane covers discussed below, can be made from a variety of materials including but not limited to oleophilic resins, perfluorinated resin, (such as, but not limited to PTFE, FEP, PFA, PVDF, polyimide, polyetherimide, polycarbonate, PP, PE PEEK, metals or other materials. In one embodiment, the lane covers can be formed of multiple layers. The core can comprise a relatively inexpensive first polymer (e.g., polypropylene) while any layers that contact fluid can comprise a more chemically resistant, higher purity second polymer that is less likely to react with or contaminate the process fluid. According to one embodiment, the second polymer can be over molded on the first polymer. For example, the melting temperature of PET is lower than PFA and PTFE. According to one embodiment, therefore, one or more portions of a filter assembly having PFA and PTFE components may be overmolded or potted with PET. PET has the benefits of low porosity, good strength across wide temperature ranges and lower melt temperature than PFA. Moreover, PET is generally cheaper than PFA.

Filter cassettes may be configured to provide normal flow filtration (NFF), in which fluid is convected directly toward the filter membrane under applied pressure. Particles that are too large to pass through the pores of the membrane accumulate at the membrane surface or in the depth of the filtration media, while small molecules pass through the membrane pores to the downstream side. According to one embodiment, the filter cassettes can be selected to remove micron and/or submicron particles (e.g., particles of 100 nm or less). Multiple filters may be applied in series in a single filtration system unit to successively remove smaller particles or different types of particles. The finest filter can be placed last in series so that larger particles are filtered out prior to reaching the last filter. This can reduce wear on the finest, typically most expensive, filter. In other embodiments, the cassettes may be configured for cross-flow filtration, for example but not limited tangential flow filtration or gas contacting.

In one embodiment, the filter cassettes use non-circular pleated purifier elements. For example, one embodiment may include one more rectangular pleated filters with a first set of pleat tips facing the upstream portion of the media cavity and a second set of pleat tips facing the downstream portion of the media cavity. The first set of pleat tips may be generally arranged in a first plane and the second set of pleat tips may be generally arranged in a second plane. The purifier element may provide a generally planer rectangular entrance interface and a generally planer rectangular exit interface. In the case of porous polymeric membranes, the use of rectangular pleat packs can provide significant additional filtration area in the same footprint as traditional semiconductor liquid filters. The pleats of the filter can be formed from a single membrane or multiple membranes formed from the same or different materials. Additionally, polymeric netting materials and other materials may be pleated with the membrane. A membrane may be used that allows lateral flow in the membrane (flow parallel to the pleats).

Splitting a pleat pack into multiple lanes separated by tensile members offers an improvement in strength allowing a smaller cassette to be utilized. In some cases, a relatively thin walled cassette may be used. According to one embodiment, a PFA cassette can be formed in which the thickness of the housing is such that the fluid is less than 5 millimeters and, in some cases, less than 4 millimeters from the external surface on four sides of the device. Such a cassette may provide comparable filtration, flow rates and pressure drops to cylindrical filters in a reduced footprint and with less material. For example, a cassette with a PFA main body can be formed that has 3m2 membrane that achieves the same filtration, flow rates and pressure losses as a comparable cylindrical filter with a 3m2 membrane, but in a smaller volume and taking less than half the width. Thus, embodiments of filter cassettes can be configured to reduce footprint and maintenance space needs. It can be noted that the 3m2 membrane and other dimensions are provided as an example and cassettes may be formed to include any suitable membrane area and may include other types of purification media. Moreover, filter cassettes can be formed from a variety of materials and used in other purification applications or other applications.

In addition to providing a reduced size, filter cassettes can provide reduced complexity. According to one embodiment, a filter cassette can be formed using a minimum number of unique parts, reducing manufacturing complexity and cost. In some embodiments, these parts may include a main shell, side covers, lane covers and end caps. In other embodiments, however, the filter cassette may be formed from any number of parts.

Furthermore, filter cassettes can improve draining and venting compared to cylindrical filters and lower housing surface area and dead volume for improved performance and cleanliness. Embodiments described herein may also promote advanced filtration applications by facilitating individual, parallel and serial filtration. Embodiments described herein may also be more easily manipulated by robots, facilitating automation of filter changing and maintenance.

As can be understood from the foregoing, filter cassettes may have a variety of configurations. The skilled artisan would understand that features shown in the various figures may be combined and that features shown in one embodiment may be used with other embodiments. Furthermore, while certain components may be shown as integral or separate, the components may be otherwise arranged. Thus, while sidewall 234, sidewall 236, second lane covers 239 and tension members are depicted as integrated into a main shell 234 they may be separate components. For example, second lane covers 239 may be separate covers and tension members 238 may be integrated with one of the side covers. Furthermore, it would be understood that other arrangements are considered, such as ports integrated with a main body or other configurations. Moreover, while described primarily in terms of filtration, cassettes may provide a compact pressure vessel for any suitable purification application or other application, including, for example, as a dummy cassette, a pressurized mixer, a heat exchanger or other application.

A cassette may engage with a supply system using any suitable connection. For example, a filter cassette may be connected using O-ring-less fittings and fitting assemblies as described in U.S. Pat. No. 7,547,049 entitled "O-Ring-Less Low Profile Fittings and Fitting Assemblies" by Gashgaee et al., issued Jun. 16, 2009, which is hereby fully incorporated by reference herein, or other connection mechanism. In other embodiments, the filters may use a connection mechanism such that ports can connect through rotation such as described in U.S. Pat. No. 6,378,907, entitled "Connector Apparatus and System Including Connector Apparatus" issued Apr. 30, 2002, U.S. Pat. No. 7,021,667, entitled "Connector Apparatus and System Including Connector Apparatus" issued Apr. 4, 2006, U.S. Pat. No. 7,296,582, entitled "Method and System for Purging a Dispensed Fluid Within a Fluid Dispensing System Including a Filter-Free Connector Apparatus," issued Nov. 20, 2007, U.S. Pat. No. 7,350,821, entitled "Method and System for Purging a Dispensed Fluid with a Fluid Dispensing System Including A Filter-Free Connector Apparatus," issued Apr. 1, 2008, U.S. Pat. No. 7,037,424 entitled "Connector Apparatus and System Including Connector Apparatus," issued May 2, 2006, each of which is hereby fully incorporated by reference herein. Additionally, the filter cassette ports may connect using any other suitable connections known or developed in the art including, but not limited to FlareMount™, Pillar 5300, Super Pillar, Flaretek, PrimeLock®, Galtek, Swagelok connections.

Figure 17B:
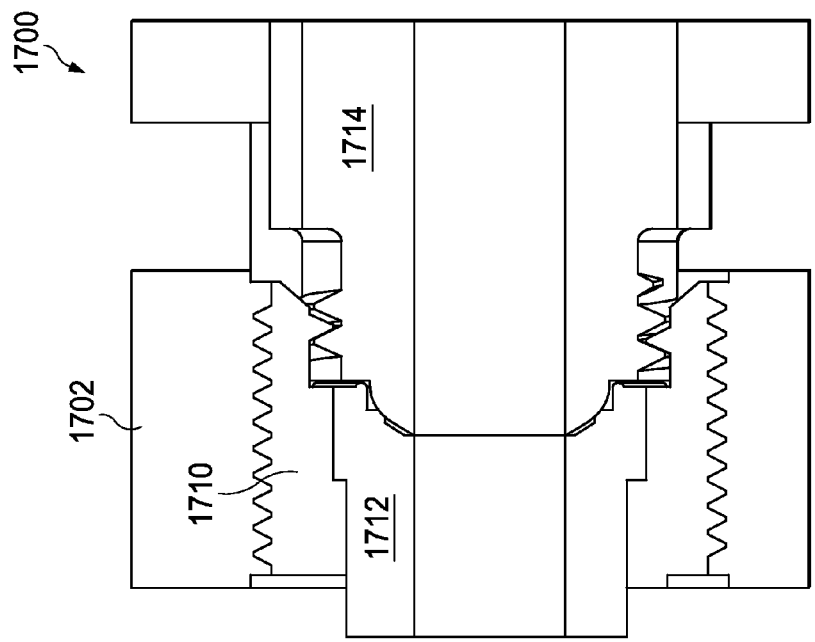
FIG. 17A-17B are diagrammatic representations of one embodiment of a connection system.
Figure 17A:
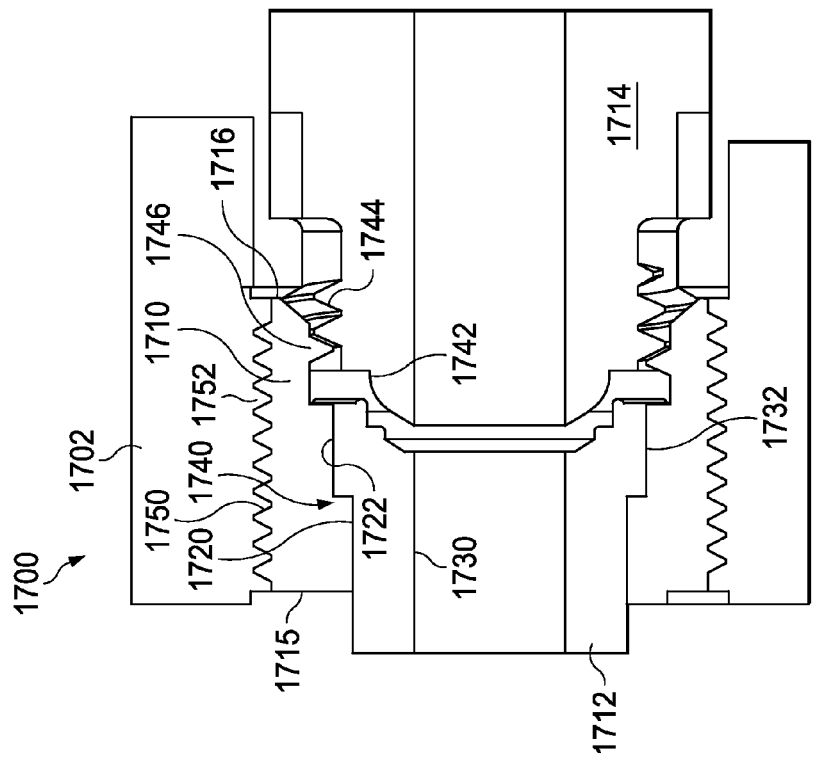

FIGS. 17A and 17B are diagrammatic representations of one embodiment of an example connection system 1700. Connection system 1700 comprises a connection housing 1702 defining a nut receiving area, a connection nut 1710 disposed in the nut receiving area, a first fitting 1712, at least partially received by the nut, and a second fitting 1714. First fitting 1712 provides a fluid flow passage open to the end of first fitting 1712 proximate to connection nut 1710 and second fitting 1714 provides a fluid flow passage open to an end of second fitting 1714 proximate to connection nut 1710. First fitting 1712 and second fitting 1714 can be configured to mate or abut so that the flow passages may be connected to form a continuous flow passage. Preferably, the fittings are complementary fittings that are configured to form a seal under axial force, such as a Primelock® fitting, Flare-Mount™ fitting or other fitting known or developed in the art. While fitting 1712 is illustrated as a female fitting and fitting 1714 as a male fitting, in other embodiments, fitting 1712 can be a male fitting and fitting 1714 a female fitting. One of the fittings can be part of an end cap of a cassette (e.g., as shown in FIG. 1A).

Connection nut 1710 comprises an opening extending from a first side 1715 to a second side 1716 along a primary axis of connection nut 1710. The nut encircles the end portion of one of the fittings and is rotatable about the fitting coaxially with the flow passage. The opening through the nut can have areas of different diameter including an area of smaller diameter 1720 and an area of greater diameter 1722. According to one embodiment, the opening of the nut has a narrower diameter at a first end of the opening through connection nut 1710 and a greater diameter at the second end of the opening through connection nut 1710 (forming a stepped shoulder).

According to one embodiment, one of the fittings can be shaped so that a first portion of the fitting passes through the area of narrower diameter while a second portion has a larger diameter (or other shaped footprint) than the area of narrower diameter. As depicted, for example, the end portion of first fitting 1712 has a first section 1730 that passes through the left end of the nut and a second section 1732 that is too large to pass through the narrower diameter area 1720. In this embodiment, the connection nut 1710 and first fitting form complementary radial shoulders 1740 that are shaped and positioned to abut during use (e.g., an internal shoulder of connection nut 1710 abuts an external shoulder of fitting 1712). Second fitting 1714 may include an end portion 1742 that is received through the second end of the nut opening. The received portion of second fitting 1714 may include outer threads 1744.

A set of connection nut inner threads 1746 are disposed proximate to the second end of connection nut 1710 and can be designed to engage the port fitting external threads 1744. Connection nut 1710 may also include outer threads 1750 disposed on at least a portion the outer side of connection nut 1710 that engage housing threads 1752 disposed on the inside of housing 1702.

In operation, the ends of first fitting 1712 and second fitting 1714 can be brought together. When the end portion of second fitting 1714 is at the appropriate location, connection nut 1710 can be rotated to engage the nut inner threads 1746 with the fitting outer threads 1744. The force on the fitting outer threads 1744 and on the shoulder 1740 of the fitting 1712 presses first fitting 1712 and second fitting 1714 together to create a seal (as shown in FIG. 17B).

Connection system 1700 can be used to help maintain seals, particularly for fittings where seals are formed or promoted by axial force. Nut inner threads 1746 and fitting outer threads 1744 can be selected so that less than 360 degrees of rotation of connection nut 1710 can seal the fittings (and in some cases less than 180 degrees of rotation). Less than 360 degrees of rotation of connection nut 1710 may result in more than 360 degrees of thread engagement or greater than 360 degrees of thread engagement to create an axial sealing force sufficient to seal the fittings.

According to one embodiment, nut inner threads 1746 create axial force (force that pushes second fitting 1714 toward first fitting 1712) 360 degrees around second fitting 1714 without requiring that connection nut 1710 rotate 360 degrees. That is, nut inner threads 1746 can engage fitting outer threads 1744 360 degrees around the fitting without requiring connection nut 1710 to rotate 360 degrees to create the 360 degree engagement. To this end, nut inner threads 1746 and fitting outer threads 1744 can be multi-start threads, such as double start threads, triple start threads, etc. A double start, triple start or other multi-start thread can provide 360-degree axial loading around the full seal connection with roughly a half-of-a-rotation or less. Nut inner threads 1746 and fitting outer threads 1744 can be threads that accept high axial loads. The threads may include various standard thread profiles including, but not limited to 1-12 UNF threads, buttress threads, acme threads or other threads. Additionally, custom or proprietary threads may be used.

In one embodiment, nut inner threads 1746 and fitting outer threads 1744 can be double start threads with each thread start offset be approximately 180 degrees and the threads running at least 180 degrees from each start. In this case, the connection nut 1710 can be rotated to engage the double start threads. Rotating the nut 180 degrees will cause the double start threads to engage 360 degrees around the outer fitting. More particularly, using the start of a first thread as the reference, the first thread of nut inner threads 1746 starting from the first start may contact the fitting outer threads 1744 from 0-180 degrees and a second thread of nut inner threads 1746 starting from a second start may contact the fitting outer threads 1744 from 180-360 degrees such that there is an axial force on fitting 1714 360 degrees around the fitting. While the example of 180 degrees is used, double start threads of other lengths may be used.

Using the example of triple start threads, each start can be offset by approximately 120 degrees and the threads can run approximately 135 degrees from each start. In this case, rotating connection nut 1710 about 135 degrees will create 360 degrees of engagement. In this example, a first thread of nut inner threads 1746 starting at a first start can contact fitting outer threads 1744 from 0-135 degrees, a second thread of nut inner threads 1746 starting from a second start may contact the fitting outer threads 1744 from 120 degrees to 255 degrees and a third thread starting from a third thread may contact fitting outer threads 1744 from 240 degrees to 15 degrees, such that there is an axial force on fitting 1714 360 degrees around the fitting. While the example of 135 degrees is used, triple start threads of other lengths may be used.

Thus, multi-start thread configurations can be used to provide 360-degree axial loading around the full seal connection with less than 360 degrees, and in some cases less than 180 degrees of rotation of connection nut 1710. In other embodiments, the axial loading may be less than 360 degrees but sufficient to create a seal. For example, small gaps may exist in the loading profile provided the seal can still hold with the gaps (e.g., where there is an angular range where there is no thread engagement). One of ordinary skill in the art would understand that the thread examples provided are provided by way of example and other configurations of multi-start threads may be used.

Connection system 1700 may include a counter rotation prevention feature to create a sufficient force so that the connection nut 1710 will not counter rotate (rotate to release the seal) under axial loading. According to one embodiment, the counter rotation prevention feature may be a friction fit. The friction fit may be provided by friction between inner housing threads 1752 and outer nut threads 1750. Outer nut threads 1750 and inner housing threads 1752 can be finer threads selected to create sufficient surface area contact between the threads so that there is an effective amount of friction between connection nut 1710 and connection housing 1702 to prevent connection nut 1710 from counter rotating under expected axial loading, including cyclical axial loading. However, the effective amount of friction may be low enough that connection nut 1710 can counter rotate when sufficient external rotational force is placed on connection nut 1710, thereby allowing the fittings to be disengaged. In this case, outer nut threads 1750 hold the position of connection nut 1710 and inner nut threads 1746 bear the axial load. The counter rotation prevention threads may include any standard thread including Unified screw threads or custom thread that provides sufficient friction. Other thread designs may also be used, including, but not limited to, buttress threads. According to one embodiment, nut outer threads 1750 and housing inner threads 1752 are single start threads.

A locking mechanism (e.g., such as detents and/or indents on the rotating member of fitting, snap fits or other features) may also be provided to prevent nut 1750 from counter rotating unexpectedly. In some cases, the locking mechanism may be used in lieu of the higher friction outer nut threads 1750 to prevent backing out of the nut (while till including outer nut threads or not including outer nut threads at all). In some embodiments, connection nut 1710 does not have external threads and nut 1710 is held in position axially by an alternate retaining mechanism.

A connection system may include features to hold the nut to a required angular range (e.g., such as stops on the threads) to prevent rotation of the nut past a certain point. In particular, rotation of the nut may be limited to a range between a first angular position and a second angular position, where the first angular position corresponds to full engagement and a second angular position corresponds to full disengagement. In the second angular position, the starts of the inner threads will be in a known position helping ensure proper alignment of the nut inner threads and fitting outer threads.

A connection system can be adapted to different port sizes. The internal and external threads can change based on the port size, axial travel requirements, load requirements and seal performance requirements. Components can be made from a variety of materials including polymeric materials, such as but not limited to oleophilic resins, perfluorinated resin, (such as, but not limited to, PTFE, FEP), PFA, PVDF, polyimide, polyetherimide, polycarbonate, PP, PE, PEEK, metals or other materials. According to one embodiment, the connection system can be formed primarily of PFA to provide a true ultra-clean PFA, quick connect seal connection for the semiconductor industry. The connection system formed of PFA, for example, can provide the required 150 lbs. (667 Newtons) of force specified for FlareMount™ connections with a safety factor.

The connection system may be used in a variety of applications, including with stand-alone fittings, straight union fittings, elbow fittings or other fittings and may be integrated into other devices. While the fittings illustrated above features a FlareMount™ seal mechanism, other styles of fittings may be used. The fittings may be Purebond® welded to pipe or tubing or molded with a tubing connection at one or both ends. The fittings may also be inserted into flared ends of tubing. One of the fittings may also be welded onto or molded into a filter housing (e.g., a Chemline or Chemlock® filter housing or other filter housing, for example). The connection system may also be used to make a tube seal style connections instead.

FIG. 18 is a diagrammatic representation of one embodiment of a connection system using a modified thread design. The portion of the connection system illustrated comprises a connection housing 1802 having inner connection housing threads 1804, a connection nut 1810 having inner nut threads 1812 and outer nut threads 1814 and a fluid fitting 1820 having an exterior thread 1822. A portion of another fitting 1824 is also illustrated.

Nut inner threads 1812 and fitting outer threads 1822 can be modified buttress threads. An American Standard buttress thread has a load flank angle of 7 degrees to the normal axis and a relief flank angle of 45 degrees to the opposite side of the normal axis, resulting in a thread angle (the angle between a load flank and adjacent relief flank) of 52 degrees. Embodiments of nut inner threads 1812 and fitting outer threads 1822 may have a relief flank angle of less than 45 degrees. According to one embodiment, the relief flank angle is between 15-40 degrees, but may be less. The load flank angle may be between 0-15 degrees and may be to the same or opposite side of the normal axis as the relief flank angle. In one embodiment, for example, the relief flank angle is approximately 30 degrees and load flank angle is approximately 3 degrees to provide a 33 degree thread angle. In another embodiment, the load flank may be angled so that the thread angle is less than the relief flank angle. In other words, the load flank and relief flank may be angled to the same side of the normal axis as the relief flank.

Additionally, in some embodiments, the load flank angle of fitting outer threads 1822 may be different than the load flank angle of nut inner threads 1812 to increase interference. For example, the load flank of the fitting outer threads, as illustrated, may be approximately 0 degrees while the load flank of the connection nut inner threads is angled toward the fitting thread load flank several degrees. In some embodiments, connection nut 1810 does not have outer threads and is axially retained in the housing, while another mechanism is used to prevent counter rotation of connection nut 1810.

In addition, housing inner threads 1804 and nut outer threads 1814 may be configured to increase interference. According to one embodiment, for example, the load flank angles of inner housing threads 1804 and outer nut threads 1814 may be different.

Connections discussed above can be formed of any suitable material including, but not limited to PVDF, FEP, PP, PFA and PTFE, compositions comprising polymers, metals or other materials, which meet requirements for use in semiconductor manufacturing. In some cases, if high temperatures are expected, it may be desirable to use materials that exhibit lower creep. Thus, for example, it may be preferable to use PFA for the connection nut and fittings when applications exceed 100 degrees Celsius, as PTFE exhibits more creep at these temperatures. In any case, a connection systems can exceed qualifications for semiconductor manufacturing fittings and may withstand 245 psi (1.69 MPa) for 5 minutes at room temperature or higher (e.g., 535 psi (3.7 MPa) for 5 minutes at room temperature).

For example, a connection system of FIG. 18 formed of PFA and PTFE can have a leak pressure of greater than 415 psi (214 lbs. of axial sealing force) (2.87 MPa and 952 Newton sealing force), when pressure is applied at room temperature for five minutes. The leak pressure of the fitting may be greater than 500 psi (3.4 MPa) and even greater than 950 psi (6.6 MPa) at room temperature. A connection system having a nut and fittings formed of PFA, for example, can thus provide the required 150 lbs. (667 Newton) of force specified for FlareMount™ connections with a safety factor (for example, a connection system may provide over 210 lbs. (934 Newton) of axial force for a 1 inch (2.54 centimeter) fitting).

A connection nut may have any suitable form factor and may be integrated as a portion of another component. In some embodiments, the connection nut can feature a wing nut style design where the wings are positioned such that a user can provide the twisting load on the nut to engage or disengage from the fitting. In other embodiments, another form of rotation member may be provided that allows a user to more easily apply torque to the nut. In one embodiment, a connection nut may be coupled to a gear assembly or other drive train that rotates one more connection nuts. The drive train may be arbitrarily complex and can rotate multiple connection nuts at once to create several seals simultaneously.

Figure 19A:
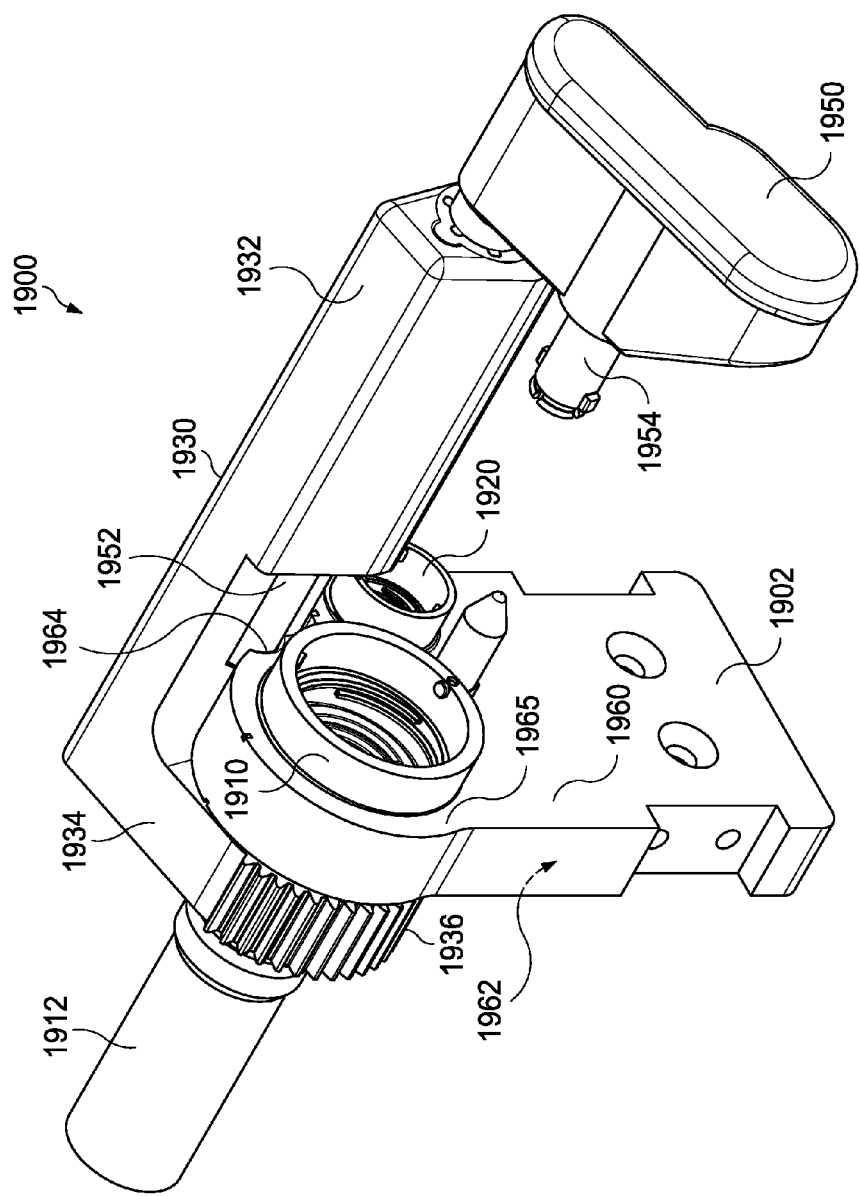
FIGS. 19A-19B are diagrammatic representations of another embodiment of a connection system.
Figure 19B:
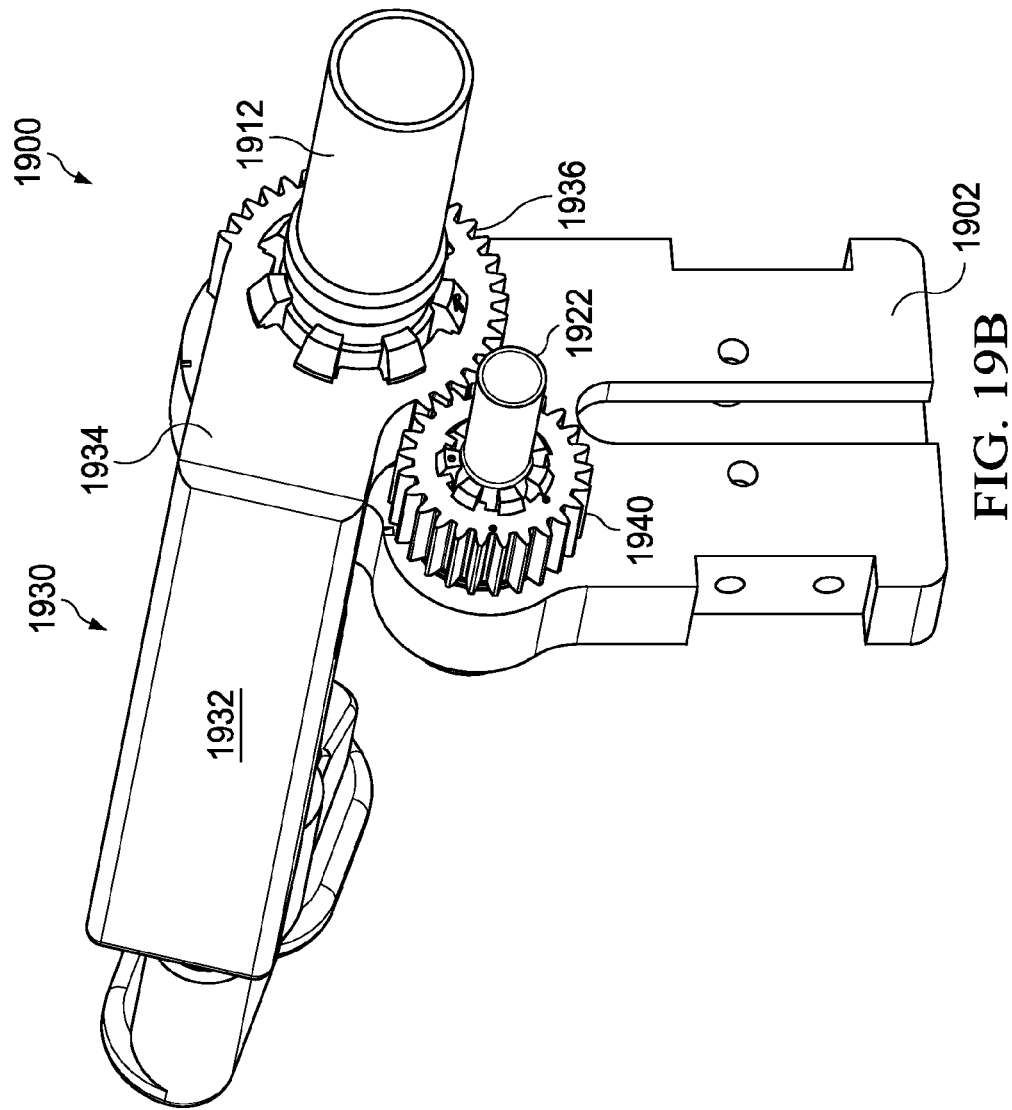

FIGS. 19A and 19B are diagrammatic representations of one embodiment of a connection system 1900. Connection system 1900 comprises a connection housing 1902, a first connection nut 1910 rotatable about a first fluid fitting 1912, a second connection nut 1920 rotatable about a second fluid fitting 1922 and drive system. Connection housing 1902 includes threaded openings passing through housing 1902 from a first side of housing 1902 to a second side of housing 1902. The threads may be configured to engage outer nut threads of connection nuts 1910 and 1920. The drive system is operatively coupled to first connection nut 1910 and second connection nut 1920 to simultaneously rotate first connection nut 1910 and second connection nut 1920 within housing 1902.

A nut coupling member 1934 at a first end of gear arm 1930 extends to the first side of housing 1902. A drive arm 1932 extends from nut coupling member 1934 past the second side of housing 1902 a desired distance. Connection nut coupling member 1934 is coupled to first nut 1910 and includes an outer surface having gear teeth 1936. Gear arm 1930 drives a second gear 1940 coupled to second connection nut 1920. Gear arm 1930 acts as rotation member such that rotation of gear arm 1930 causes first connection nut 1910 and second connection nut 1920 to rotate simultaneously to form a seal between first fluid fitting 1912 and a fitting on a filter cassette and second fluid fitting 1922 and a second fitting on a filter cassette.

When gear arm 1930 is rotated, the smaller gear 1940 is also rotated in the opposite direction to engage the smaller port at the same time as the larger port. This mechanism allows for sealing two ports with one single rotating action on gear arm 1930. In the embodiment illustrated, the gears are have a 1.6:1 gear ratio so the smaller connection nut 1920 is rotated more than larger connection nut 1910 (though any suitable gear ratio can be used). If connection nut 1910 is configured with a triple start inner thread so that 165 degrees of rotation results in 360 degrees (or more) thread engagement, then connection nut 1920 can be configured with a triple start or other multi-start inner thread so that 264 degrees of rotation results in 360 degrees (or more) of thread engagement. It can be noted that, when the connection nuts turn, the connection nuts may translate toward the filter cassette end cap (or other fitting). Accordingly, gear arm 1930 and gear 1940 may also translate. In other embodiments, the connection nuts create less than 360 degrees of threaded engagement (and less than 360 degrees of circumferential axial sealing force), but still a sufficient force to seal the fittings.

The internal and external threads of the smaller connection nut 1920 may have a pitch that is scaled relative to the internal and external threads of connection nut 1910 so that the filter and the nuts move the same distance axially as gear arm 1930 is rotated. Gear ratios and pitch heights can vary based on the choice of port sizes and the axial travel distance required. Moreover, gears can be provided to rotate additional connection nuts to provide sealing for additional ports and the connection system can be geared so that all the connection nuts rotate the same direction.

A drive handle 1950 can be provided for easy manipulation by a human or robotic user. A drive shaft 1952 extends from handle 1950 toward housing 1902 and may be received in a drive shaft passage in gear arm 1930. Drive shaft 1952 and the drive shaft passage may be splined or otherwise configured to allow translation of drive shaft 1952 in the passage. An end cap alignment post 1954 may extend parallel to drive shaft 1952. End cap alignment post 1954 can be received in a complementary opening in a filter cassette end cap (e.g., opening 1530 of FIG. 15). End cap alignment post 1954 defines the drive shaft pivot axis.

Rotation of gear arm 1930 may be limited to a particular range of rotation and features may be provided to lock the angular position of gear arm 1930. To this end, a portion of the drive shaft passage more proximate to the connection housing 1902, near the first end of drive arm 1930, may be open to expose the outer surface of drive shaft 1952. Drive shaft 1952 can be retracted so that the end drive shaft 1952 closest to connection housing 1902 can pass past surface 1960 as drive shaft 1952 is rotated about its pivot point. That is, the drive shaft passage and housing 1902 may be configured so that the end of drive shaft 1952 overlaps and may be spaced away from surface 1960 of housing 1902 in a range of angular positions about the drive shaft pivot axis. In certain positions though the end of drive shaft 1952 can be received in an opening in surface 1960, a notch or groove 1964 in the side of housing or other feature to lock gear arm 1930 in a desired angular position. Thus, for example, the end of drive shaft 1952 may pass over surface 1960 from position 1965 to notch 1964. When drive shaft 1952 is aligned with notch 1964, drive shaft 1952 may be translated so that a portion of drive shaft 1952 is received in notch 1964 (an engaged position), preventing rotation of gear arm 1930.

Other mechanisms may be used to inhibit rotation of gear arm 1930. As another example, surface 1962 of housing 1902 and facing surface of nut coupling member 1934 may include bevel gear teeth or other features so that the angular position of gear arm 1930 may be maintained. Other locking mechanisms such as indents and detents, locking pins, clips may also be used.

In some embodiments, the end points of rotation may be marked by dots and arrows or other visual indicators. The dots and arrows also provide one example of a visual indicator used to confirm engagement or disengaged. In yet another embodiment, LEDs or other lights that turn on when the rotation member is in the proper position can be used, again providing an indication of proper engagement/disengagement.

Figure 20:
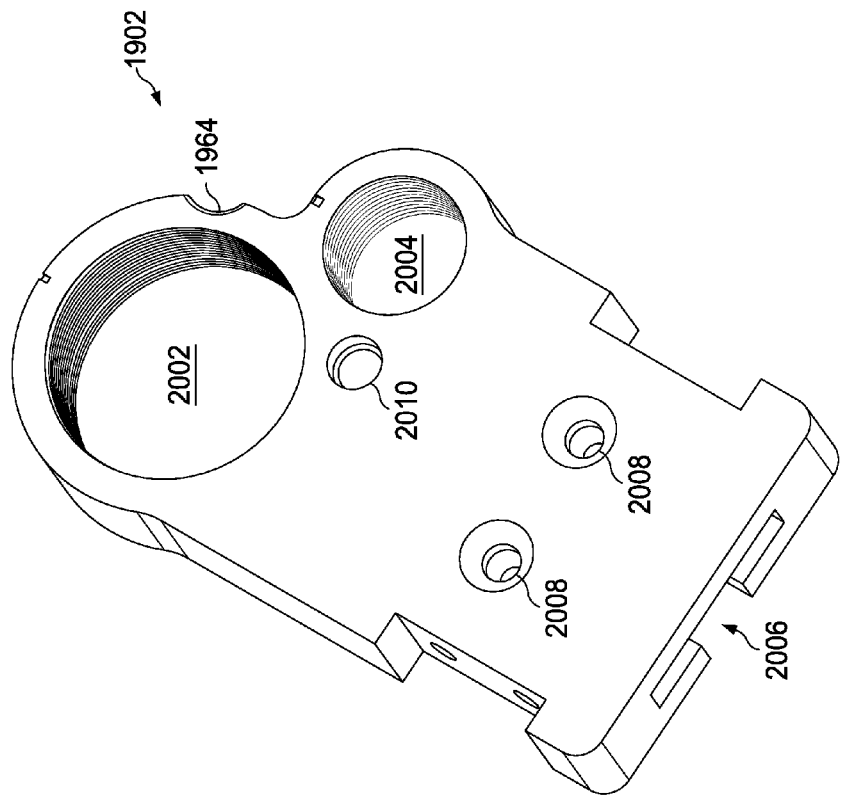
FIG. 20 is a diagrammatic representation of one embodiment of a connection housing.

FIG. 20 is a diagrammatic representation of one embodiment of a connection housing 1902 depicting an embodiment of a first connection nut opening 2002 having internal threading and a second connection nut opening 2004 having internal threading. Although illustrated with two connection nut openings, embodiments can include a connection housing with one or more threaded openings and corresponding connection nuts and fluid fittings. In other embodiments, the housing may axially retain the connection nut without threads. FIG. 20 further depicts notch 1964 disposed in the sidewall of housing 1902 configured to capture a portion drive shaft 1952.

Connection housing 1902 may comprise a bracket having a slot 2006 that can be shaped so that connection housing 1902 may be mounted to a manifold plate as discussed below. Fastener openings 2008 allow a screw, pin or other member to be used to couple connection housing 1902 to the manifold plate. A threaded hole 2010 can allow a cassette alignment feature to be coupled to connection housing 1902.

FIG. 21A is a diagrammatic representation of one embodiment of a connection nut 1910. Connection nut 1910 comprises outer threads 2100 and inner threads 2102. Inner threads 2102 may be configured so that less than 360 degrees of rotation, and in some cases less than 180 degrees of rotation can create a seal between fittings (and can create 360 degrees of threaded engagement or more or less than 360 degrees of threaded engagement). Outer threads 2100 may be configured to prevent connection nut 1910 from backing out. In other embodiments, connection nut 1910 may lack outer threads and may be axially retained in the housing, while another mechanism is used to prevent counter rotation of connection nut 1910.

Connection nut may 1910 may comprise a set of alignment features that align with complementary features on a fitting. For example, connection nut 1910 may comprise projections 2104 projecting inward from the inner radial surface of the nut opening. Projections 2104 may align with features on a fitting. With reference to FIG. 15B, for example, projections 2104 may fit through notches 1516 in alignment rib 1514. Projections 2104 may be spaced from the start of inner threads 2102 such that inner threads 2102 cannot engage the fixture external threads (e.g., threads 1512 of FIG. 15B) unless projections 2104 pass through the corresponding notches. Projections 2104 may be located so that inner threads 2102 can only engage the external fixture threads when connection nut 1910 is in a specific orientation in relation to the end cap or other fitting threads. Furthermore, in the embodiment illustrated, connection nut 1910 cannot rotate until the projections pass through the notches. Thus, the alignment features of the fitting and the alignment features on the connection system (on the connection nut in this example) prevent rotation of the connection nut until the threads properly positioned relative to each other.

Connection nut 1910 may further comprise resilient fingers 2106 extending from one side. Resilient fingers 2106 may be captured by a gear arm or gear. Features 2108 at the ends of resilient fingers 2106 can provide shoulders 2109 that can abut a surface of a gear or gear arm.

Figure 21B:
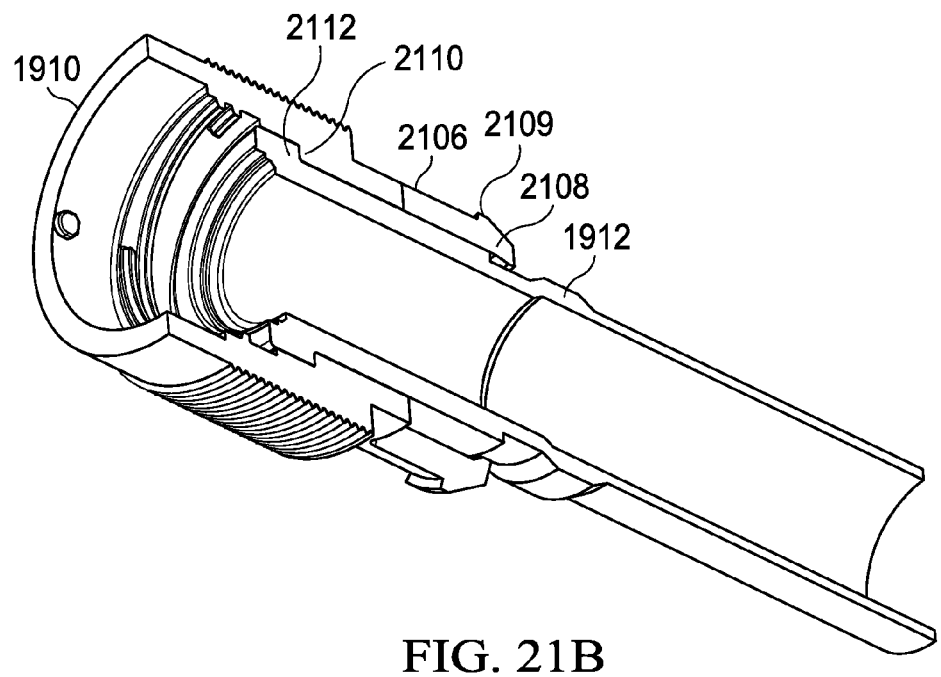
FIG. 21B is a diagrammatic representation of one embodiment of a connection nut and fitting.

FIG. 21B is a diagrammatic representation of one embodiment of connection nut 1910 and fluid fitting 1912. The opening through connection nut 1910 may comprise an area of larger diameter and an area of small diameter to form a connection nut shoulder 2110. The portion of fluid fitting 1912 received in connection nut 1910 may have a portion with a smaller diameter and a portion with a larger diameter to form fluid fitting shoulder 2112 that abuts connection nut shoulder 2110. Connection nut shoulder 2110 may push against fluid fitting shoulder 2112 to provide an axial force sufficient to seal fluid fitting 1912 to a port of another filter cassette or other component.

Figure 22A:
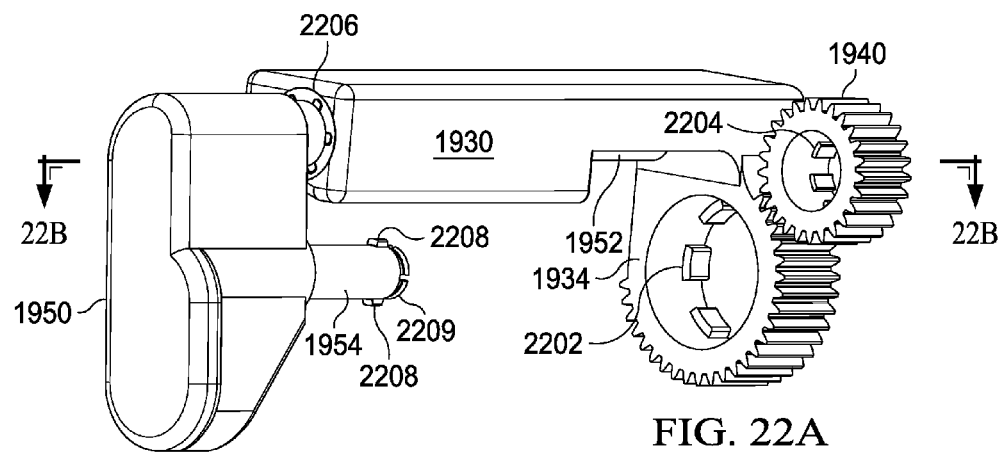
FIGS. 22A-22B are diagrammatic representations of one embodiment of a drive system.

FIG. 22A is a diagrammatic representation of one embodiment of a drive system. Gear arm 1930 may include a nut coupling member 1934 having an opening to receive a first connection nut and gear 1940 having an opening to receive a second connection nut. Features 2202 and 2204 may create channels through which resilient fingers of the respective connection nuts can pass. The features at the end of the resilient fingers (features 2108 of FIG. 21A) can act to fasten the connection nut into the gear arm or gear opening. When the gear arm and gear rotate, features 2202 and 2204 can place radial force on the respective connection nut by pushing on the side edges of the resilient arms, causing the connection nut to rotate.

FIG. 22A further illustrates one embodiment of a drive handle having a drive shaft 1952 and an end cap alignment post 1954. Drive shaft 1952 may be inserted in a passage in gear arm 1930. All or a portion of drive shaft 1952 and the passage may be splined. According to one embodiment, the drive shaft passage splines may be provided by an insert 2206 into the end of gear arm 1930. End cap alignment post 1954 can comprise one or more radial projections 2208 that fit in channels in an end cap opening. The channels and projections 2208 can cooperate to guide the movements of drive handle 1950 to help ensure a proper seal as discussed below. The end of alignment post 1954 may comprise a compressible ring 2209 having an annular groove and lip. The lip may be captured by a portion of the end cap as discussed further below.

Figure 22B:
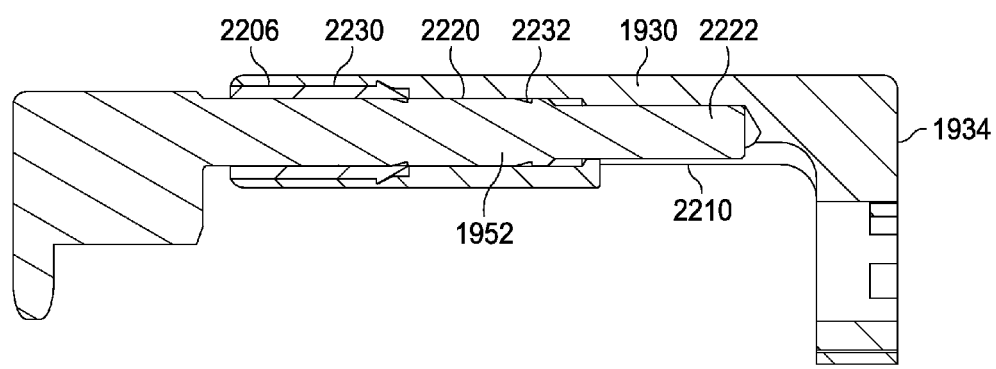

FIG. 22B is a diagrammatic representation of a cross-sectional view of the embodiment of a drive system shown in FIG. 22A. Gear arm 1930 comprises drive shaft passage 2220 that receives drive shaft 1952. An end portion of drive shaft passage 2220 is open to expose a portion drive shaft 1952 (indicated at portion 2210).

Drive shaft 1952 may be translatable in drive shaft passage 2220, such that the drive shaft tip 2222 may be pushed in and retracted. The translation in the direction to retract drive shaft 1952 may be limited by insert 2206. Insert 2206 may include a set of resilient fingers 2230 coaxial with drive shaft 1952 that push inward. When drive shaft 1952 is retracted out a certain distance, resilient fingers 2230 push inward into annular groove 2232 to inhibit further translation in that direction. Insert 2206 may be rotatable in passage 2220 so that drive handle 1950 may rotate about the axis of drive shaft 1952 until the alignment post 1954 is pushed forward into the end cap alignment opening aligning the splines with slots that permit drive handle 1950 to be pushed further in to lock the two parts together rotationally.

Figure 23:
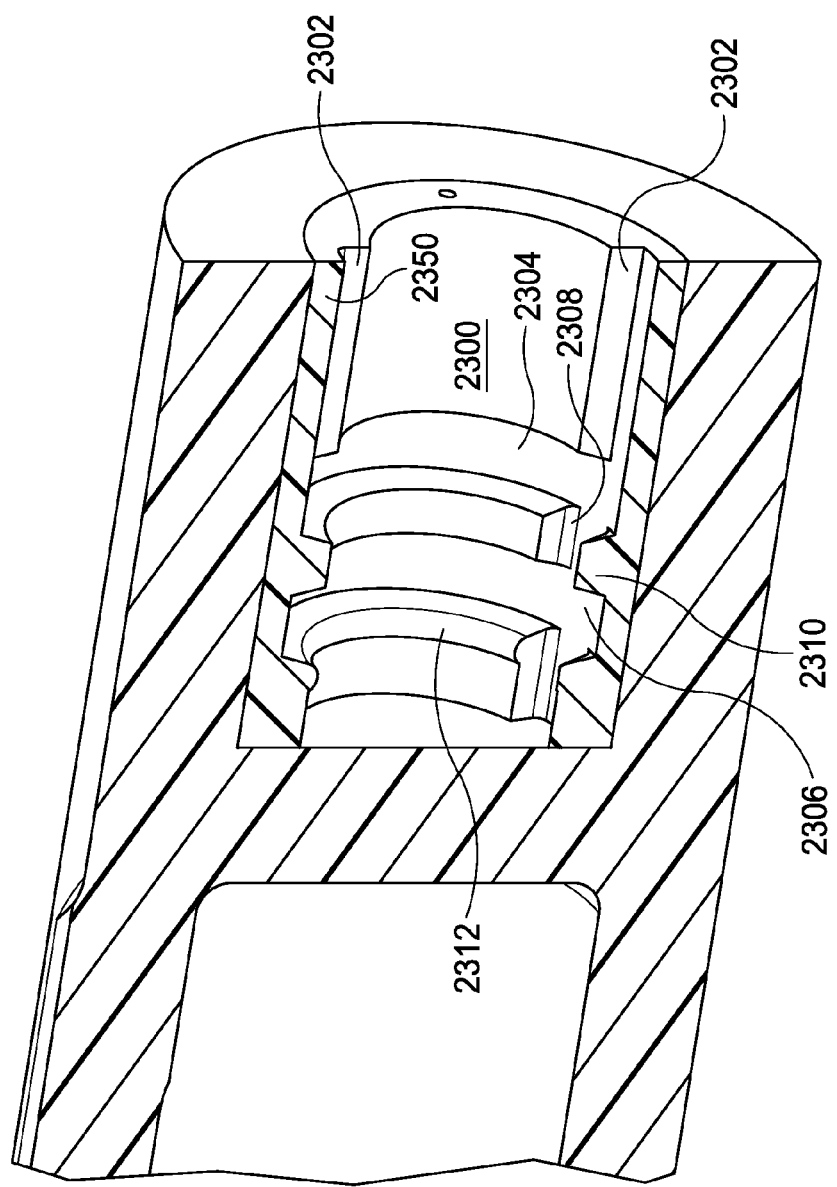
FIG. 23 is a diagrammatic representation of one embodiment of an alignment opening.

FIG. 23 is a diagrammatic representation of one embodiment of an alignment opening 2300 disposed in an end cap or other component to receive alignment post 1954 (FIG. 22A. A number of ribs or other features may be defined on the inside of alignment opening 2300 to define a series of axial and radial channels. According to one embodiment, the features define entrance channels 2302, a first radial channel 2304, a second radial channel 2306, and second axial channels 2308 (one of which is shown) connecting first radial channel with second radial channel 2306. In one embodiment, the channels may be defined in an insert 2350 that is inserted in an end cap opening.

With reference to FIGS. 19-23, when alignment post 1954 is inserted in opening 2300, projections 2208 are received in entrance channels 2302. This means that the drive system must be in the correct orientation before alignment post 1954 can be inserted. This orientation may coincide with the orientation in which the inner threads of connection nut 1910 and connection nut 1920 are properly aligned with the external threads on an end cap, fitting or other fixtures. Drive handle 1950 may be translated, translating drive shaft 1952 in passage 2220. However, the second axial channels 2308 are not aligned with entrance channels 2302 (e.g., rib 2310 overlaps entrance channel 2302 and acts as a stop) such that further translation of drive handle 1950 is limited. Drive handle 1950 can be rotated until projections 2208 align with axial channels 2308. This position can correspond to a position in which drive shaft 1952 aligns with notch 1964 in housing 1902 and connection nut 1910 and connection nut 1920 are rotated to create a 360 degree seal. Drive handle 1950 can then be pushed in further such that drive shaft 1952 is received in notch 1964. The annular lip of compression ring 2209 may pass over ridge 2312 such that ridge 2312 is captured in the groove of compression ring 2209. The compression ring 2209 and ridge 2312 can create a snap fit that provides haptic feedback when drive shaft 1952 is fully engaged with notch 1964. Furthermore, the compression ring 2209 and ridge 2312 provide a mechanism to prevent drive shaft 1952 from being retracted accidentally.

Thus, alignment opening 2300 may provide a keyed feature configured so that when drive shaft 1952 is in a first angular position, drive shaft 1952 can be pushed in a limited first distance. Drive shaft 1952 can then be rotated to a second angular position by rotating gear arm 1930, the second angular position corresponding to a sealed connection. Drive shaft 1952 can be pushed in to a final, fully inserted, position in which drive shaft 1952 acts as a retaining pin to prevent further angular rotation.

Figure 24B:
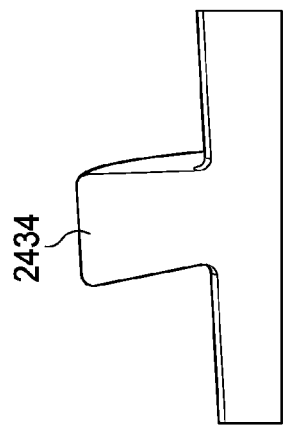
FIGS. 24A-24C are diagrammatic representations of another embodiment of a drive system.
Figure 24A:
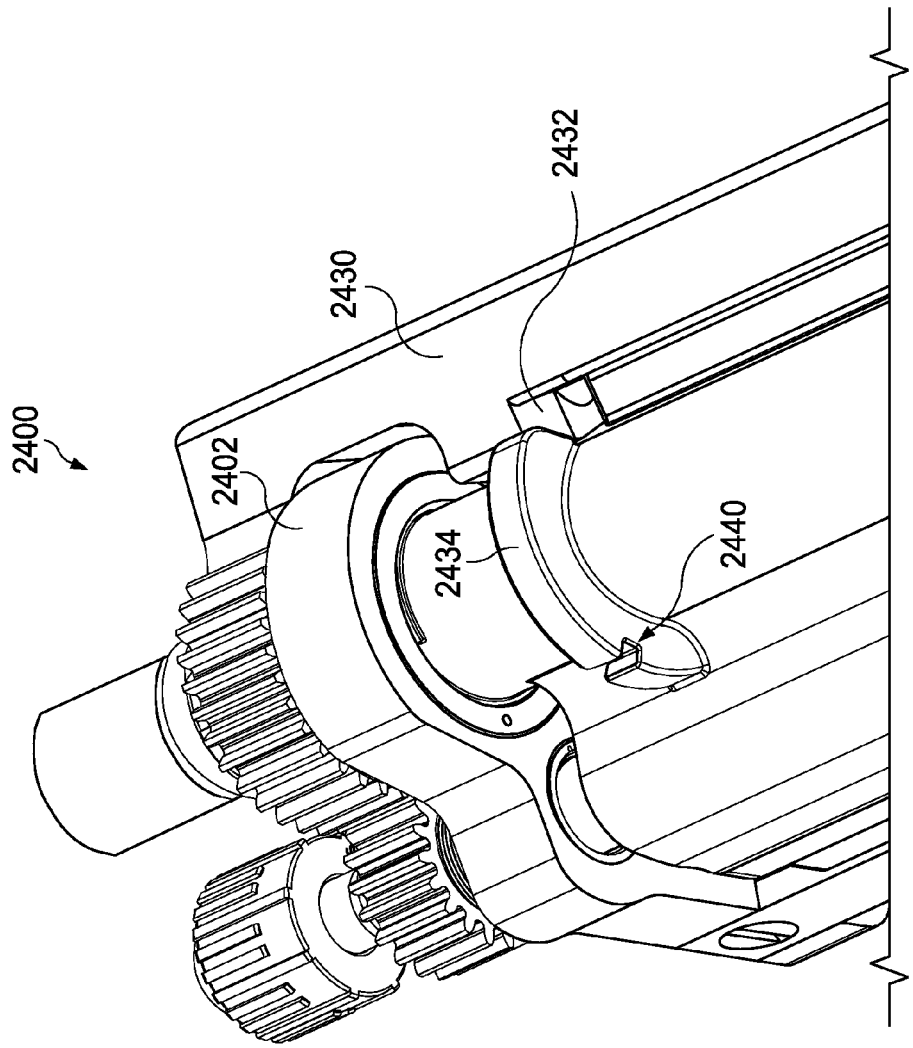

FIG. 24A is a diagrammatic representation of one embodiment of a portion of a connection system 2400 similar to connection system 1900. Connection system 2400 may include an alignment feature that engages with a complementary alignment feature on an end cap, fitting or other fixture. In this example, the rotation member (e.g., gear arm 2430) with a slot 2432 having an entrance normal to the direction of radial travel of gear arm 2430 (that is, in the side parallel to the pivot axis). Slot 2432 may receive a radially extending rib 2434 on an end cap, fitting or other fixture (e.g., rib 130 of FIG. 1). These mating features wrap partially around the axis of the port. According to one embodiment, slot 2432 and rib 2434 are configured so that the end of rib 2434 and entrance of slot 2432 align when the connection nut inner threads and outer threads of the end cap, fitting or other fixture are correctly positioned to allow proper engagement. Thus, the connection system alignment feature and complementary end cap, fitting or other fixture alignment feature are configured so that the threads are in the proper position and orientation before the gear arm is rotated.

According to one embodiment, rib 2434 is held in slot 2432 of gear arm 2430 due to the cross-section of rib 2434 being larger as rib 2434 extends out radially (shown in FIG. 49B). Slot 2432 may also be wider as the slot extends out radially. Furthermore, according to one embodiment the slot 2432 and rib 2434 can be helical. This mechanism can be used to help hold the position of gear arm 2430 relative to the filter end cap and can also generate (e.g., through an interference fit) more axial load between the end cap and fluid fitting as gear arm 2430 is rotated about the port axis. The load on the other side of connection housing 2402 can be roughly equivalent to the load generated by the interference fit of the engagement between the walls of slot 2432 and rib 2434. This can help distribute the load on both sides of the rotating mechanism to ensure a smooth rotation and seal engagement. Rib 2434 and slot 2432 can have a pitch that is approximately equal to the pitch of the internal connection nut threads (e.g., of the larger connection nut).

Figure 24C:
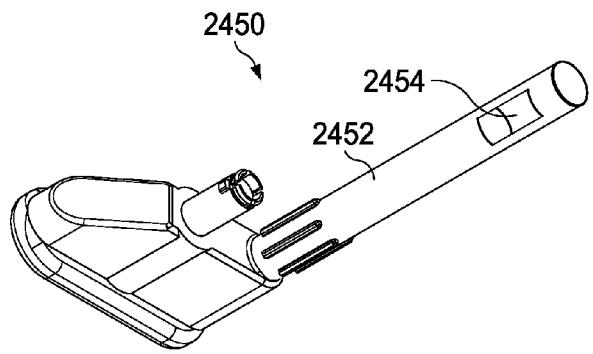

The drive shaft may feature a boss or other feature designed to engage a groove 2440 located on the helical rib 2434 of the filter fitting. When the drive shaft is pushed forward after the filter is fluidically sealed, the boss is forced into groove 2440 on the rib 2434. This provides an anti-rotation feature close to the filter fitting. The feature will not engage if the drive shaft is not in the right orientation, alerting the user that the drive handle is not rotated to the correct orientation and the seal is not complete. FIG. 24B illustrates one embodiment of a cross-section of rib 2434. FIG. 24C is a diagrammatic representation of one embodiment of drive handle 2450 having a drive shaft 2452 with boss 2454.

Figure 25:
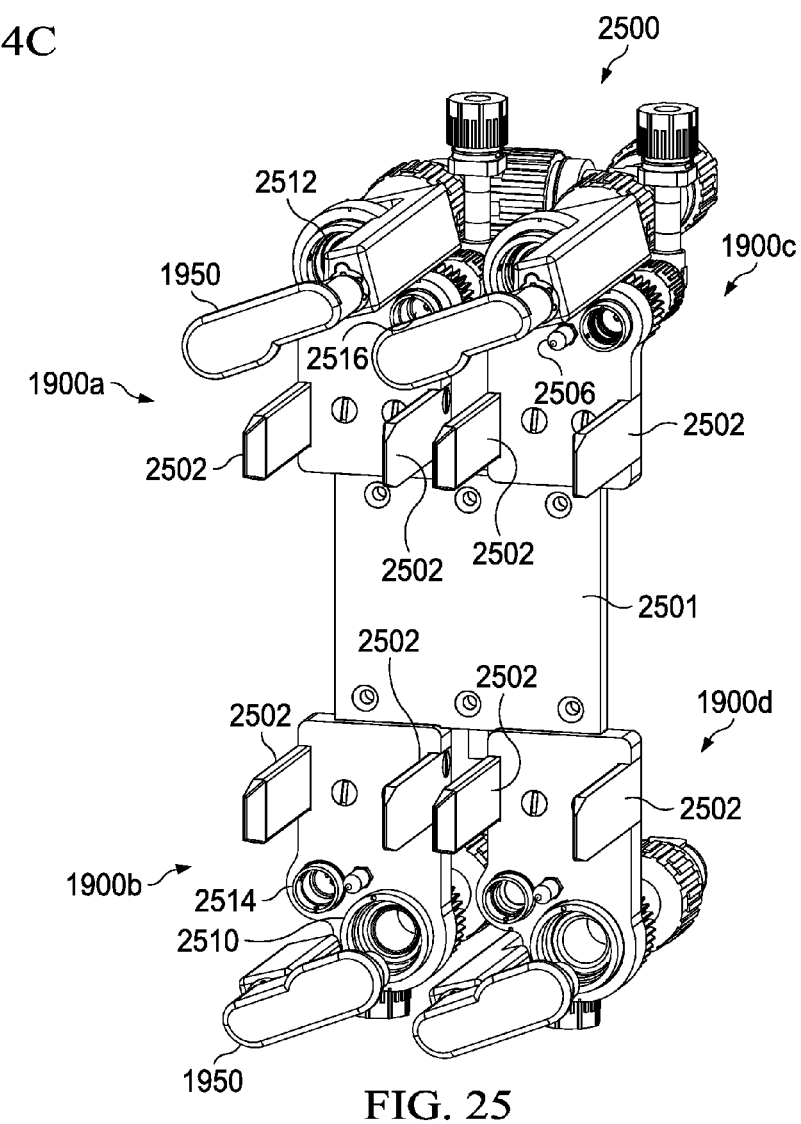
FIG. 25 is a diagrammatic representation of one embodiment of a manifold assembly.

FIG. 25 is a diagrammatic representation of one embodiment of a manifold assembly 2500 for delivering fluid to and from a filter cassette. For the sake of explanation the side of a manifold assembly that receives filter cassettes will be referred to as the front. Manifold assembly 2500 may be configured to provide, for each filter cassette, an inlet interface port that interfaces with a filter cassette inlet port, a filter outlet interface port that interfaces with a filter outlet port, a filter vent interface port that interfaces with a filter vent port and a filter drain interface port that interfaces with a filter drain port. Various fluid supply lines may be connected to the manifold fittings to provide inlet, outlet, vent and drain lines. Using the flow example of FIG. 5, manifold port 2510 is a filter inlet interface port that supplies fluid to a filter inlet, manifold port 2512 is a filter outlet interface port that receives fluid from the filter outlet, manifold port 2514 is a drain interface port and manifold port 2516 is a vent interface port. The supply lines may be arranged so that the filter cassettes perform filtration in parallel or in series.

The manifold ports may be provided by one or more paired sets of connection systems, such as connection systems 1900 (e.g., connection system 1900a and connection system 1900b pair and connection system 1900c and connection system 1900d pair) or other connection system. The connection systems may be coupled to main manifold plate 2501. According to one embodiment, one connection system in a pair is fixed, while the other connection system may translate relative to main manifold plate 2501 to allow for some compliance if the filter cassette or manifold expand or contract due to temperature and accommodate various heights of filter cassettes.

Guide arms 2502 or other features may extend forward. A shoulder or other feature of a filter cassette (e.g., shoulder 138 of FIG. 1A) may abut guide arms 2502. A cassette alignment feature 2506 may also extend forward and be used to further locate the filter relative to the manifold so that the seal connections all engage properly. Each cassette alignment feature 2506 can be received by a feature of a filter cassette (e.g., an alignment hole, such as alignment hole 134 of FIG. 1).

With reference to FIGS. 19A-25, a filter cassette can be engaged with a manifold as follows. At the initial position, drive handles 1950 will be pulled out to a retracted position and gear arms 1930 rotated counterclockwise relative position illustrated in FIG. 25 to an "open" or "non-engaged" position (so that a purification cassette can be placed in a cassette receiving area). The purifier cassette can be placed so that the shoulders of the filter cassette abutting guide arms 2502 and cassette alignment features 2506 received in corresponding openings in the filter cassette end caps. In this position, the filter cassette ports should be roughly axially aligned with the manifold ports. If not already aligned, drive handles 1950 may be rotated so that end cap alignment posts 1954 align with alignment openings in the filter cassette and splines engage with the gear arm insert 2206 (FIG. 22B). Drive handles 1950 can be pushed forward so that the end cap alignment posts enter into keyed alignment openings in the filter cassette. Drive handles 1950 can be further translated until the alignment posts 1954 hit the stops at the end of axial entrance channels 2302 of the alignment openings. This action may translate the filter cassette ports toward the connection nuts 1910 and 1920 so that the start of the external threads of the filter cassettes are properly timed with the internal connection nut threads.

Drive handles 1950 may be rotated clockwise around the pivot point provided by end cap alignment posts until the projections 2208 align with axial channels 2308. Drive handles 1950 may then be translated forward so that the drive shaft 1952 engages notch 1964 and the compression ring 2209 is captured by ridge 2312. The rotation of drive handles 1950 causes the connection nuts to rotate, creating a seal between the manifold ports and filter ports. The rotation of connection nuts results in translation of the connection nuts in connection housing 1902. The bottom and top drive handles 1950 may be manipulated simultaneously so that all the ports seal at one time or one of the top or bottom sets of ports may be sealed first. It may be preferable, in some cases, to seal the top ports first so that the weight of the cassette does not apply undue moment on the lower ports.

It can be noted that the connection systems 1900a, 1900b, 1900c and 1900d can be actuated to create multiple port seals at one time with less than 360 degrees of rotation and can be configured to accommodate any number of connection nuts (e.g. 2, 3, 4, 5, 6, etc.). This manipulation can be done from the front of the manifold even though the filter cassette may be between the manifold and operator because gear arms 1930 extend over/under/around the cassette to the front. Thus, the operator may seal rear ports of the filter cassette without access to the rear ports.

Furthermore, the alignment features and simple and controlled translation and rotational motions facilitate performance of filter changes by a robot. Additional features may also be included, such as IR tags on the manifold and filter cassettes, alignment markings or other features that can be read by a robot or scanner to facilitate accurate filter changes.

Figure 26:
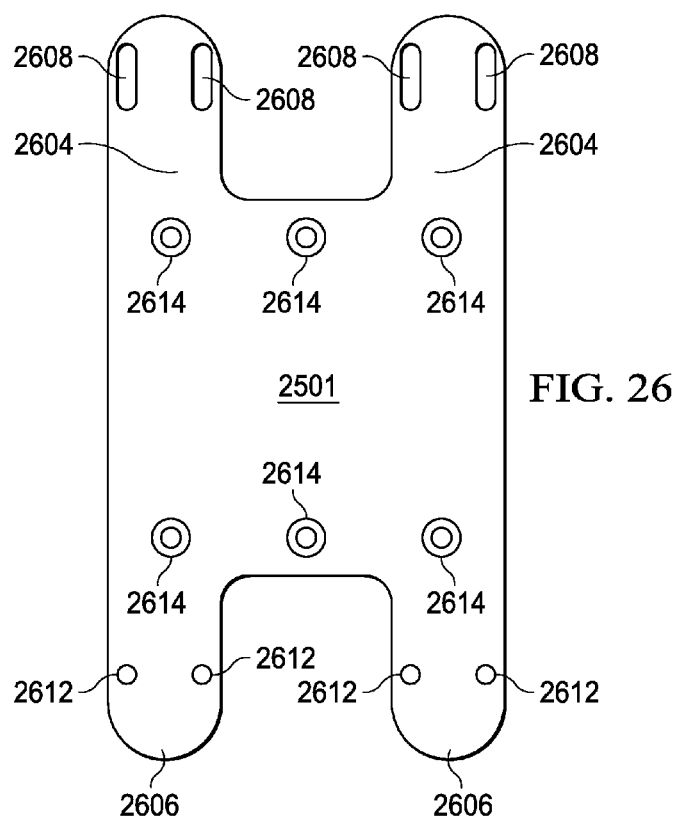
FIG. 26 is a diagrammatic representation of one embodiment of a main manifold plate.

FIG. 26 is a diagrammatic representation of one embodiment of a main manifold plate 2501. Main manifold plate 2501 can comprise a set of connection system extensions 2604 and 2606. Extensions 2604 can include slots 2608 to accommodate a fastener passing through the connection housing (e.g., through openings 2008 of FIG. 20) such that the upper connection housings may translate vertically and extensions 2606 may include holes 2612 such that the lower connection housings are fixed. In another embodiment, the upper connection housings may be fixed and the lower connection housings may translate or both the upper and lower connections may be fixed or may translate. Main manifold plate 2501 may include a series of mounting holes 2614 so that main manifold plate 2501 may be mounted to a support.

Figure 27:
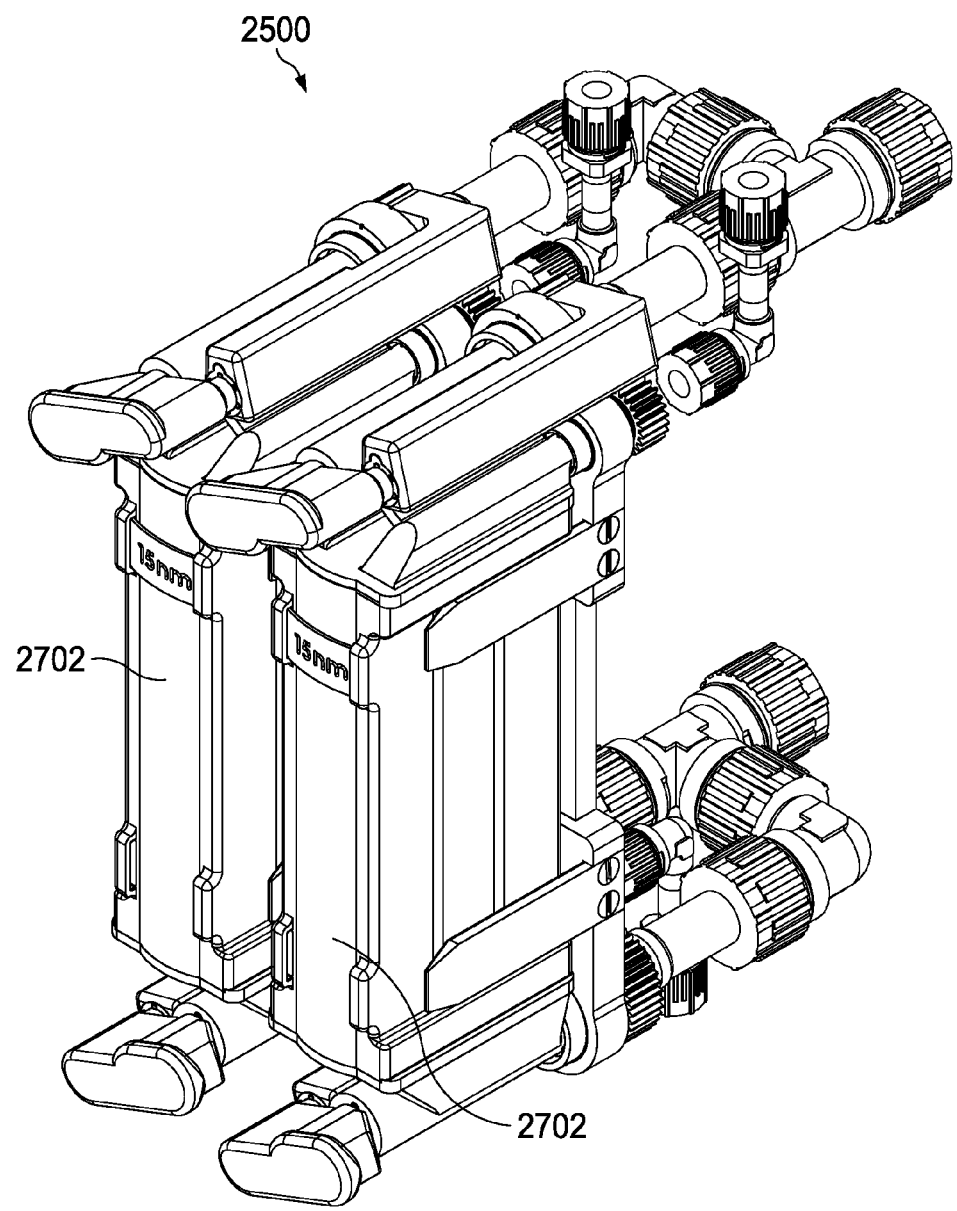
FIG. 27 is a diagrammatic representation of one embodiment of a manifold and cassettes.

FIG. 27 is a diagrammatic representation of one embodiment of a manifold assembly 2500 with filter cassettes 2702 connected. Filter cassettes 2702 may comprise any suitable filter cassette. While FIG. 27 illustrates a manifold configured to accept two filter cassettes, manifolds may be configured for a single cassette or any number of cassettes (e.g., 2, 3, 4, 5, 6 or more).

Figure 28:
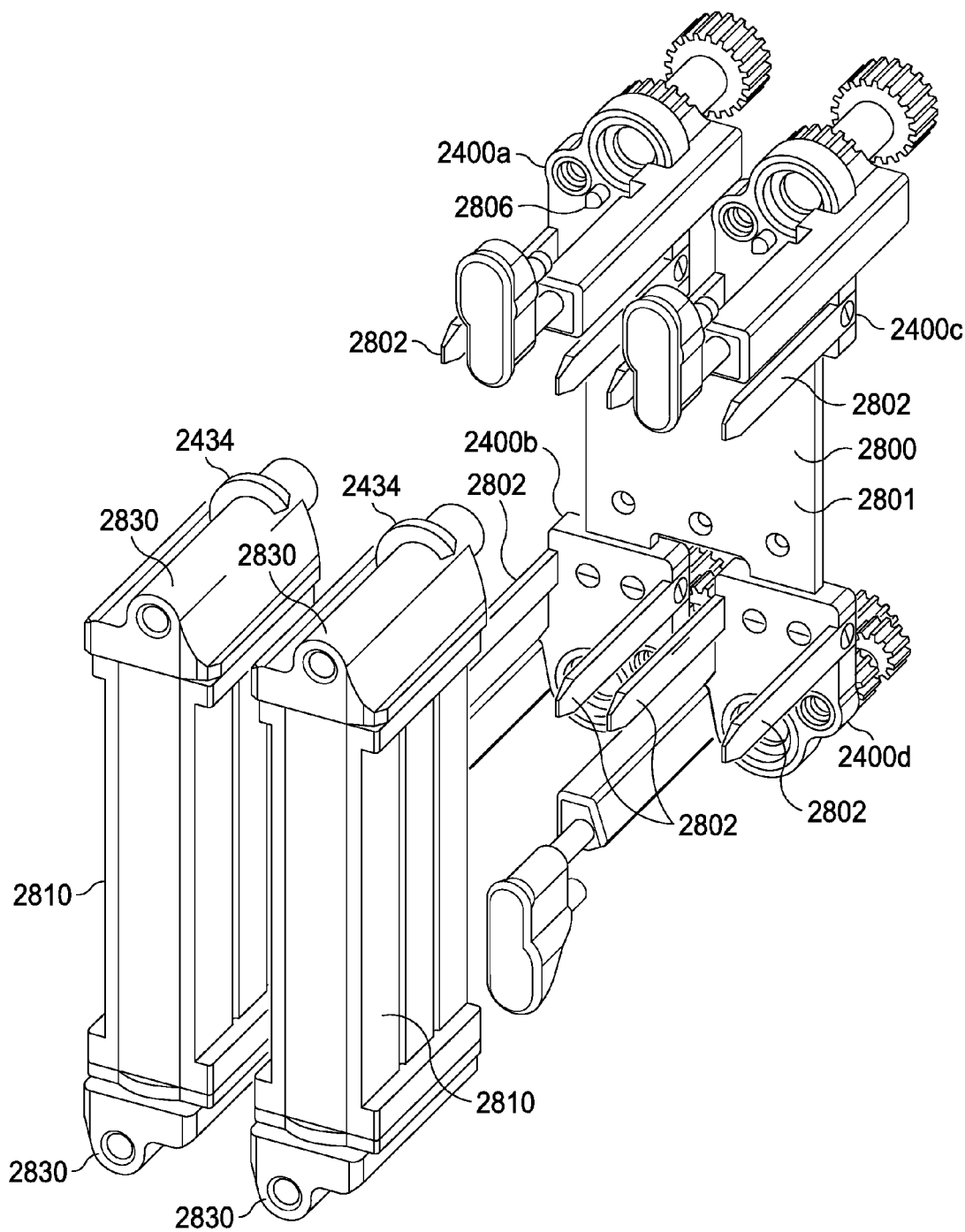
FIG. 28 is a diagrammatic representation of another embodiment of a manifold assembly and cassettes.

FIG. 28 is a diagrammatic representation of another embodiment of a manifold assembly 2800 similar to manifold assembly 2500, but configured to receive filter cassettes 2810 having helical ribs 2434 and using gear arms with slots that engage the helical ribs. Manifold assembly 2800 may be configured to provide, for each filter cassette, an inlet interface port that interfaces with a filter cassette inlet port, a filter outlet interface port that interfaces with a filter outlet port, a filter vent interface port that interfaces with a filter vent port and a filter drain interface port that interfaces with a filter drain port. Various fluid supply lines may be connected to the fluid fittings to provide inlet, outlet, vent and drain lines. The supply lines may be arranged so that the filter cassettes perform filtration in parallel or in series.

The manifold ports may be provided by one or more paired sets of connection systems 2400 (e.g., connection system 2400a and connection system 2400b pair and connection system 2400c and connection system 2400d pair) or other connection system. The connection systems may be coupled to main manifold plate 2801. According to one embodiment, one connection system in a pair is fixed, while the other connection system may translate relative to main manifold plate 2801.

Guide arms 2802 may be provided. A shoulder or other feature of a filter cassette may abut guide arms 2802. The cassette alignment feature 2806 may also be used to further locate the filter relative to the manifold so that the seal connections all engage properly. The cassette alignment feature may be received by a feature of the filter cassette (e.g., an alignment hole, such as alignment hole 134 of FIG. 1). Alignment openings 2830 may receive an alignment post of a drive handle to guide movement of the drive handle.

Figure 29:
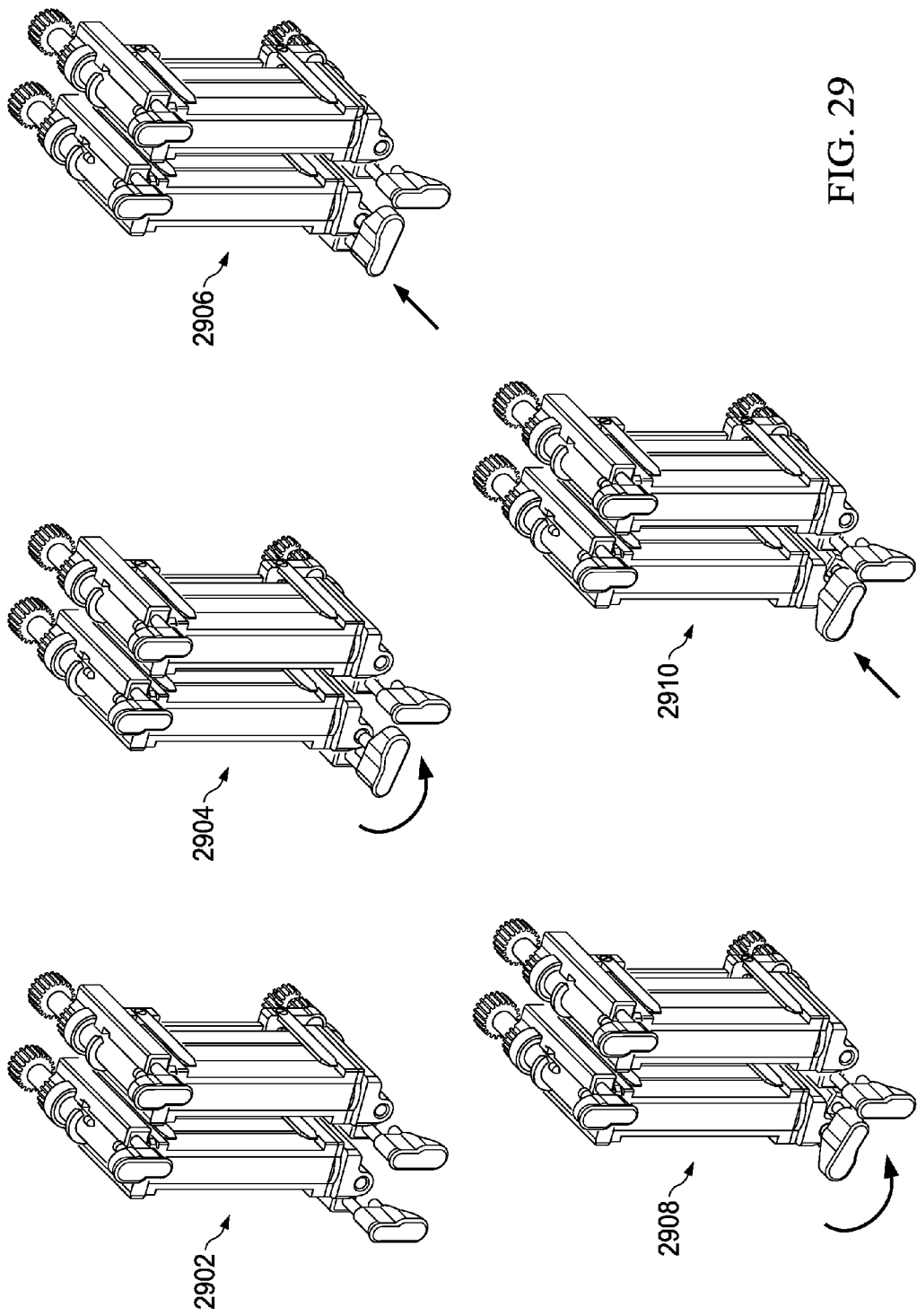
FIG. 29 is a diagrammatic representation of one embodiment of connecting cassettes to a manifold assembly.

FIG. 29 illustrates example steps of installing filters 2810 in manifold 2800. At step 2902 the filter may be placed so that the filter ports are aligned with the manifold port connection nuts. At step 2904, the lower drive handle is rotated so that the alignment post is aligned with the alignment opening in the lower end cap. At step 2906, the lower drive handle is pushed in until it reaches the first stop. The alignment post acts as pivot. At step 2908, the pivot is used to rotate the drive handle, which rotates the gear arm, causing the connection nuts to rotate and form a seal. During this process, the helical slot in the gear arm engages the helical rib. At step 2910, the drive handle is translated forward to its final position. During this translation a boss (e.g., boss 2454 of FIG. 24C) may be captured in a notch (e.g., notch 2440 of FIG. 24A) in the helical rib. This process can be repeated for each handle.

Figure 30:
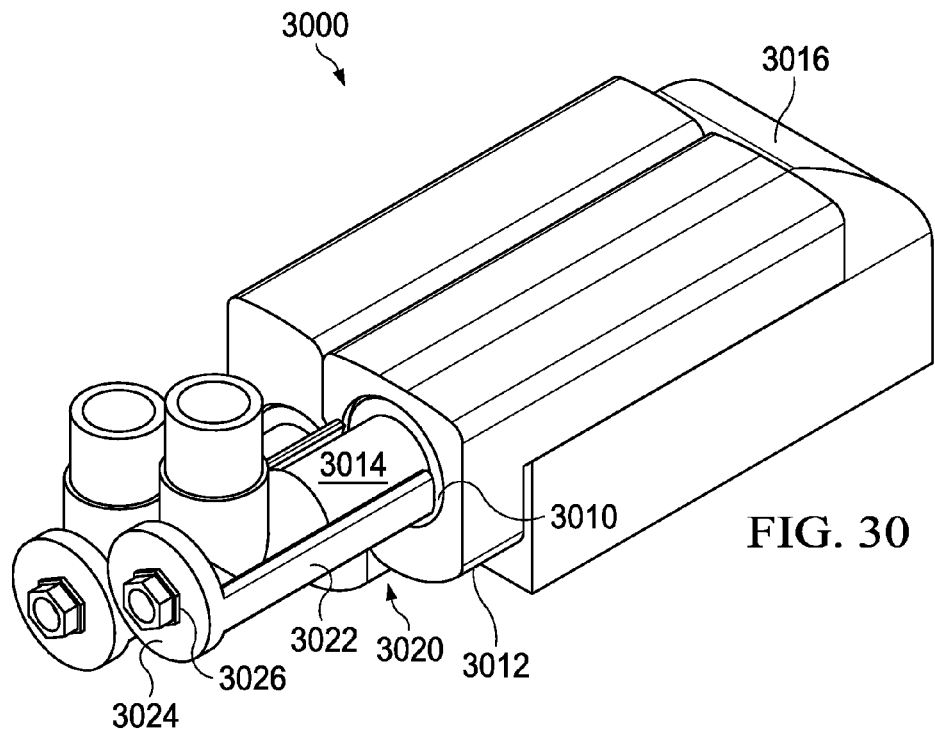
FIG. 30 is a diagrammatic representation of another embodiment of a connection system.

FIG. 30 illustrates another embodiment of a connection system 3000 for connecting to a filter cassette end cap or other fitting. Connection system 3000 can include a connection nut 3010 disposed on a connection housing 3012. The connection nut 3010 connects an elbow fitting 3014 to a fitting on an end cap 3016. A rotation member 3020 facilitates rotating of nut 3010. According to one embodiment, rotation member 3020 comprises an arm 3022 coupled to nut 3010 a radial distance from the opening through nut 3010. The arm 3022 can extend from an end face of the nut 3010. Arm 3022 can be longer than a first portion of elbow fitting 3014 that is coaxial with the end cap fitting. The rotation member 3020 can also include a platform 3024 extending perpendicular to arm 3022 so that an outer face of platform 3024 is parallel to the end face of nut 3010. Platform 3024 can include a tool interface 3026 to allow a rotary tool bit (e.g., such as a hex driver, Philips bit, flat head bit, star bit or other tool, to engage with the rotation member). Rotating rotation member 3020 rotates the nut 3010. In some embodiments, rotating rotation member 3020 less than 360 degrees, including less than 180 degrees and, in some cases, less than 135 degrees, may cause 360 degree engagement of the inner threads of the nut with the outer threads of the end cap 3016.

The range of rotation of rotation member 3020 may be limited so that nut 3010 stops rotating in known positions. This can help ensure that the threads of nut 3010 are properly aligned in the fully disengaged position. In some embodiments, the end points of rotation may be marked by dots and arrows or other visual indicators. The dots and arrows also provide one example of a visual indicator used to confirm engagement or disengaged. In yet another embodiment, LEDs or other lights that turn on when the rotation member is in the proper position may be used, again providing an indication of proper engagement/disengagement.

Figure 31:
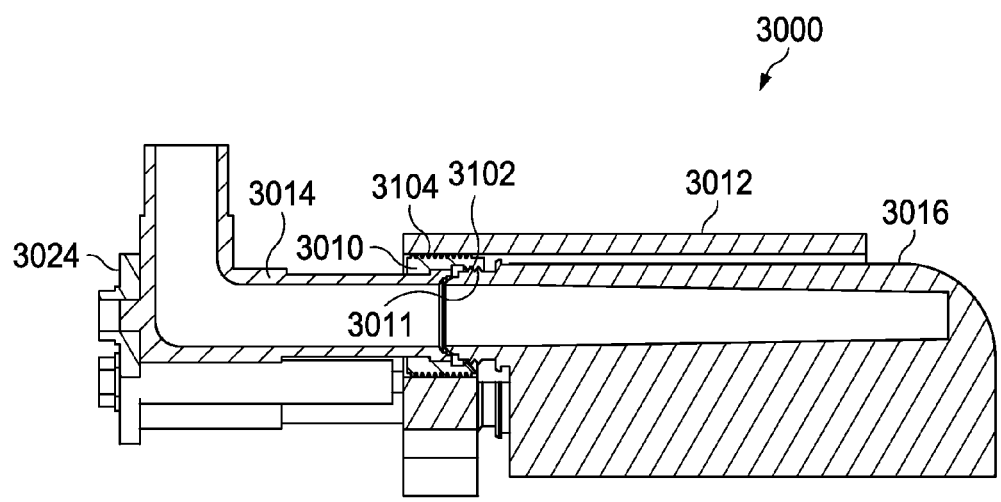
FIG. 31 is a diagrammatic representation of a view of one embodiment of a connection system.

FIG. 31 is a diagrammatic representation of a cross-section of one embodiment of connection system 3000. As depicted in FIG. 31, connection nut 3010 may include inner nut threads 3102 that engage with outer threads 3011 on the port fitting of end cap 3016 and outer nut threads 3104 that engage with inner threads of connection housing 3012. As describe above, threads can be configured so that nut 3010 creates a 360 seal between fitting 3014 and end cap 3016 with less than 360 degrees of rotations and will not back out under expected loads.

A locking mechanism (e.g., such as detents and/or indents on the rotating member of fitting, snap fits between the rotating member and fitting or other component or other features) may also be provided to prevent the rotating member from rotating unexpectedly. In some cases, the locking mechanism may be used in lieu of the outer nut threads to prevent backing out of the nut.

Figure 32:
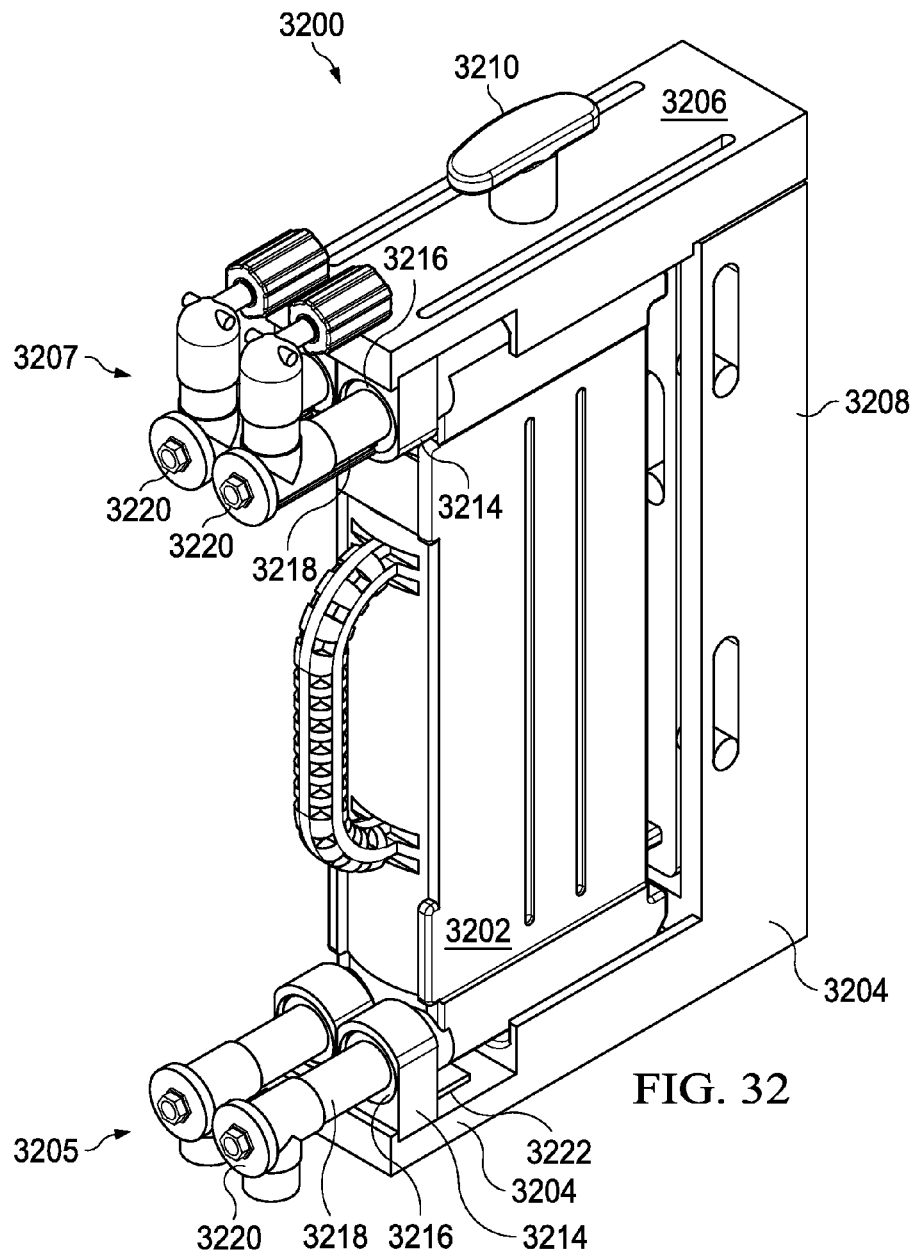
FIG. 32 is a diagrammatic representation of another embodiment of a manifold assembly and cassette.

FIG. 32 illustrates another embodiment of a manifold assembly 3200. A filter cassette 3202 may be coupled to manifold assembly 3200 so that fluid can be directed to/from the filter cassette 3202. Although shown in a vertical orientation, the filter and manifold can be used in any orientation including horizontally. Manifold assembly 3200 comprises a lower support arm 3204 extending in a first direction to pass under filter cassette receiving area (e.g., a bay) and an upper support arm 3206 that extends in the first direction to overhang the filter cassette receiving area. Lower support arm 3204 and upper support arm 3206 provide support for connection systems 3205 and 3207 used to connect ports of the filter cassette to fittings directing fluid to/from the filter cassette. An intermediate portion 3208 separates the lower support arm 3204 and upper support arm 3206 a distance.

Upper support arm 3206 may be coupled to an extension arm that can extend relative to intermediate portion 3208 so that the distance between upper support arm 3206 and lower support arm can be changed. Pulling on handle 3210 translates upper support arm 3206 (e.g., vertically). Intermediate portion 3208 of the main assembly may provide guide slots that guide pins extending from the extension arm or a filter alignment bracket.

According to one embodiment, the connection systems can operate as discussed above, though other connection systems may be used. Thus, a connection system may include a connection housing 3214 housing a connection nut 3216 rotatable about a fitting 3218. A rotation member 3220 may rotate the connection nut 3216 to seal fitting 3218 to the port of a filter cassette.

Fluid supply lines may be connected to the connection system fittings such that any port acts as a vent interface port, drain interface port, filter inlet interface port or filter outlet interface port. Using the flow paths of FIG. 9, for example, the upper connection system ports can provide vent interface ports while the lower connection system ports provide filter inlet interface and filter outlet interface ports.

Each upper and each lower connection housing 3214 may be coupled to the upper and lower support arms respectively in a manner that allows the connection housings to translate (e.g., horizontally) to accommodate placement of the filter cassette and to allow movement of connection housings 3214 when the respective nuts 3216 are rotated to engage/disengage fittings. Connection housings 3214 may be independently movable. Connection housings 3214 may be coupled to the support arms by capturing guide features that allow horizontal translation of the connection housings 3214. In the example illustrated, the guide features are dovetail tracks (with one dovetail track 3222 indicated).

Figure 33:
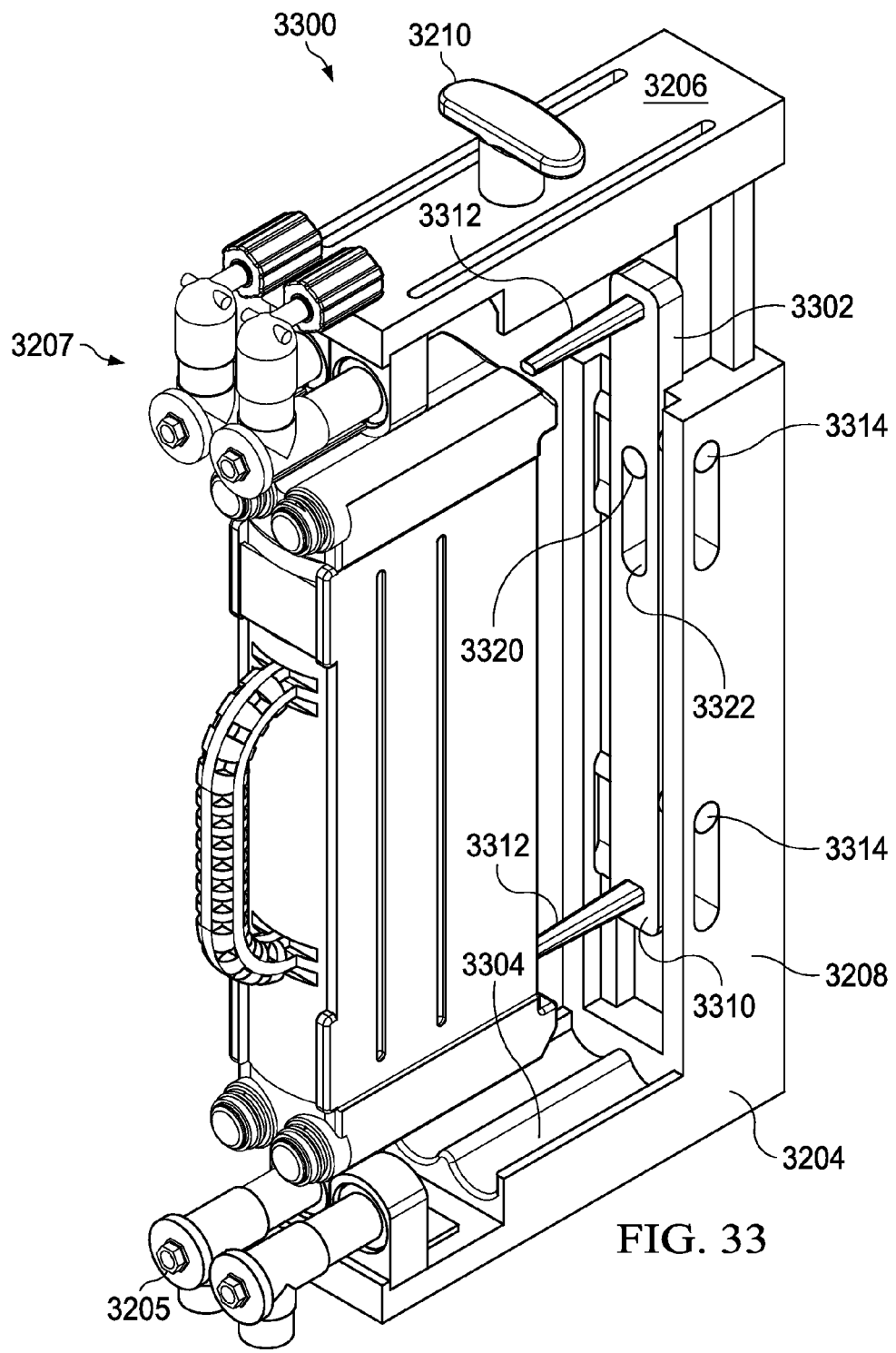
FIG. 33 is a diagrammatic representation of another embodiment of a manifold assembly and cassette.

FIG. 33 is a diagrammatic representation of another view of manifold assembly 3200 3200 including upper extension arm 3300 coupled to upper support arm 3206 and a filter alignment bracket 3302, which provide support for connection systems 3205 and 3207. FIG. 33 also depicts that upper extension arm 3206 and lower extension arm 3204 may provide filter seats (e.g., filter seats 3304) to conform to the profile of the filter cassette ends.

Filter alignment bracket 3302 is disposed in a channel between sidewalls of intermediate portion 3208 and comprises a back plate 3310 and spaced guide arms 3312 or other features that extend forward from back plate 3310 to be received by complementary features on the filter cassette (or the back plate can receive features, such as protrusions, from the cassette), thereby helping to align the filter cassette in an initial position. Filter alignment bracket 3302 may be movable relative to the main assembly in the same direction as extension arm 3300.

According to one embodiment, guide pins 3314 projecting from side of back plate 3310 may be captured in slots in the side walls of intermediate portion 3208. Furthermore, a guide pin 3320 projecting forward from extension arm 3300 may be captured in slot 3322 of back plate 3310. As extension arm 3300 translates down, back plate 3310 can move down with extension arm 3300. In the opposite direction, guide pin 3320 can push on the top of the corresponding slot 3322 to lift back plate 3320 back up. A biasing member, such as a spring, may be provided to bias the extension arm 3300 to an extended position or to a non-extended position.

Figure 34A:
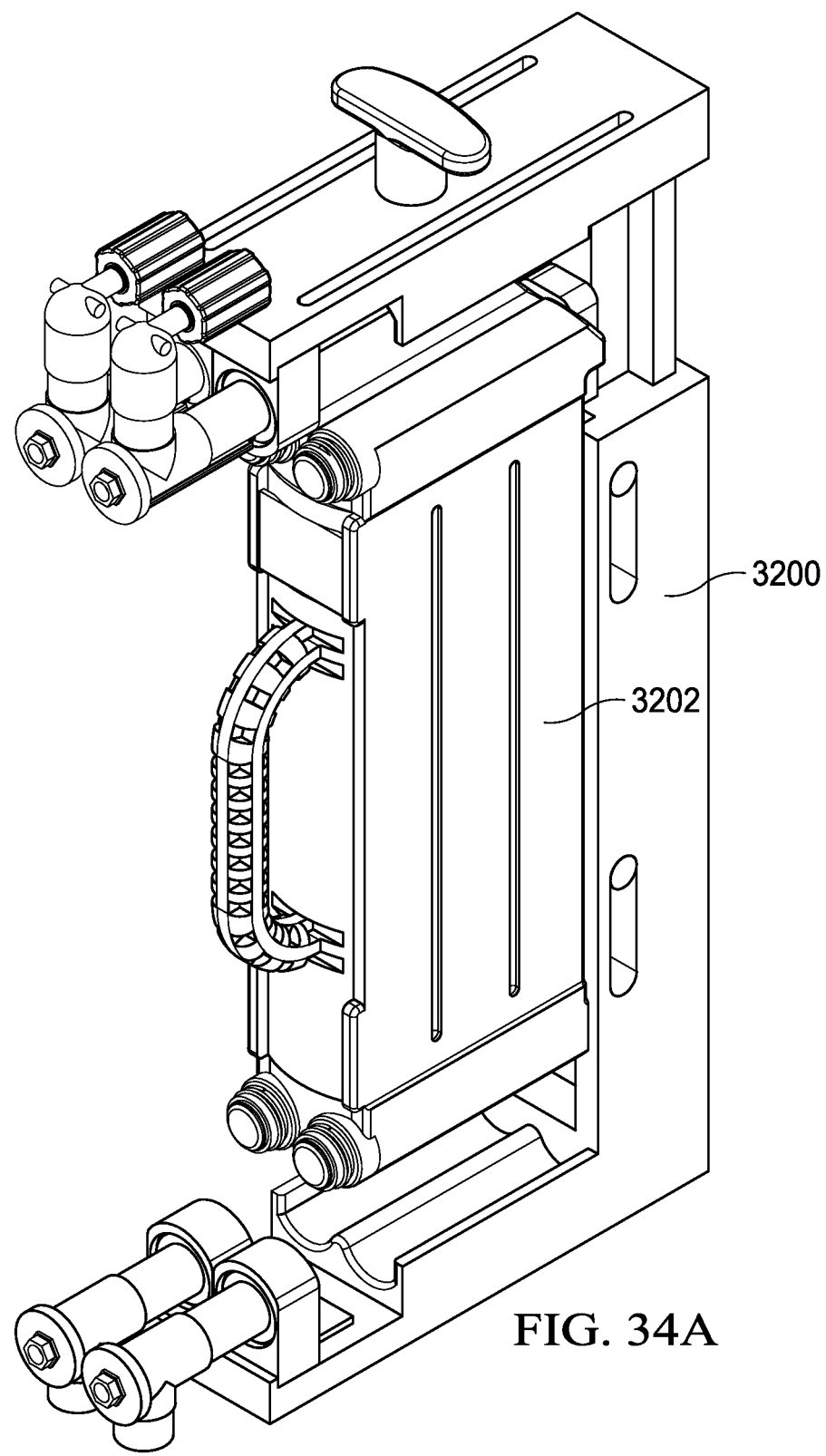
FIGS. 34A-34E are diagrammatic representations of another embodiment of connecting a cassette to a manifold assembly.
Figure 34B:
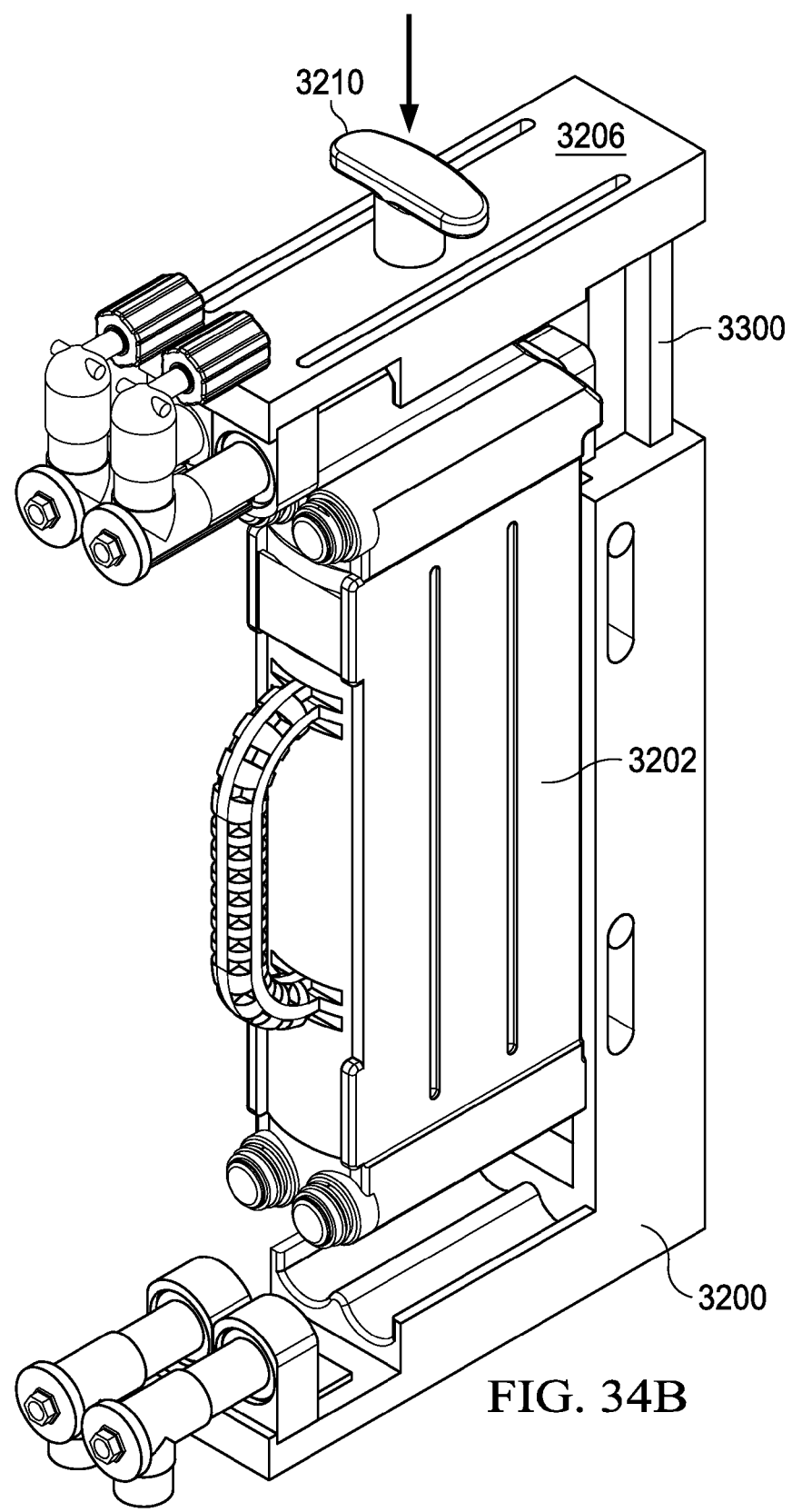
Figure 34C:
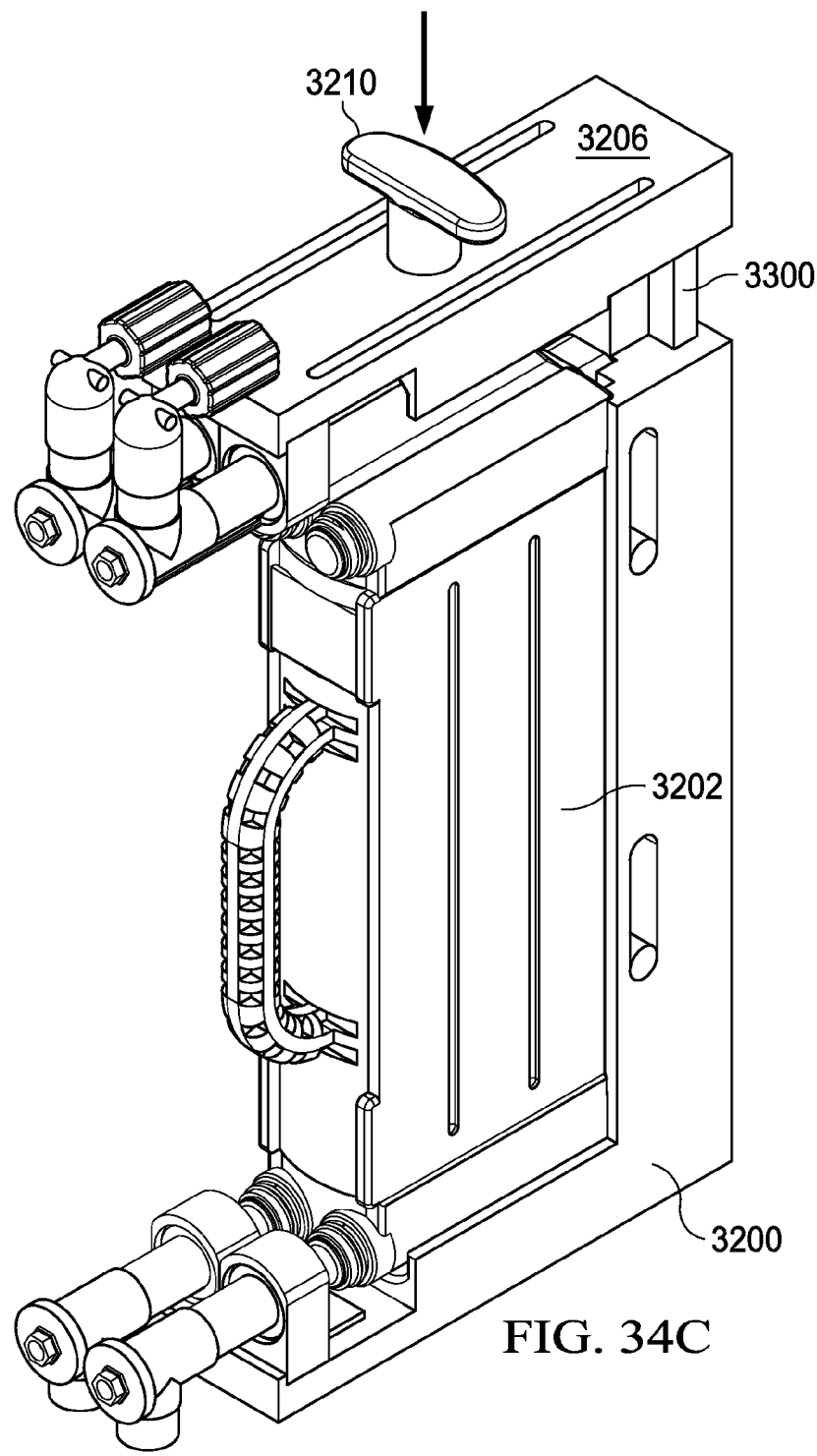
Figure 34D:
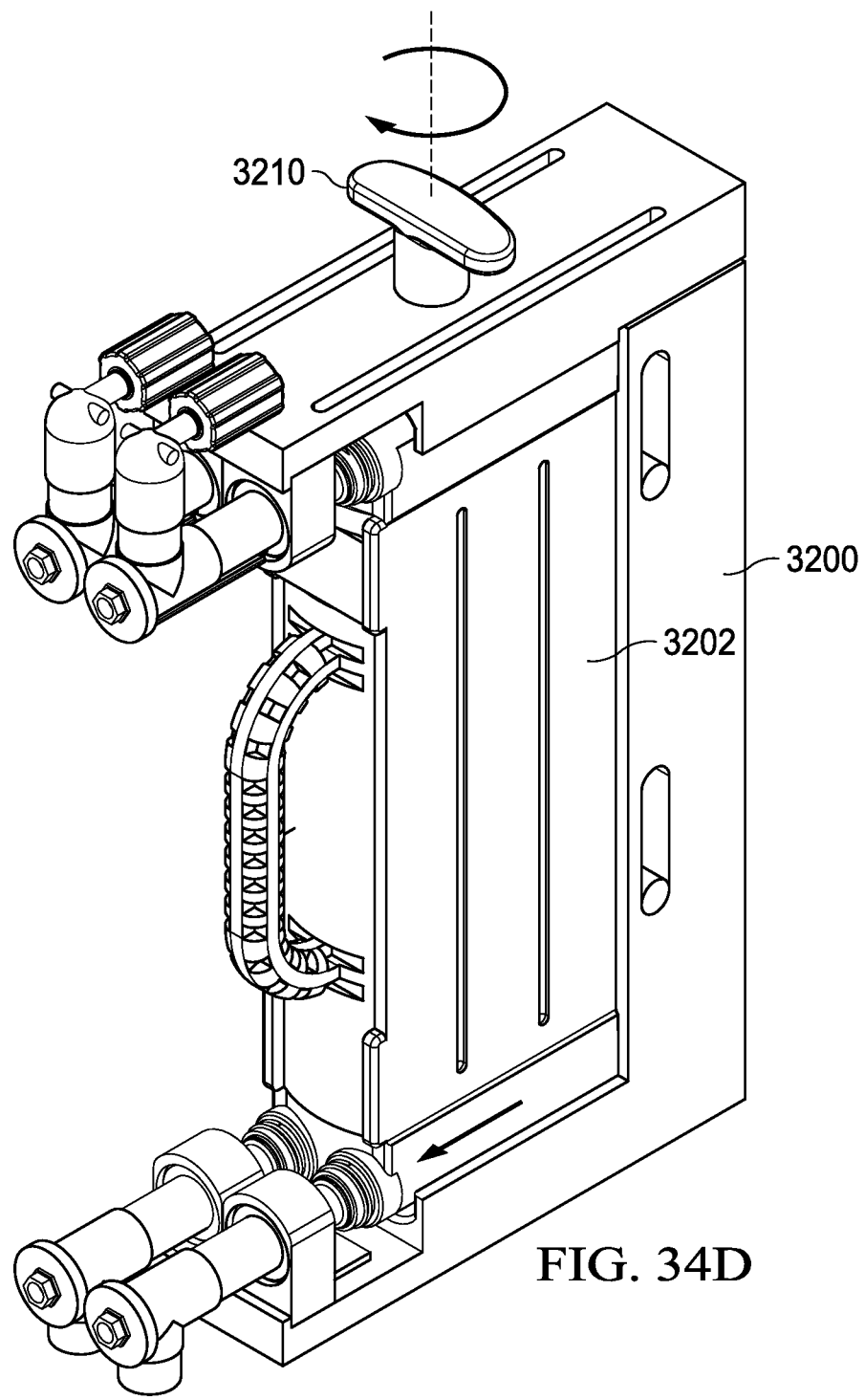
Figure 34E:
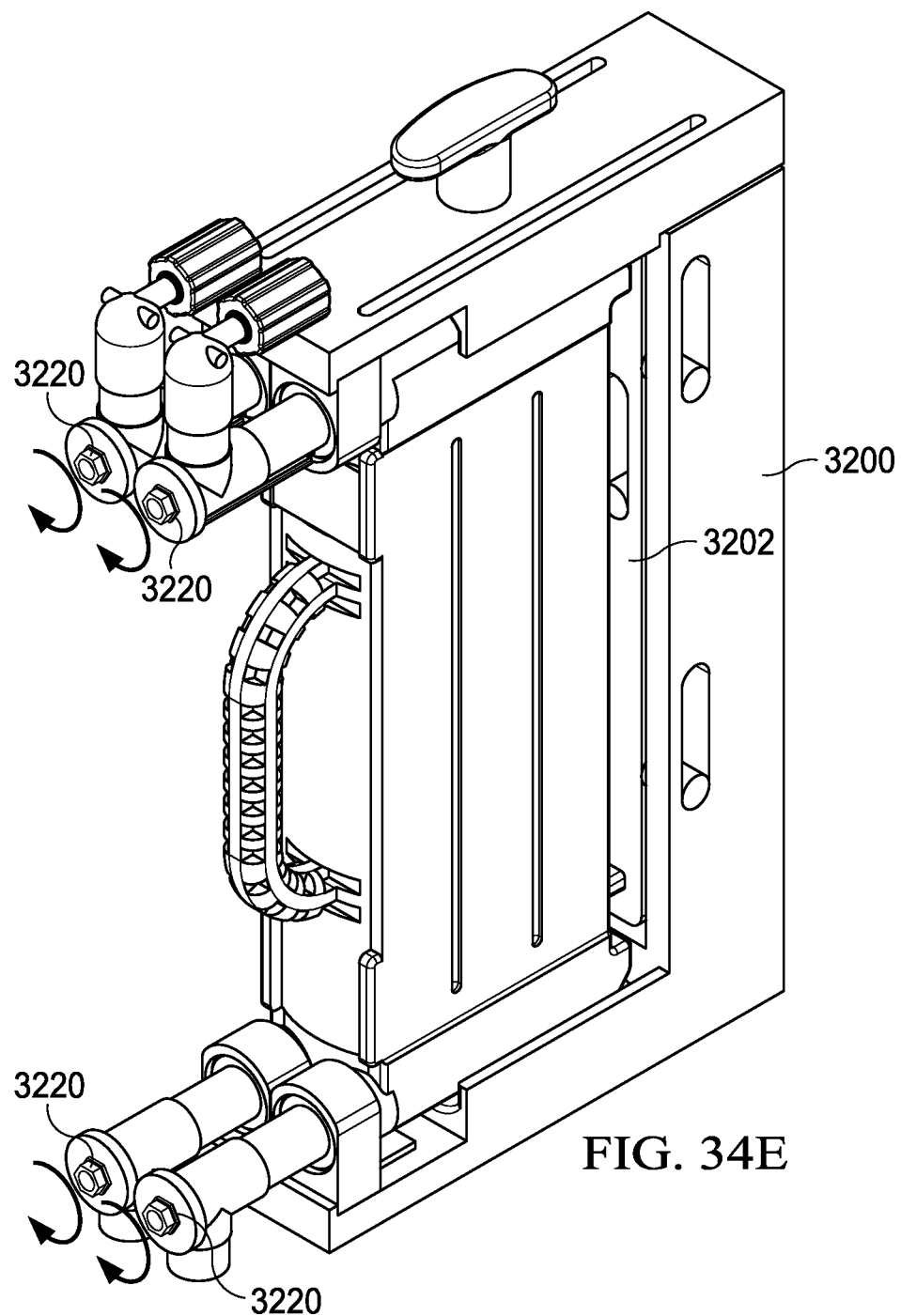

FIGS. 34A-E are diagrammatic representations of one embodiment of coupling a filter cassette 3202 to manifold assembly 3200. Filter cassette 3202 is inserted into the filter receiving area of the manifold assembly 3200. The filter cassette receives the arms or other guides of the filter alignment bracket (FIG. 34A). Engagement handle 3210 can be pushed down to drop filter cassette 3202 to a filter lower position and the upper support arm to an upper support arm lower position in which the filter cassette ports are axially aligned with the connection nuts (FIGS. 34B-C). It can be noted that that for some range of travel, the filter alignment bracket and extension arm 3300 may travel together until the filter alignment bracket reaches its bottom position. At this point, the extension arm 3300 can continue to translate until upper support arm 3206 is in its final position. Engagement handle 3210 can be rotated to drive filter cassette 3202 toward the manifold ports (FIG. 34D). Rotation members 3220 can be rotated to seal the manifold ports and filter ports (FIG. 34E).

Figure 35A:
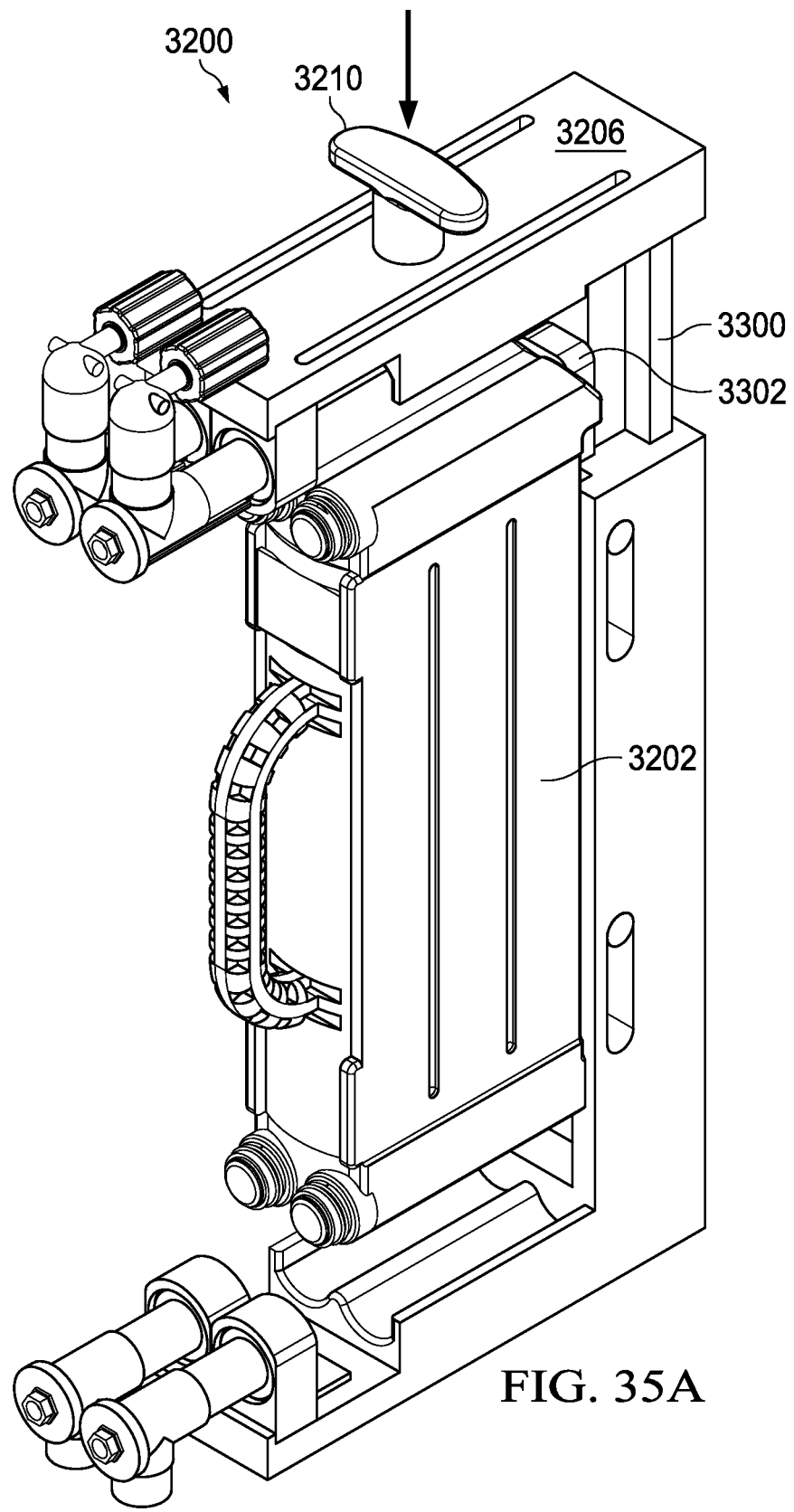
FIGS. 35A-35E are diagrammatic representations of another embodiment of connecting a cassette to a manifold assembly.
Figure 35B:
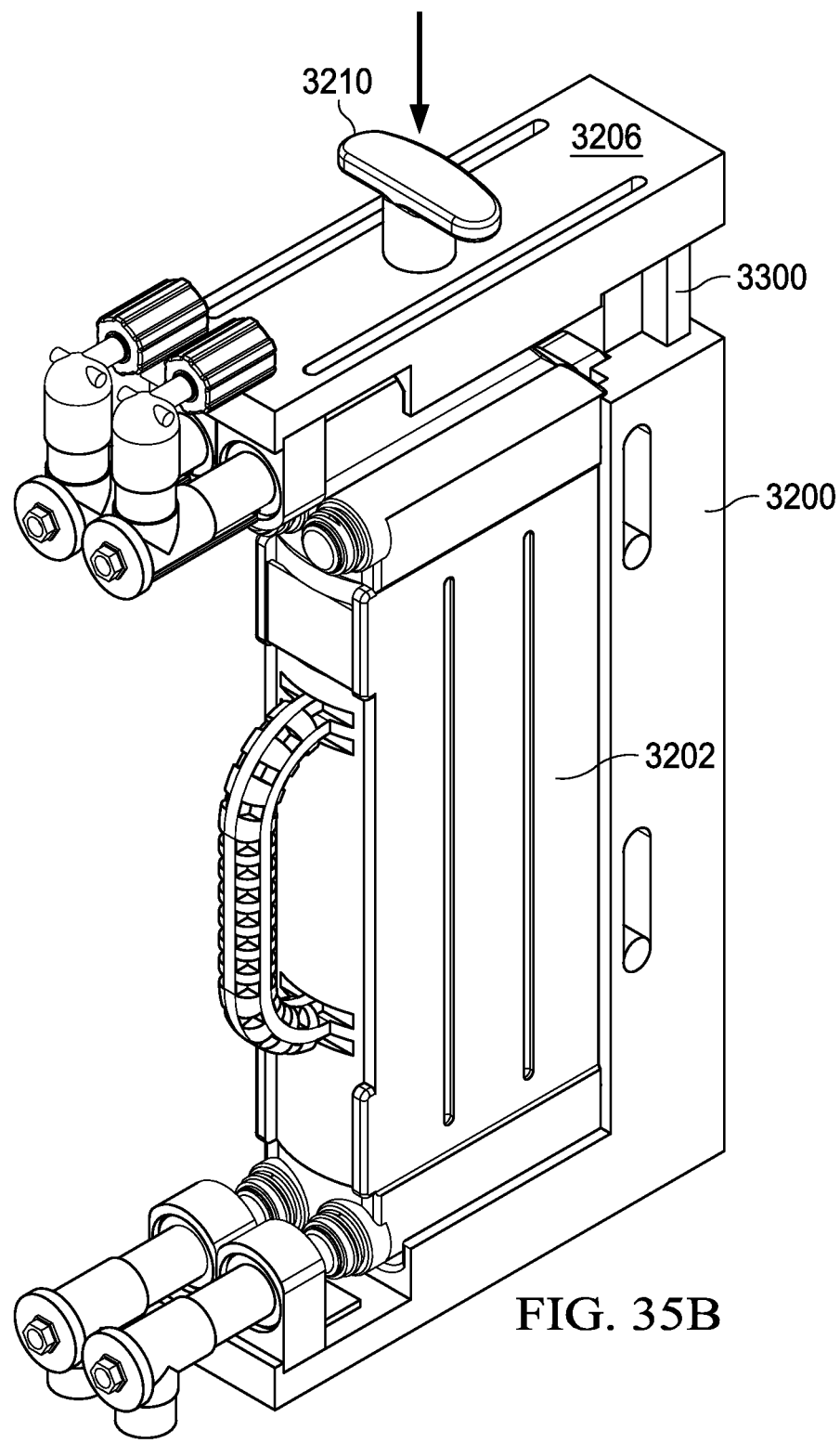
Figure 35C:
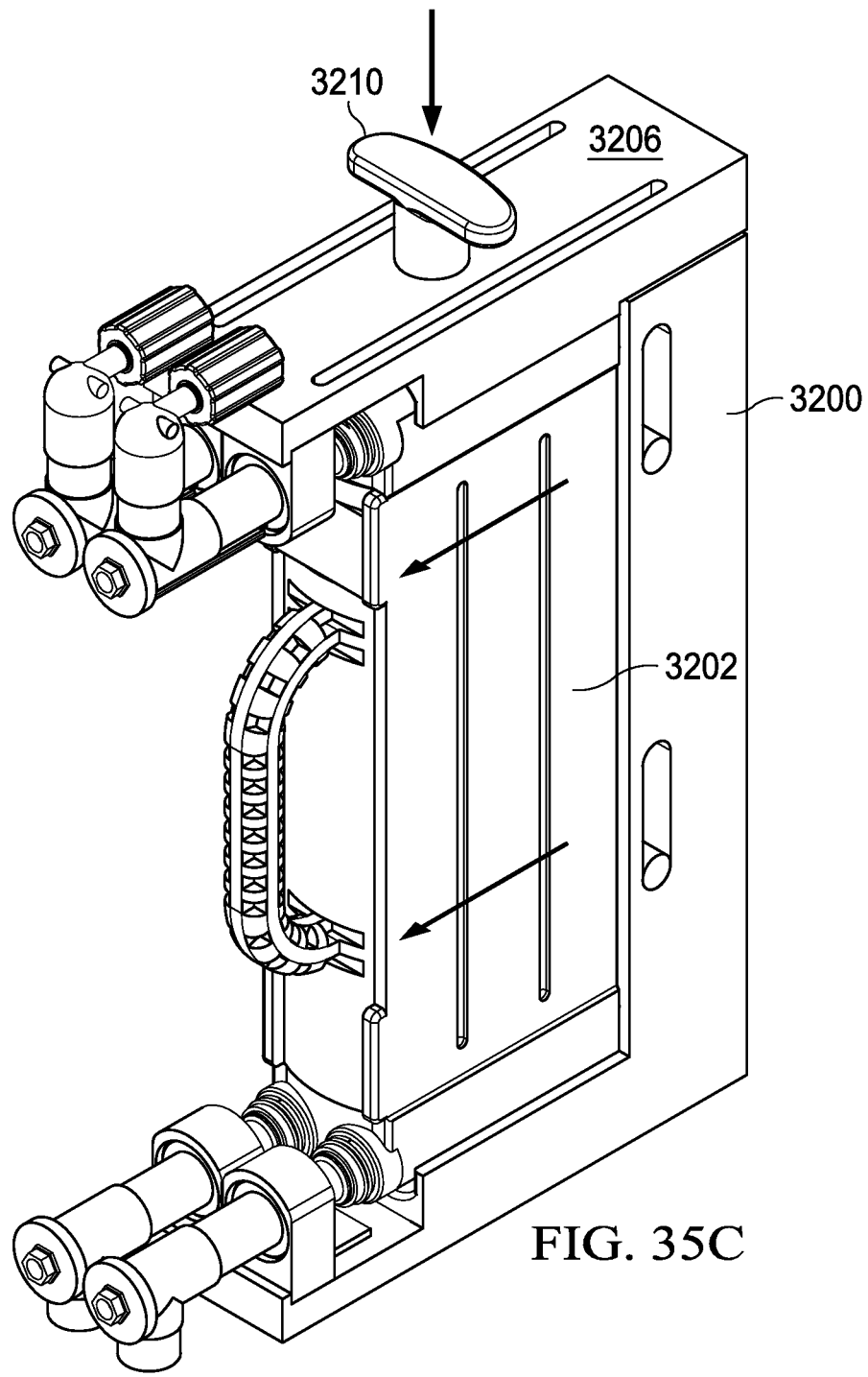
Figure 35D:
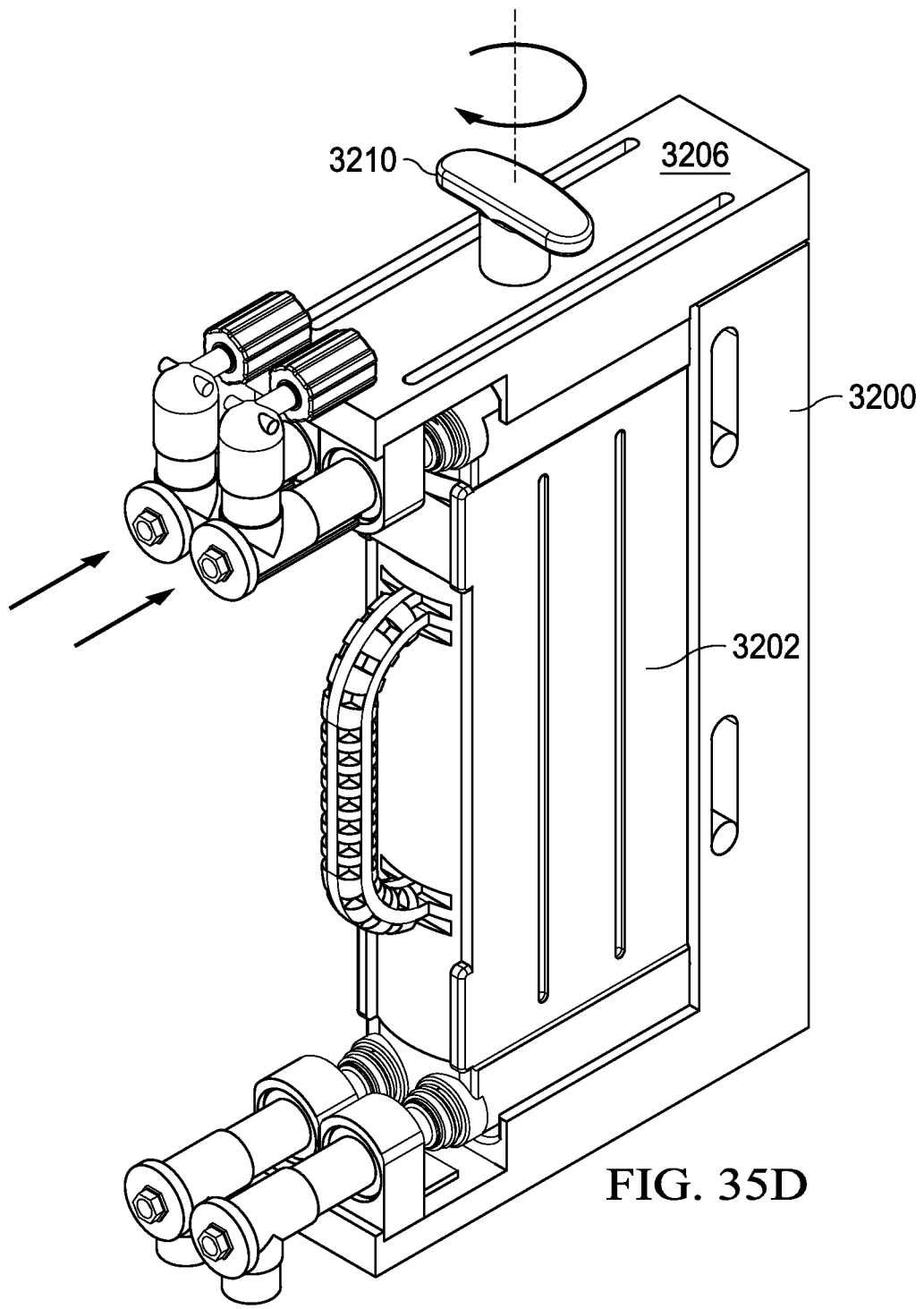
Figure 35E:
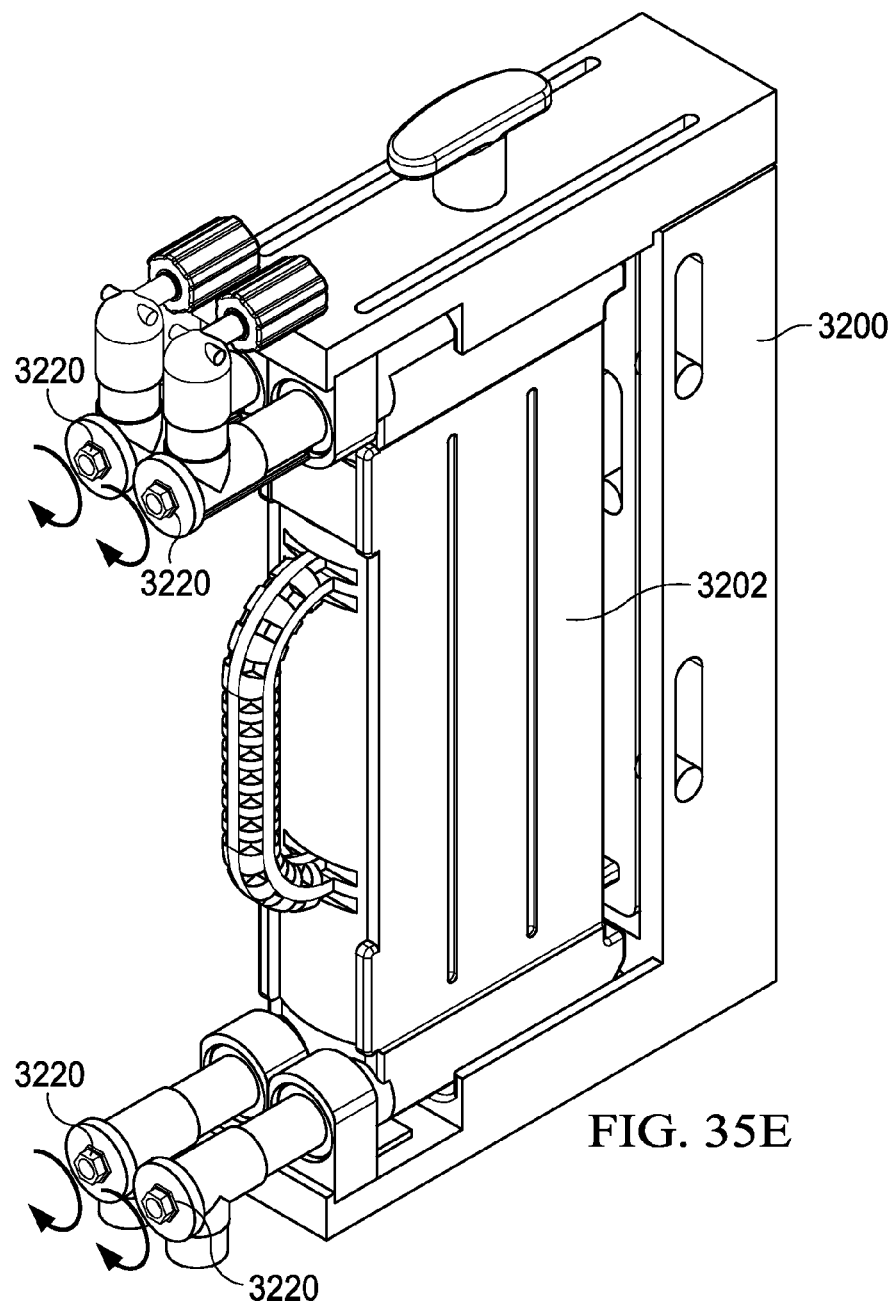

In another embodiment, extension arm 3300 is operatively coupled to a linkage or other mechanism to translate the filter cassette back and forth so that vertical movement of extension arm 3300 can translate into horizontal movement of the filter cassette. In one embodiment, extension arm 3300 moves over a first range of motion to lower the filter alignment bracket 3302 and a second range of motion to translate the filter cassette 3202. Engagement handle 3210 is operatively coupled to a mechanism to move the upper connection housing and manifold ports. FIGS. 35A-D are diagrammatic representations of one embodiment of inserting a filter cassette in such an embodiment. Filter cassette 3202 is inserted into the filter receiving area of the manifold assembly 3200. The filter cassette receives the arms or other guides of the filter alignment bracket. Engagement handle 3210 can be pushed down to drop filter cassette 3202 to a filter lower position and the upper support arm to an upper support arm lower position in which the filter cassette ports are axially aligned with the connection nuts (FIGS. 35A-C). It can be noted that that for some range of travel, the filter alignment bracket 3302 and extension arm 3300 may travel together until the filter alignment bracket reaches its bottom position. At this point, the extension arm 3300 can continue to translate until upper support arm 3206 is in its final position. Extension arm 3300 may be operatively coupled to filter cassette 3202 such that the further translation of extension arm 3300 in the vertical direction pushes filter cassette 3202 toward the manifold ports (FIG. 35C) resulting in the bottom filter cassette ports being received in the bottom connection nuts. Engagement handle 3210 can be rotated to drive the upper manifold ports toward the upper cassette ports until the upper cassette ports are received in the connection nuts (FIG. 35D). Rotation members 3220 can be rotated to seal the manifold ports and filter ports (FIG. 35E).

Figure 36:
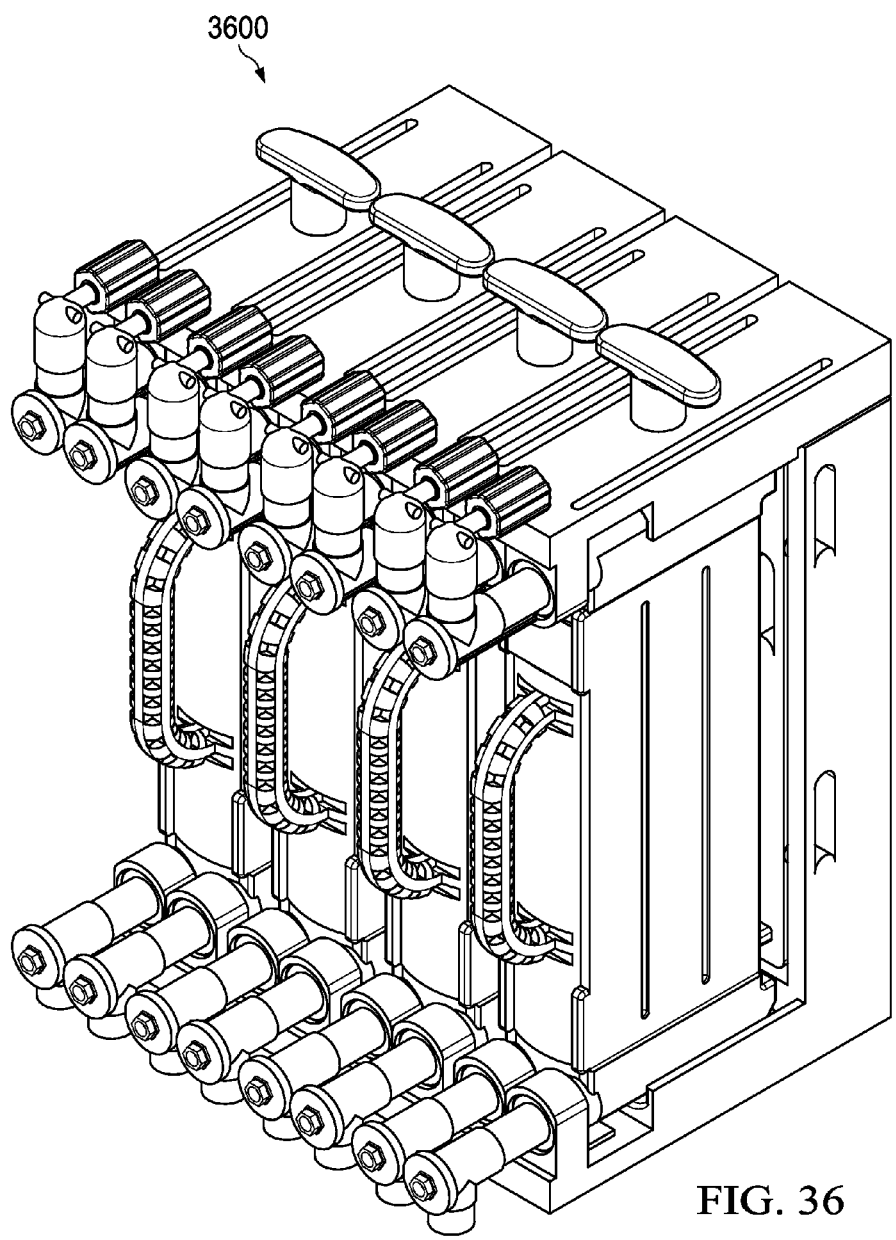
FIG. 36 is a diagrammatic representation of one embodiment of a set of manifold assemblies and cassettes.

FIG. 36 is a diagrammatic representation of one embodiment of a filtration system 3600 comprising multiple filter cassettes. The supply lines may be configured so that the filter cassettes provide serial or parallel filtration or a combination thereof as needed, showing that multiple manifolds may be located side-by-side.

Figure 37A:
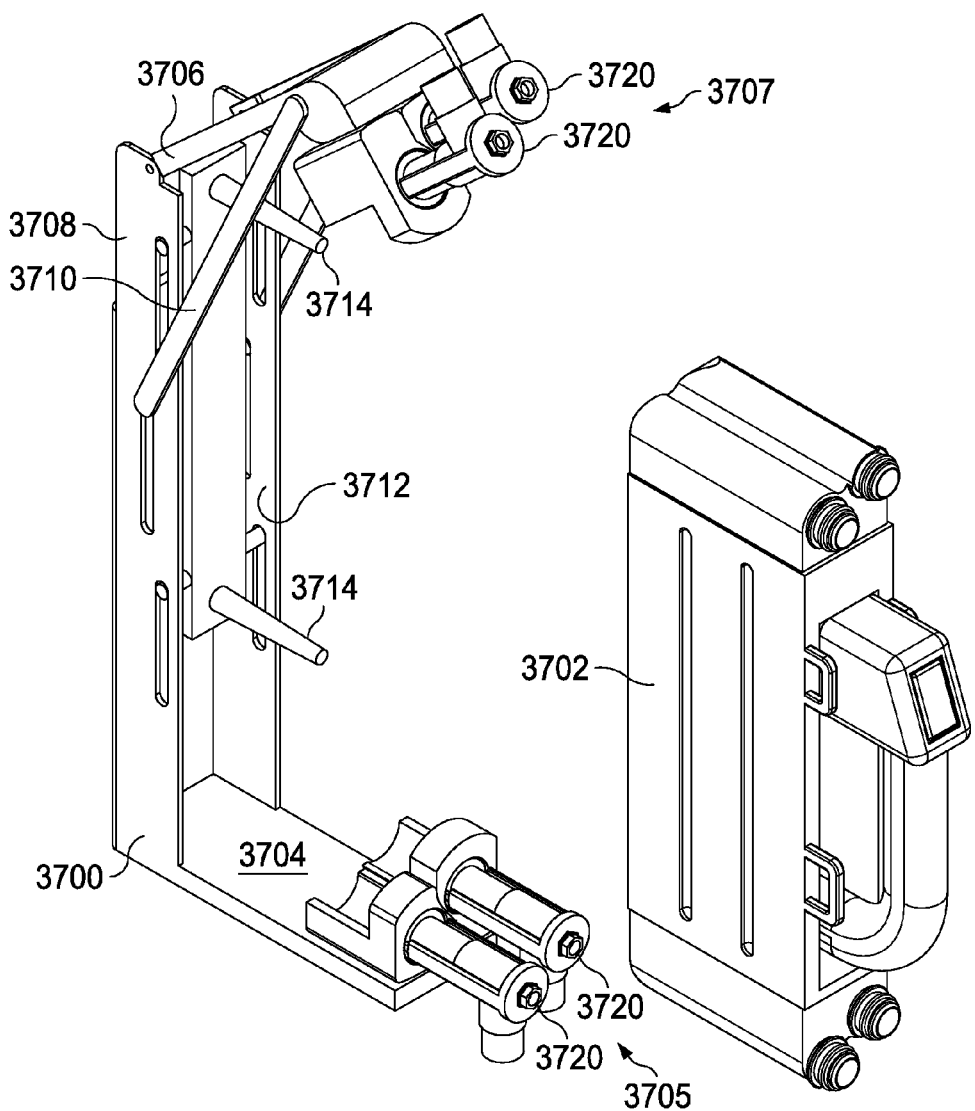
FIGS. 37A-37B are diagrammatic representations of another embodiment of a filter cassette.
Figure 37B:
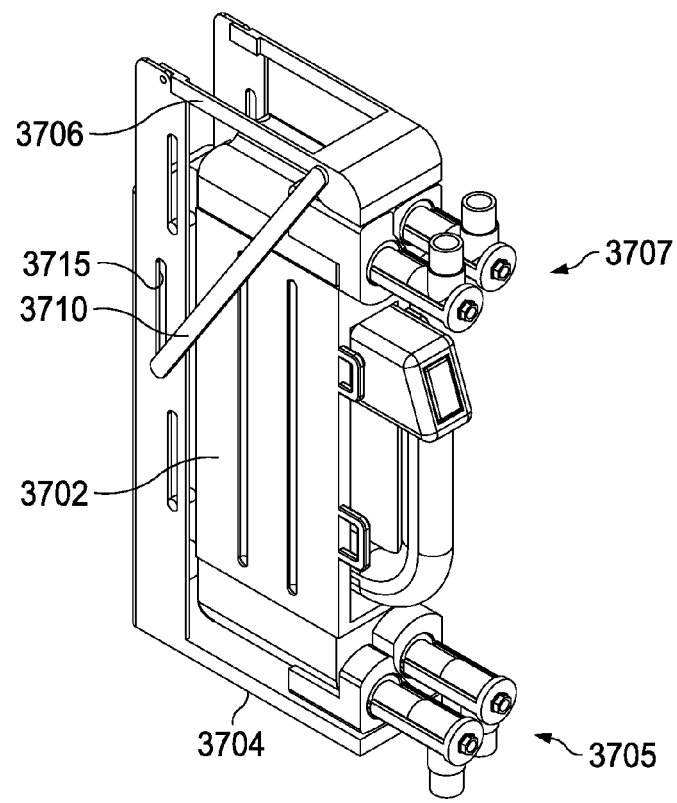

FIGS. 37A and 37B are diagrammatic representations of another embodiment of a manifold assembly 3700 and filter cassette 3702. Manifold assembly 3702 can comprise a lower support arm 3704, an upper support arm 3706 and an intermediate portion 3708. Lower support arm 3704 is coupled to lower connection systems 3705 providing lower manifold ports and upper support arm 3706 is coupled to upper connection systems 3707 that provide upper manifold ports. Lower connection system 3705 and upper connection system 3706 may operate as discussed above. Intermediate portion 3708 may be coupled to lower support arm 3704 and upper support arm 3706 and may separate the support arms. Intermediate portion 3708 defines a channel in which filter alignment bracket 3712 is disposed. Filter alignment bracket 3712 is movable relative intermediate portion 3708. Filter alignment bracket 3712 may include guide arms 3714 that can be received in corresponding features of a filter cassette.

Upper support arm 3706 pivots about an axis of rotation relative to intermediate portion 3708. Linkages 3710 connects upper support arm 3706 to filter alignment bracket 3712 through slots 3715 in the sides of intermediate portion 3708. Rotation of upper support arm 3706 causes filter alignment bracket 3712 to translate.

In operation, cassette 3702 can be placed in the cassette receiving area between lower support arm 3704 and upper support arm 3706 with guides 3714 received in corresponding features of filter cassette 3702. Upper support arm 3706 can be rotated causing filter alignment bracket 3712 to lower and upper connection systems 3707 to drop down to the opposite side of filter cassette 3702 from filter alignment bracket 3712. Rotation members 3720 can be rotated to complete a seal between the manifold ports and filter ports.

Figure 38:
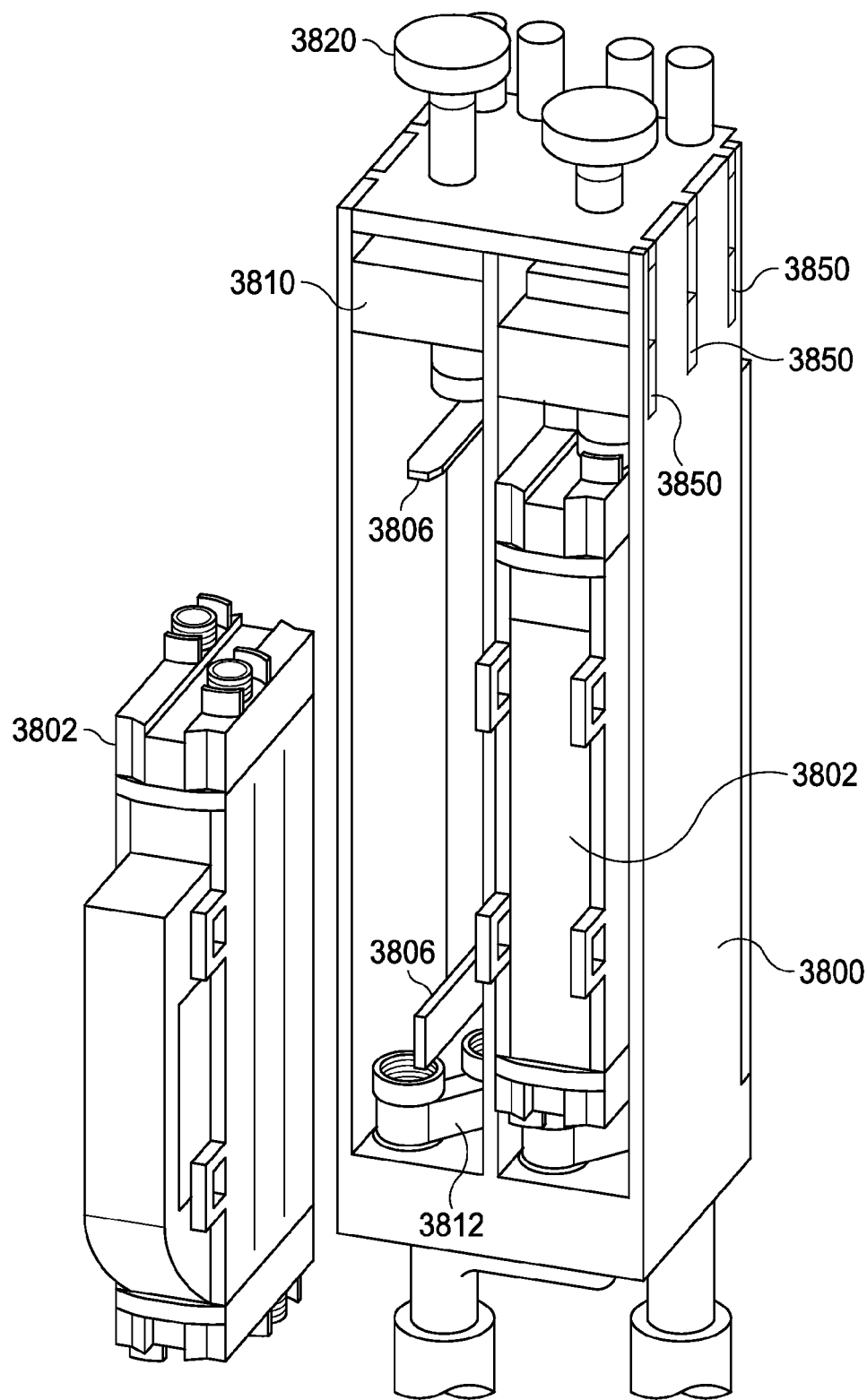
FIG. 38 is a diagrammatic representation of another embodiment of a filter cassette.

FIG. 38 is a diagrammatic representation of yet another embodiment of a manifold assembly 3800 for receiving a filter cassette 3802. Manifold assembly 3800 may comprise a housing that defines one or more filter bays providing cassette receiving areas to receive cassettes 3802. A filter alignment bracket provides guide arms 3806 projecting from the back of the filter bay. Guide arms 3806 may be received in corresponding features of the filter cassette. An upper connection system 3810 is disposed over the cassette receiving area and a lower connection system 3812 is disposed below the cassette receiving area. Upper connection system 3810 is operably connected to a rod 3820. Translation of rod 3820 can cause translation of upper connection system 3810, guided by slots 3850. According to one embodiment, rod 3820 is threaded so rotation of rod 3820 is required to translate upper connection system 3810.

Figure 39A:
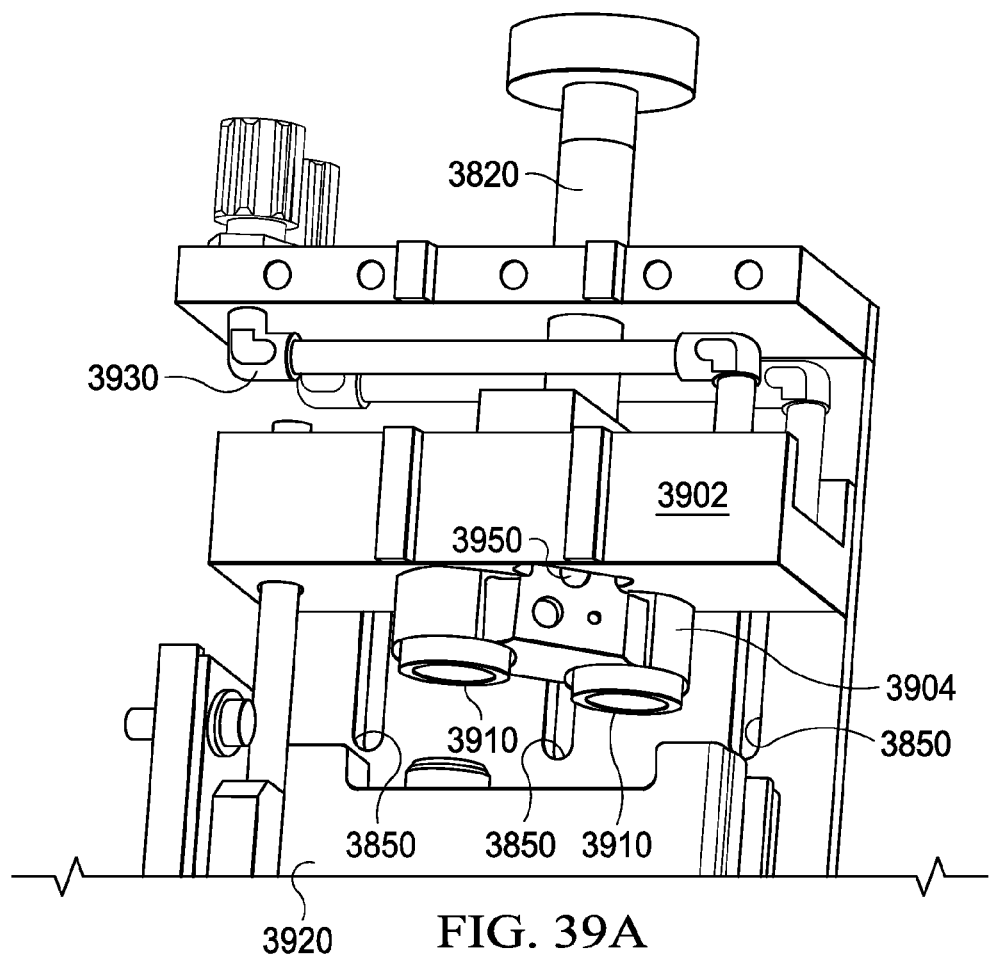
FIGS. 39A-39B are diagrammatic representations of another embodiment of a connection system.
Figure 39B:
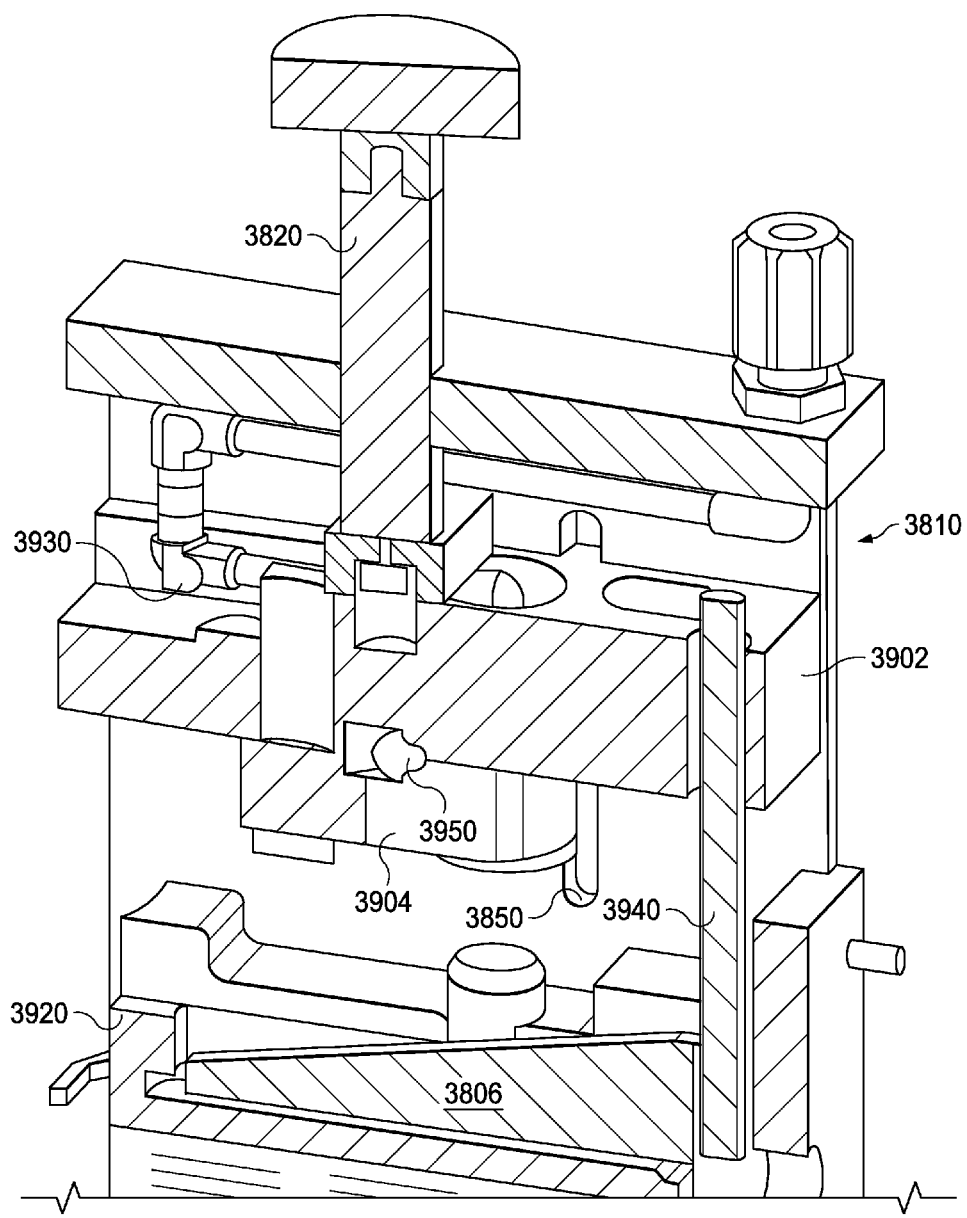

FIGS. 39A and 39B are diagrammatic representations of one embodiment of upper connection system 3810. A vertical alignment block 3902 is coupled to rod 3820 such that translation of rod 3820 causes vertical movement of vertical alignment block 3902. A pivot block 3904 is coupled to vertical alignment block 3902 and may rotate about the pivot axis 3950, which may be provided by a pivot pin (see also FIG. 39B) a controlled amount to distribute force evenly between the ports. Pivot block 3904 includes the upper manifold ports 3910 that engage with corresponding ports on filter end cap 3920. Supply lines 3930 can pass through vertical alignment block 3902 and connect to ports 3910 to direct fluid to/from ports 3910. Supply lines 3930 can be flexible to accommodate vertical movement of vertical alignment block 3902. In the embodiment depicted in FIG. 39B, vertical alignment block moves relative to slots 3850 (see also, FIG. 39A) in the sidewalls. Rod 3940 can lift the cassette of the bottom ports after the top ports disengage. Also shown in in FIG. 39B is one example of a guide arm 3806 engaged with end cap 3920.

Figure 40:
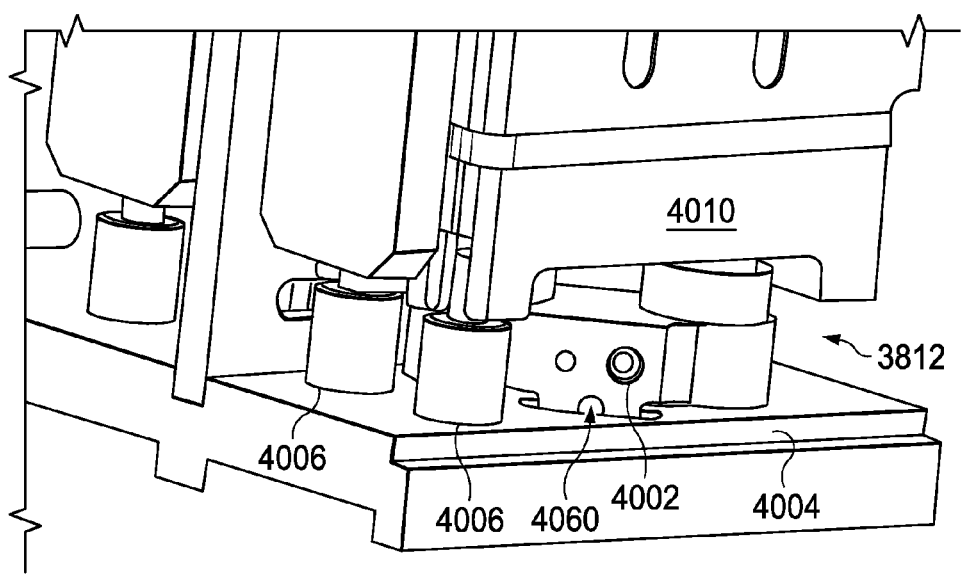
FIG. 40 is a diagrammatic representation of another embodiment of a connection system.

FIG. 40 is a diagrammatic representation of one embodiment of a lower connection system 3812. Lower connection system 3812 can include a pivot block 4002 coupled to a housing base 4004. Pivot block 4002 rotates about the pivot axis 4060 (which may be provided by a pivot pin) a controlled amount to distribute force evenly between the ports. Pivot block 4002 provides lower manifold ports that interface with corresponding ports on filter cassette end cap 4010. A set of posts 4006 extend upward from base 4004. Posts 4006 can be snap-fit posts configured to engage mating features of end cap 4010 for proper positioning of ports prior to seal engagement (e.g., slots 1228 of FIG. 12).

With reference to FIGS. 38-40, a cassette 3802 can be inserted in a filter bay through linear motion with guide arms 3806 engaging slots in cassette end caps 3920 and 4010. Rotating rod 3820 can cause vertical alignment block 3902 to translate down slots in the assembly sidewalls. In one embodiment, the alignment bracket may also move, translating filter cassette 3802 simultaneously. The distance between the upper manifold ports 3910 and the filter cassette ports may remain the same through a first range of motion until cassette 3802 reaches its lowest position and then the distance between upper manifold ports 3910 and the filter cassette ports decreases. In another embodiment, pivot block 3904 can engage seals on end cap 3920 and push cassette 3802 down through the cassette's range of motion. Mating features of end cap 4010 can engage into posts 4006 (with haptic feedback in some embodiments) and the ports on end cap 4010 engage the manifold ports on lower pivot block 4002. Rod 3820 can be rotated until a sufficient sealing force is created. The embodiment of FIGS. 38-40 provides an advantage in that rotation of a single rod can seal four ports.

Figure 41:
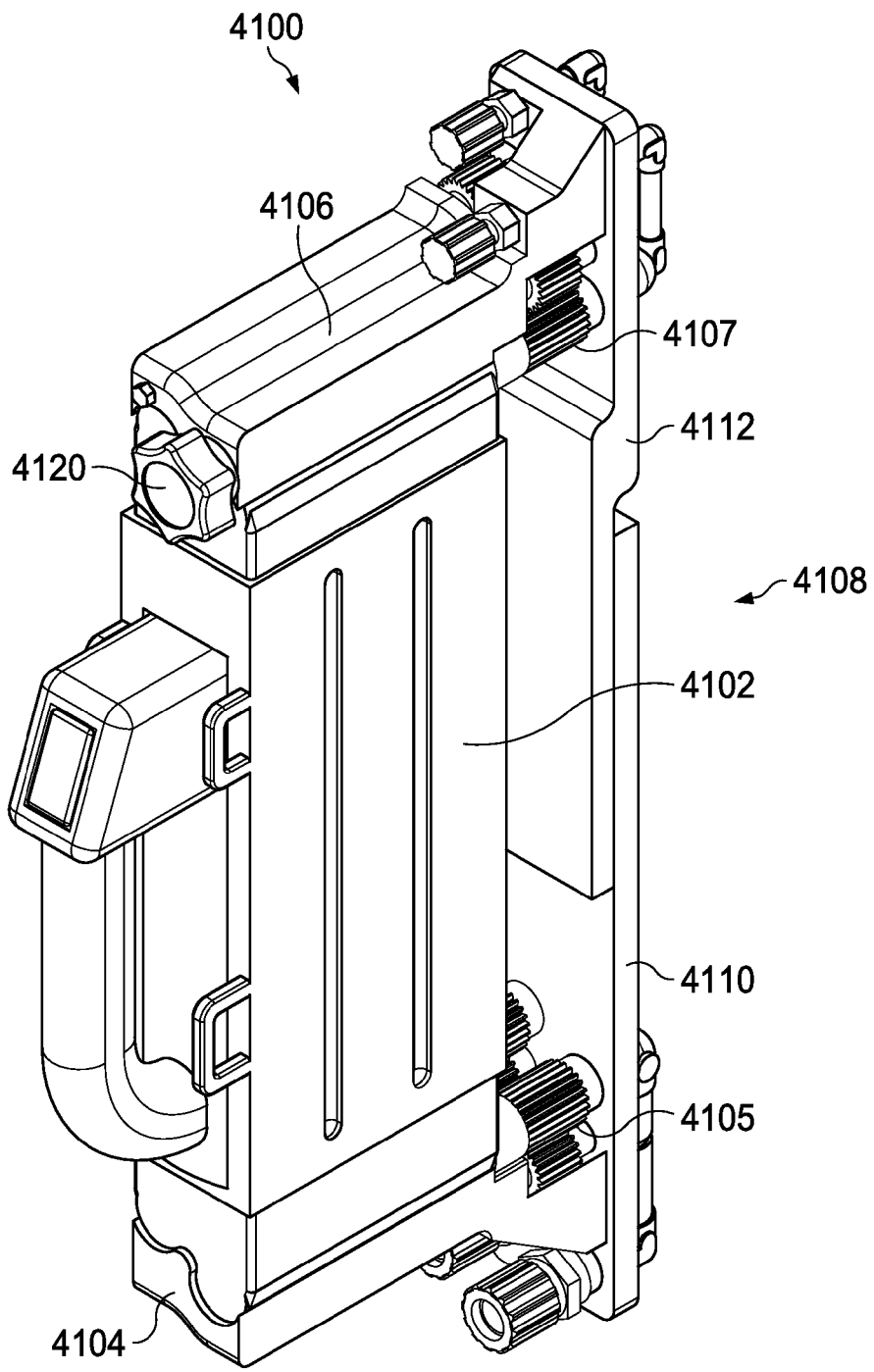
FIG. 41 is a diagrammatic representation of another embodiment of a manifold assembly and cassette.

FIG. 41 is a diagrammatic representation of one embodiment of another manifold assembly 4100 for receiving a filter cassette 4102. Manifold assembly comprises a lower support arm 4104 that supports a lower connection system 4105 and upper support arm 4106 that supports upper connection system 4107. Lower support arm 4104 and upper support arm 4106 are coupled to a support bracket 4108 that holds lower support arm 4104 and upper support arm 4106 a distance apart. Support bracket 4108 may provide some vertical compliance. According to one embodiment, support bracket 4108 may be formed of two or more plates (e.g., lower plate 4110 and upper plate 4112) that can slide vertically relative to each other. A removable drive shaft 4120 can pass through upper support arm 4108 and drive one or more gears of the connection systems (the same or different drive shaft can be used for lower support arm 4104).

Figure 42:
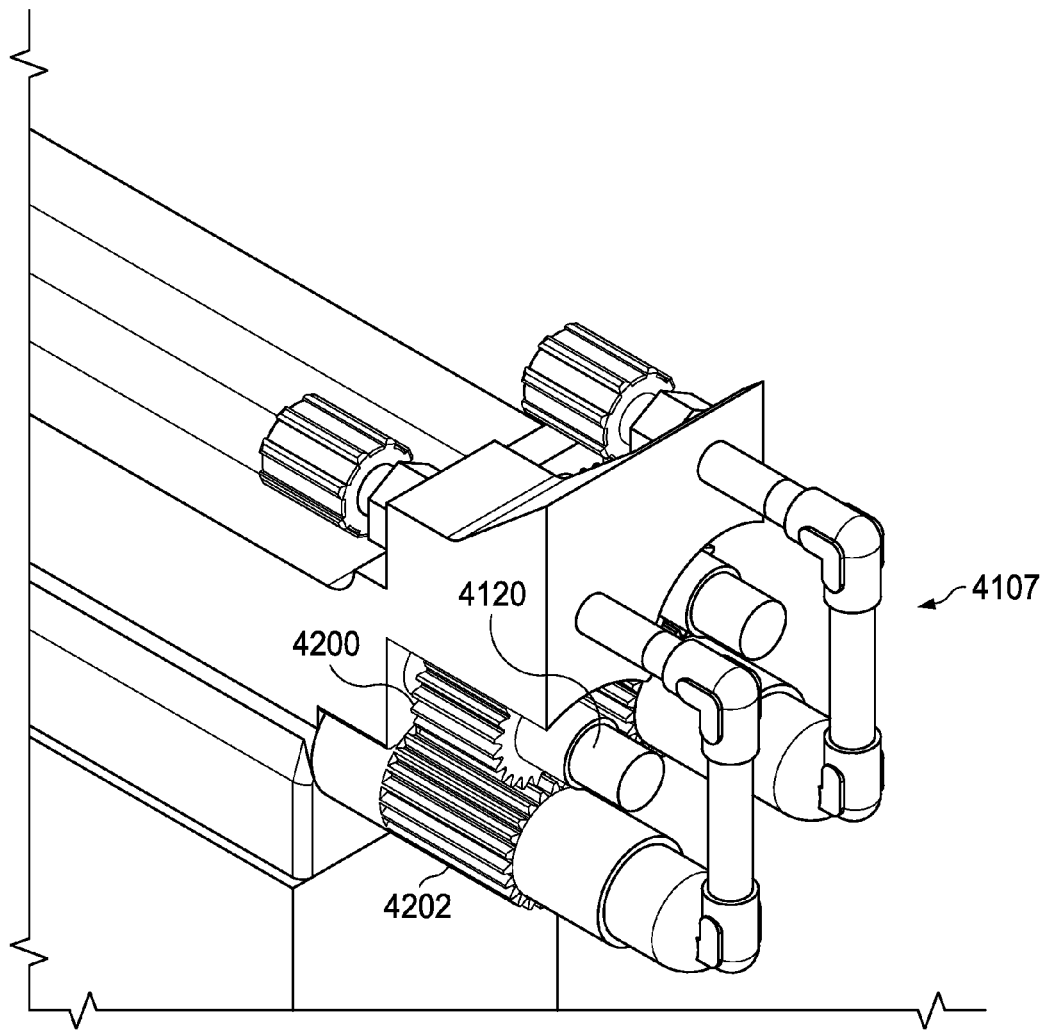
FIG. 42 is a diagrammatic representation of another embodiment of a connection system.

FIG. 42 is a diagrammatic representation of one embodiment of upper connection system 4107 comprising a drive train. Drive shaft 4120 engages gear 4200. As drive shaft 4120 is rotated, gear 4200 turns additional gears, such as gear 4202. In one embodiment, gear 4202 may be connected to a connection nut as discussed above. In another embodiment, gear 4202 may be disposed about a standard threaded fitting such that gear 4202 must be rotated multiple rotations to complete a seal. In other embodiments, the rod may drive a gear assembly that drives both (or more) nuts simultaneously.

It can be noted that in manifold assemblies, the upper connection system and lower connection system may differ (for example, connection housings may differ) so that the cassette can only be installed in one orientation. Housings may also differ so that a filter that is inappropriate for a particular application will not fit. Different alignment features can be used to limit what filters or filter end caps can fit into a given manifold assembly.

Figure 43:
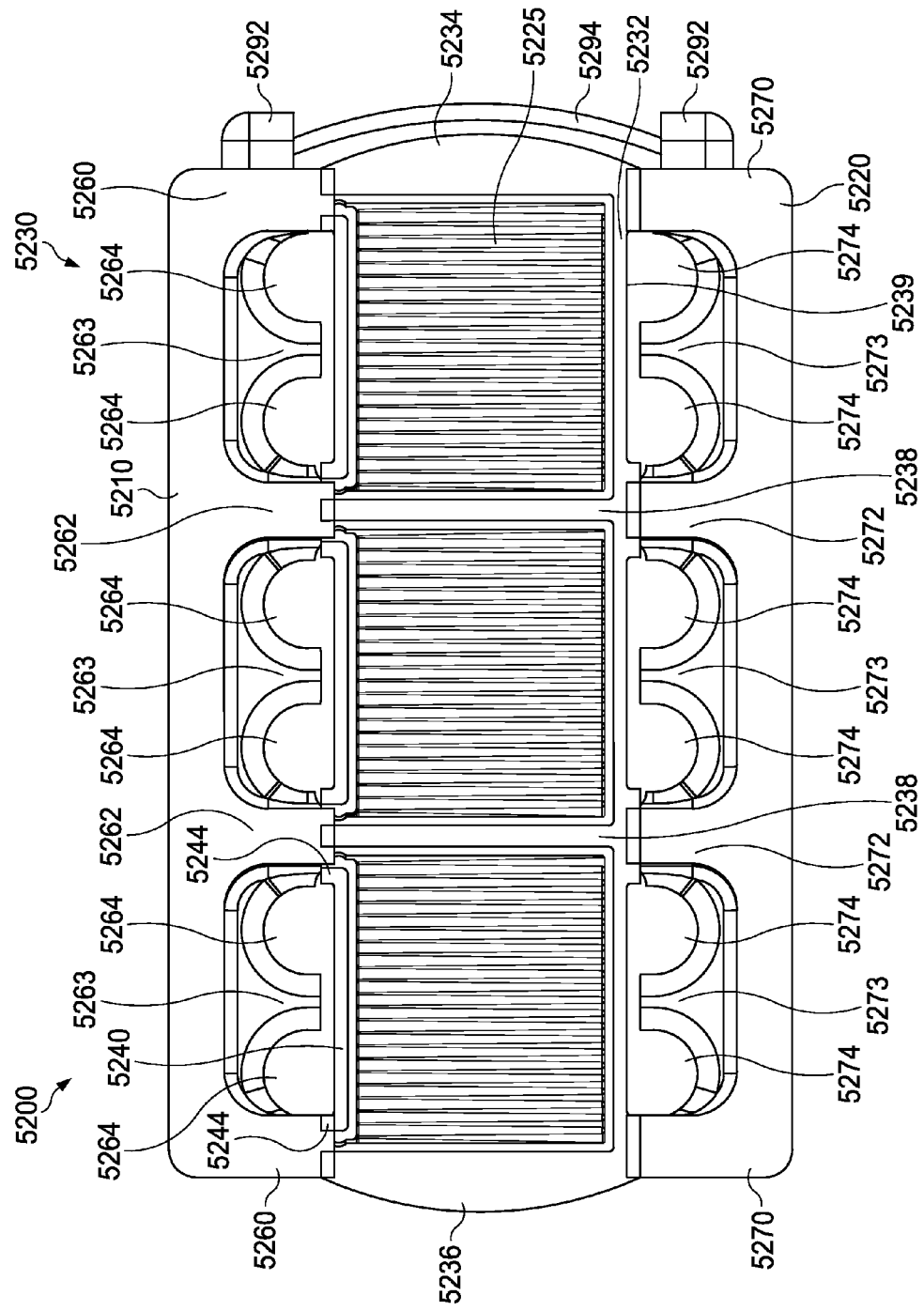
FIG. 43 is a diagrammatic representation of another embodiment of a cassette.

FIG. 43 is a diagrammatic representation of one embodiment of main body 5200 viewed from an end (e.g., with end cap 104 and end cap 106 removed). Main body 5200 may define a media cavity. The media cavity may be segregated into lanes with a purifier element 5225 disposed in each lane. According to one embodiment, the parallel lanes have a generally rectangular (including square) profile in the x-z plane and x-y plane. While three lanes are shown, the filter cassette may have more or fewer lanes. The lanes may be sealed from each other such that fluid does not flow between lanes. In other embodiments, openings may be provided so that fluid may flow between the segregated lanes. FIG. 43 further illustrates label 5294 in label holders 5292.

According to one embodiment, main body 5200 comprises first side cover 5210, a second side cover 5220, main shell 5230 and lane covers 5240 (one of which is indicated). Main shell 5230, first side cover 5210, second side cover 5220 and the end caps may be coupled together using fasteners, sonic bonding, interference fits or other coupling mechanism and may cooperate to form the media cavity and parallel lanes. Main shell 5230 provides a base 5232 extending between outer sidewall 5234 and outer sidewall 5236 and a set of spaced tension members 5238 extending from base 5232. Sidewall 5234, sidewall 5236, side cover 5210 and side cover 5220 may form the sidewalls of the internal cavity. The main shell sidewalls and tension members 5238 may extend a length along the long axis within the cavity to form lane sidewalls. The portions of base 5232 between the lane sidewalls (for example, between the outer sidewalls 5234/5236 and a tension member 5238 and between two tension members 5238) form integrated lane covers 5239 that comprise a grate to allow fluid flow into or out of the corresponding lane.

One side of base 5232 may include features to facilitate coupling of side cover 5220 to base 5232. According to one embodiment, the base provides a set of side cover mounting surfaces to which a portion of side cover 5220 may be bonded or otherwise coupled. On the opposite side, the ends of outer sidewall 5234, outer sidewall 5236 and tension members 5238 distal from base 5232 can provide features to facilitate coupling of side cover 5210 to main shell 5230. The distal end surfaces may, for example, provide side cover mounting surfaces to which a portion of side cover 5210 may be bonded or otherwise coupled.

Lane covers 5240 span between each main shell sidewall 5234/5236 and a tension member 5238 or between adjacent tension members 5238 and extend the length of the lanes to cover the opposite side of lanes from base 5232. Lane covers 5240 may comprise an outer frame including frame members 5244 that run the length of lane covers 5240 and a grate portion spanning between frame members 5244. The openings in lane covers 5240 may be the same as or different than the openings in integrated lane covers 5239 of base 5232.

The surfaces of frame members 5244 facing side cover 5210 may provide a side cover mounting surface to facilitate coupling of side cover 5210. For example, the side cover mounting surfaces may provide a surface to which a portion of side cover 5210 may be bonded or otherwise coupled. The lane covers 5240 may also include coupling features to facilitate coupling of lane covers 5240 to main shell 5230 using a snap-fit, interference fit, sonic bonding, thermal bonding or according to any suitable coupling mechanism. According to one embodiment, lane covers 5240 may include tongues, grooves or other features such that the lane cover 5240 can be captured the in the proper location.

As depicted in FIG. 43, a lane cover is provided on both an upstream and a downstream side of a purifier element 5225 (e.g., in the form of lane cover 5240 and integrated lane cover 5239). In other embodiments, a lane cover is only provided on one side of purifier element 5225. In yet another embodiment, lane covers are not used at all. One advantage to having lane covers to cover both the upstream and downstream side of purifier element 5225 is that the purifier element 5225 can be supported in both forward and reverse flow, allowing the cassette to function similarly in either flow direction.

Side cover 5210 can include side support members 5260, a set of spaced ribs 5262 that align with tension members 5238 and a set of spaced ribs 5263. Side cover 5220 can similarly include side support members 5270, a set of spaced ribs 5272 that align with tension members 5238 and a set of spaced ribs 5273. It can be noted that in contrast to ribs 263 and 273 of FIG. 2, ribs 5263 and ribs 5273 do not extend all the way to the lane covers. That is, there is a gap between the lane covers 5240 and the ends of ribs 5263 and a gap between the ends of ribs 5273 and the lane covers 5239.

Flow channels may be disposed along the sidewalls. To this end, side support members 5260, spaced ribs 5262 and spaced ribs 5263 may extend a length and cooperate to form a set of parallel flow channels subdivided into flow channel portions 5264 that are open to lane covers 5240 along their length. Similarly, side support members 5270, spaced ribs 5272 and spaced ribs 5273 may extend a length and cooperate to form a set of parallel flow channels subdivided into flow channel portions 5274 that are open to lane covers 5239 along their length. The ends of the flow channels may form plenums as discussed above and be fluidly coupled to one or more of the inlet, outlet, vent or drain.

While one flow channel subdivided into two portions is depicted per lane, the cassette may have multiple segregated flow channels per lane. The flow channels 5264 and 5274 may have any desired shape and size and different flow channels on the same side or opposite sides may have different configurations. According to one embodiment, the flow channels may be arced, elliptical or otherwise rounded to create a series of arches on the inside of the side covers. One arced, elliptical or rounded shape per lane can also be used (e.g., such that the flow channel is not subdivided, but still rounded).

Some of the spaced ribs on each side cover are spaced to align with tension members 5238. The inner surface of these ribs may be coupled to the ends of the tension members. For example, the inner surfaces of ribs 5272 may be coupled to main shell 5230 at the base of tension members 5238 and the inner surfaces of ribs 5262 may be coupled to the distal end of the tension members 5238. Consequently, when the pressure vessel cavity is under pressure, tension members 5238 will assert a force on side covers 5210 and 5220 to reduce or prevent bowing of side covers 5210 and 5220. The size and configuration of tension members 5238 may be selected so that the volumetric deformation of the pressure vessel cavity is less than a desired percentage under expected operating pressures.

Main body 5200 can comprise a series of hoop-like structures to better distribute forces as discussed above. According to one embodiment, transitions in internal surfaces running parallel to the lanes are curved. Thus, for example, corners side cover 5210, the corners of side cover 5220 and the flow passages are curved about axes parallel to the lanes as discussed above in conjunction with FIG. 2 above. Furthermore, the main shell sidewalls 5234 and 5236 have curved exteriors and side covers 5210 and 5220 have curved corners (e.g., with reference to FIGS. 1A and 1B, at the transitions from side 125 to side 124 and side 123 and the transitions from side 126 to side 124 and side 123).

As discussed above, the lanes can provide purifier element holding areas to hold purifier elements 5225. The purifier elements 5225 are preferably pleat packs pleated with the length of the pleat parallel to the long axis of the cassette. The pleat tips may be oriented so that the pleat tips on one side point at side cover 5210 while the opposite pleat tips are oriented to point at side cover 5220 with the pleat tips abutting the respective lane cover. In this arrangement, one set of pleat tips faces the upstream portion of the cavity and the other set of pleat tips faces the downstream portion of the cavity. The purifier elements 5225 may be separate purifier elements or each of the purifier elements may be portions of the same continuous pleat pack such that, for example, the last flap of one purifier element 5225 transitions into the first flap of the next filer element 5225 and the last flap of that purifier element transitions into the first flap of the next purifier element 5225 and so on. The pleats of the each purifier element can be formed from a single membrane or multiple membranes formed from the same or different materials. Preferably the pleats are compressed together and form a generally planer rectangular entrance interface on the upstream side and a generally planer rectangular exit interface on the downstream side. The amount of compression of the membrane in a lane for a given area of membrane can be selected to achieve a desired pressure drop and flow rate. Other purification media or media for other purposes (e.g., heat exchange) may also be placed in the lanes, as discussed above.

Figure 44:
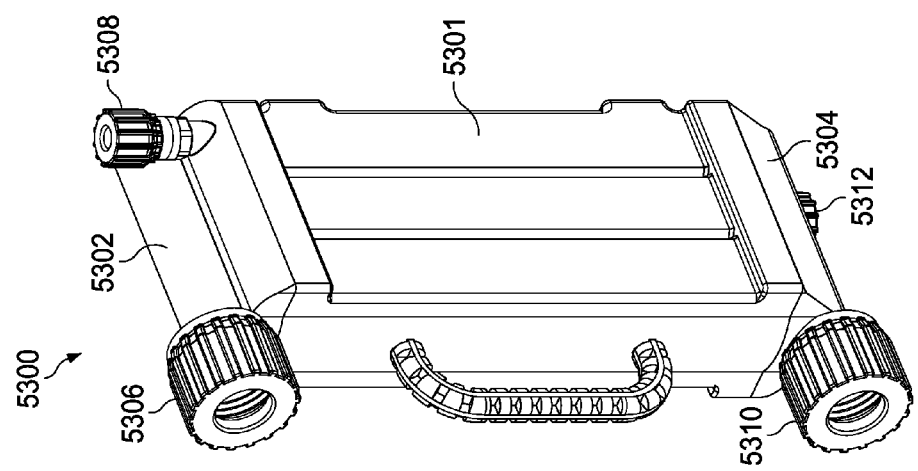
FIG. 44 is a diagrammatic representation of yet another embodiment of a cassette.

FIG. 44 is a diagrammatic representation of another embodiment of a filter cassette 5300 comprising a main body 5301, a first end cap 5302 and a second end cap 5304. Main body 5301 can be configured as discussed above. End cap 5302 can provide a first port 5306 and a second port 5308 and end cap 5304 can provide a third port 5310 and a fourth port 5312. The ports can provide an inlet port, an outlet port, a vent port and a drain port. For example, port 5306 may be an outlet port, port 5308 a vent port, port 5310 an inlet port and port 5312 a drain port. In the embodiment of FIG. 44, the port fittings can be standard port fittings used, for example, in semiconductor manufacturing.

End cap 5302 can be configured so that gas on an upstream side of the cassette is directed to second port 5308 (e.g., end cap 5302 may be drafted or otherwise shaped so that the vent port is at the highest point on the upstream side of the cavity) and end cap 5304 can be configured so that fluid on the downstream side flows to port 5312 (e.g., end cap 5304 may be drafted or otherwise shaped so that the drain port is at the lowest point on the downstream side of the cavity).

Figure 45:
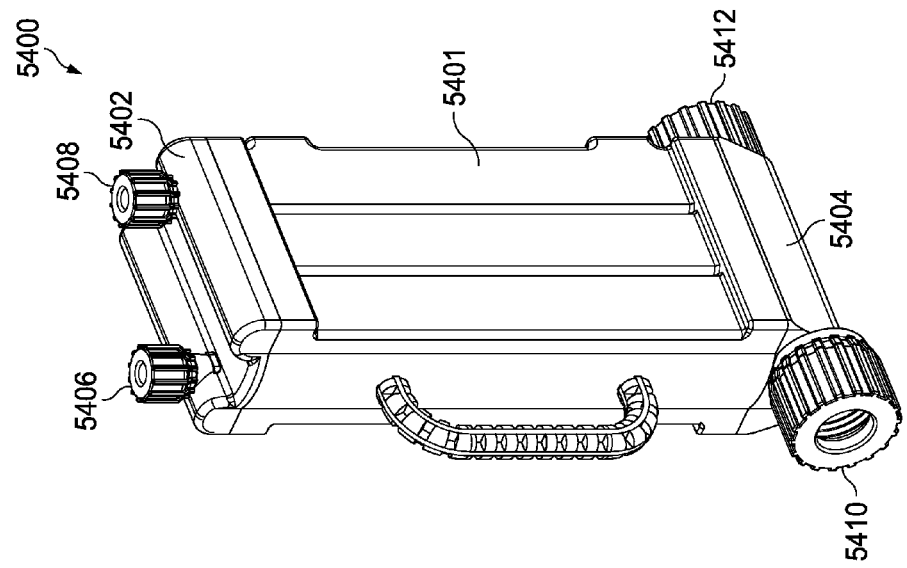
FIG. 45 is a diagrammatic representation of yet another embodiment of a cassette.

FIG. 45 is a diagrammatic representation of another embodiment of a filter cassette 5400 comprising a main body 5401, a first end cap 5402 and a second end cap 5404. Main body 5401 can be configured as discussed above. End cap 5402 can provide a first port 5406 and a second port 5408 and end cap 5404 can provide a third port 5410 and a fourth port 5412. The ports can provide an inlet port, an outlet port, an upstream vent port and a downstream vent port. For example, port 5406 may be a downstream vent port, port 5408 an upstream vent port, port 5410 an inlet port and port 5412 an outlet port. End cap 5402 can be configured so that gas is directed to first port 5406 and second port 5408 (e.g., end cap 5402 may be drafted or otherwise shaped so that the vent ports are at the highest point on the upstream side of the cavity and downstream side of the cavity). The ports may be otherwise employed. For example, port 5410 and port 5412 can be used for draining the cassette. In the embodiment of FIG. 45, the port fittings can be standard port fittings used, for example, in semiconductor manufacturing.

Figure 46:
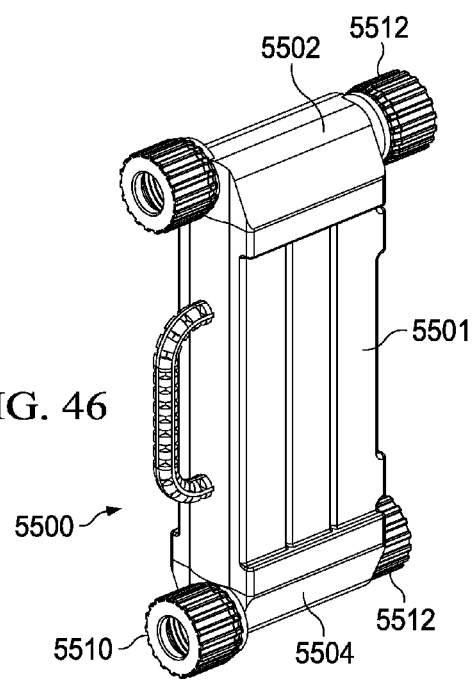
FIG. 46 is a diagrammatic representation of yet another embodiment of a cassette.

FIG. 46 is a diagrammatic representation of another embodiment of a filter cassette 5500 with fluid ports facing front and back, comprising a main body 5501, a first end cap 5502 and a second end cap 5504. Main body 5501 can be configured as discussed above. End cap 5502 can provide a first port 5506 and a second port 5508 and end cap 5504 can provide a third port 5510 and a fourth port 5512. The ports can provide an inlet port, an outlet port, a vent port and a drain port. In this case, all the ports can be horizontal ports. In the embodiment of FIG. 46, the port fittings can be standard port fittings used, for example, in semiconductor manufacturing.

End cap 5502 can be configured so that gas on an upstream side of the cassette is directed to the vent port (e.g., end cap 5502 may be drafted or otherwise shaped so that the vent port is at the highest point on the upstream side of the cavity) and end cap 5504 can be configured so that fluid on the downstream side flows to port 5512 (e.g., end cap 5504 may be drafted or otherwise shaped so that the drain port is at the lowest point on the downstream side of the cavity). Port 5510 can also be drafted, in one embodiment, to allow draining.

Although specific embodiments have been described, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

For example, any filter structures described herein may comprise a first polymer overmolded on one or more surfaces with a second polymer. As another example, the media may include a membrane that can be surface modified by chemical coating, plasma treatment, laser or lamp treatment and the like to include ion exchange groups, hydrophilic groups, hydrophobic groups and other functional moieties that aid in the purification of fluids treated by the porous membrane. As another example, ion exchange media can be placed in membrane pouches and these pouches sealed into the channels or lanes of the cassette. In another embodiment, a porous membrane with embedded ion exchange membrane could be pleated and bonded into the lanes. It would also be possible to gasify or degas a liquid using a porous or non-porous membrane within a cassette by flowing liquid on one side of the housing and either applying gas or pulling vacuum through the fittings on the other side of the cassette. In another embodiment, a cassette can be configured to transfer heat using a non-porous membrane.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:
1. A purification system comprising:
a generally rectangular removable purifier cassette, the purifier cassette further comprising:
a purifier body comprising a first sidewall, a second sidewall, a third sidewall and a fourth sidewall, the first sidewall opposite the second sidewall and the third sidewall opposite the fourth sidewall, the purifier body defining a media cavity;
one or more tension members coupled to the first sidewall and the second sidewall of the media cavity, the one or more tension members dividing the media cavity into a plurality of sections;
a purifier element disposed in each of the plurality of sections;
a first purifier port fitting providing a first purifier port fluidly connected to an upstream portion of the media cavity;
a second purifier port fitting providing a second purifier port fluidly connected to a downstream portion of the media cavity;
a manifold assembly into which rectangular purifier cassettes can be inserted and from which the rectangular purifier cassette can be removed for replacement, the manifold assembly comprising a plurality of connection systems providing manifold ports, the manifold ports comprising:
a first manifold port coupled to the first purifier port fitting;

a second manifold port coupled to the second purifier port fitting; wherein the manifold assembly is configured to receive the purifier cassette through horizontal translation through a front side of the manifold assembly and adapted to allow an operator to seal or unseal the purifier cassette from the front side of the manifold assembly and wherein the purifier cassette is adapted to be inserted and removed from the manifold assembly through horizontal translation through the front side of the manifold assembly, and wherein:
the plurality of connection systems comprises a first connection system that includes
a first connection housing defining a first connection housing first opening, and
a first connection nut disposed in the first connection housing first opening and rotatable in the first connection housing around a first manifold fitting,
the manifold assembly comprises a second connection nut rotatable around a second manifold fitting, and
a gear assembly is operatively coupled to the first connection nut and the second connection nut such that the first connection nut and second connection nut rotate simultaneously.

2. The purification system of claim 1, wherein each purifier element comprises a compressed generally rectangular pleat pack arranged with a first set of tips facing the downstream portion of the media cavity.

3. The purification system of claim 1, wherein the purifier body is configured with a plurality of hoop-like structures about the plurality of sections to distribute stress.

4. The purification system of claim 1, further wherein the purifier cassette further comprises a first set of flow channels disposed along the first sidewall and a second set of flow channels disposed along the second sidewall, the first set of flow channels and second set of flow channels on opposite sides of the plurality of sections, each of the first set of flow channels fluidly coupled to the first purifier port and configured to distribute fluid to a first side of the plurality of sections and each of the second set of flow channels fluidly coupled to the second purifier port and configured to receive fluid from a second side of the plurality of sections.

5. The purification system of claim 4, further comprising a first series of reinforcing arches disposed along the first sidewall and a second series of reinforcing arches disposed along the second sidewall.

6. The purification system of claim 5, wherein the first series of reinforcing arches provide the first set of flow channels and the second series of reinforcing arches provide the second set of flow channels.

7. The purification system of claim 1, wherein the first purifier port and second purifier port are rear facing ports and wherein the plurality of connection systems are configured to allow a user to seal the rear facing ports from a front side of the purifier cassette.

8. The purification system of claim 1, wherein the plurality of connection systems are configured to simultaneously seal multiple purifier ports.

9. The purification system of claim 1, wherein the manifold assembly comprises an alignment feature to align the purifier cassette with the manifold assembly.

10. The purification system of claim 9, wherein the alignment feature comprises one or more guide arms.

11. The purification system of claim 1, wherein
the first connection nut comprises a set of first connection nut internal threads, the set of first connection nut internal threads configured to engage a set of first purifier port fitting external threads to create a seal between the first manifold fitting and the first purifier port fitting with less than 360 degrees of rotation of the first connection nut.

12. The purification system of claim 11, wherein the set of first connection nut internal threads and the set of first purifier port fitting external threads are multi-start threads configured to create at least 360 degrees of threaded engagement with less than 360 degrees of rotation of the first connection nut.

13. The purification system of claim 11, wherein the first connection housing comprises a set of first connection housing internal threads and the first connection nut comprises a set of first connection nut external threads, wherein the set of first connection nut external threads engage the set of first connection housing internal threads.

14. The purification system of claim 11, wherein
the second connection nut comprises a set of second connection nut internal threads, the second connection nut internal threads configured to engage a set of second purifier port fitting external threads to create a seal between the second manifold fitting and the second purifier port fitting with less than 360 degrees of rotation.

15. The purification system of claim 14, wherein the second connection nut is disposed in the first connection housing or a second connection housing.

16. The purification system of claim 1, wherein the first purifier port fitting and second purifier port fitting face the manifold assembly and wherein the first connection system comprises a rotation member that extends past the purifier cassette, the rotation member operatively coupled to the gear assembly such that rotation of the rotation member rotates the first connection nut and the second connection nut.

17. The purification system of claim 16, wherein the rotation member comprises a gear arm coupled to the first connection nut, the gear arm comprising:
gear teeth engaging a gear operatively coupled to the second connection nut; and
an arm portion extending past the purifier cassette.

18. The purification system of claim 17, wherein the first connection system further comprises a drive handle and the drive handle comprises:
a drive shaft received in a drive shaft passage of the arm portion, the drive shaft translatable in the drive shaft passage from a fully retracted position to a fully inserted position; and
an alignment post received in an alignment opening of the purifier cassette, the alignment post providing a pivot point for the drive shaft.

19. The purification system of claim 18, wherein the alignment opening is keyed such that the drive shaft is inserted a first distance, then rotated about the pivot point a selected angular distance and then fully inserted.

20. The purification system of claim 18, wherein the alignment opening is keyed such that a portion of the alignment post aligns with an entrance passage in the alignment opening when the first connection nut and second connection nut are disengaged with a set of first connection nut internal threads aligning with a set of first purifier port fitting external threads and the set of second connection nut internal threads aligning with a set of second purifier port fitting external threads.

21. The purification system of claim 13, wherein the first connection nut comprises a first set of alignment features spaced from a start of the set of first connection nut internal threads and the first purifier port fitting comprises a set of complementary alignment features spaced from the set of first purifier port fitting external threads so that the set of first connection nut internal threads cannot engage the set of first purifier port fitting external threads unless the first set of alignment features mate with the set of complementary alignment features.

* * * * *